(12) United States Patent
Harrison

(10) Patent No.: US 9,838,758 B2
(45) Date of Patent: *Dec. 5, 2017

(54) RELEVANCY IMPROVEMENT THROUGH TARGETING OF INFORMATION BASED ON DATA GATHERED FROM A NETWORKED DEVICE ASSOCIATED WITH A SECURITY SANDBOX OF A CLIENT DEVICE

(71) Applicant: David Harrison, San Francisco, CA (US)

(72) Inventor: David Harrison, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,385

(22) Filed: Apr. 27, 2016

(65) Prior Publication Data

US 2016/0241934 A1 Aug. 18, 2016

Related U.S. Application Data

(63) Continuation of application No. 14/018,408, filed on Sep. 4, 2013, now Pat. No. 9,589,456, and a
(Continued)

(51) Int. Cl.
*H04H 60/32* (2008.01)
*H04N 21/8358* (2011.01)
(Continued)

(52) U.S. Cl.
CPC ... *H04N 21/8358* (2013.01); *G06F 17/30784* (2013.01); *G06F 21/53* (2013.01);
(Continued)

(58) Field of Classification Search
CPC ......... H04N 21/8358; H04N 21/23424; H04N 21/4147; H04N 21/435; H04N 21/6175;
(Continued)

(56) References Cited

U.S. PATENT DOCUMENTS 3,849,760 A 11/1974 Endou et al.
3,919,479 A 11/1975 Moon et al.
(Continued)

FOREIGN PATENT DOCUMENTS

CA 2553159 A1 10/1998
CA 2413944 A1 6/2003
(Continued)

OTHER PUBLICATIONS

"OpenX Ad Server: Beginner's Guide", Packt Publishing by Murat Yilmaz (pp. 26) https://www.packtpub.com/sites/default/files/0202_OpenX3%20Ad%20Server%20Beginner's%20Guide_SampleChapter.pdf.
(Continued)

*Primary Examiner* — Kyu Chae
(74) *Attorney, Agent, or Firm* — Raj Abhyanker, P.C.

(57) ABSTRACT

In one embodiment, a method of a relevancy-matching server includes matching primary data generated from a fingerprint data with targeted data based on a relevancy factor, locating in a storage the targeted data, a reference to the targeted data, and/or a metadata of the targeted data. A mobile device is associated with a television. An executable environment is constrained in a security sandbox of the mobile device. A sandboxed application is executed in the executable environment capable of bypassing at least one access control of the security sandbox. An embedded object is processed in the sandboxed application. The television and/or the mobile device are to generate the fingerprint data from characteristic features of media data. The relevancy-matching server is to match the targeted data with the primary data such that the relevancy-matching server is to locate in the storage an item based on a relevancy factor.

30 Claims, 26 Drawing Sheets

Related U.S. Application Data continuation of application No. 14/981,928, filed on Dec. 29, 2015, now Pat. No. 9,386,356, which is a continuation of application No. 14/744,045, filed on Jun. 19, 2015, now abandoned, said application No. 14/981,928 is a continuation of application No. 14/274,800, filed on May 12, 2014, now Pat. No. 9,258,383, which is a continuation of application No. 13/943,866, filed on Jul. 17, 2013, now Pat. No. 8,819,255, which is a continuation of application No. 13/904,015, filed on May 28, 2013, now Pat. No. 9,026,668, said application No. 13/943,866 is a continuation of application No. 13/736,031, filed on Jan. 7, 2013, now Pat. No. 9,154,942, said application No. 13/943,866 is a continuation of application No. 13/470,814, filed on May 14, 2012, now Pat. No. 8,539,072, which is a continuation of application No. 12/592,377, filed on Nov. 23, 2009, now Pat. No. 8,180,891.

(60) Provisional application No. 62/183,756, filed on Jun. 24, 2015, provisional application No. 61/696,711, filed on Sep. 4, 2012, provisional application No. 61/803,754, filed on Mar. 20, 2013, provisional application No. 62/026,017, filed on Jul. 17, 2014, provisional application No. 61/652,153, filed on May 26, 2012, provisional application No. 61/584,168, filed on Jan. 6, 2012, provisional application No. 61/118,286, filed on Nov. 26, 2008.

(51) Int. Cl.

| | | |
|---|---|---|
| *H04L 29/06* | (2006.01) | |
| *H04L 29/08* | (2006.01) | |
| *H04N 21/4147* | (2011.01) | |
| *H04N 21/61* | (2011.01) | |
| *G08C 17/02* | (2006.01) | |
| *H04N 21/835* | (2011.01) | |
| *H04N 21/435* | (2011.01) | |
| *H04N 21/234* | (2011.01) | |
| *H04N 21/8352* | (2011.01) | |
| *H04N 21/643* | (2011.01) | |
| *H04N 21/81* | (2011.01) | |
| *H04N 21/41* | (2011.01) | |
| *G06F 17/30* | (2006.01) | |
| *G06F 21/53* | (2013.01) | |
| *H04N 21/254* | (2011.01) | |
| *H04N 21/414* | (2011.01) | |
| *H04N 21/4415* | (2011.01) | |
| *H04L 29/12* | (2006.01) | |
| *H04N 21/278* | (2011.01) | |
| *H04N 21/466* | (2011.01) | |
| *H04N 21/84* | (2011.01) | |

(52) U.S. Cl.
CPC .......... *G08C 17/02* (2013.01); *H04L 61/2007* (2013.01); *H04L 61/256* (2013.01); *H04L 63/10* (2013.01); *H04L 63/102* (2013.01); *H04L 67/10* (2013.01); *H04L 67/16* (2013.01); *H04N 21/23424* (2013.01); *H04N 21/2541* (2013.01); *H04N 21/278* (2013.01); *H04N 21/4126* (2013.01); *H04N 21/4147* (2013.01); *H04N 21/41407* (2013.01); *H04N 21/435* (2013.01); *H04N 21/4415* (2013.01); *H04N 21/466* (2013.01); *H04N 21/6175* (2013.01); *H04N 21/64322* (2013.01); *H04N 21/812* (2013.01); *H04N 21/835* (2013.01); *H04N 21/8352* (2013.01); *H04N 21/84* (2013.01); *G06F 2221/033* (2013.01)

(58) Field of Classification Search
CPC ........... H04N 21/64322; H04N 21/812; H04N 21/835; H04N 21/8352; G08C 17/02; H04L 63/10; H04L 67/10; H04L 67/16
See application file for complete search history.

(56) References Cited

U.S. PATENT DOCUMENTS

| | | |
|---|---|---|
| 4,025,851 A | 5/1977 | Haselwood et al. |
| 4,230,990 A | 10/1980 | Lert, Jr. et al. |
| 4,258,386 A | 3/1981 | Cheung |
| 4,420,769 A | 12/1983 | Novak |
| 4,450,531 A | 5/1984 | Kenyon et al. |
| 4,574,304 A | 3/1986 | Watanabe et al. |
| 4,677,466 A | 6/1987 | Lert, Jr. et al. |
| 4,697,209 A | 9/1987 | Kiewit et al. |
| 4,739,398 A | 4/1988 | Thomas et al. |
| 4,833,449 A | 5/1989 | Gaffigan |
| 4,843,562 A | 6/1989 | Kenyon et al. |
| 4,888,638 A | 12/1989 | Bohn |
| 4,918,730 A | 4/1990 | Schulze |
| 4,955,070 A | 9/1990 | Welsh et al. |
| 4,967,273 A | 10/1990 | Greenberg |
| 4,993,059 A | 2/1991 | Smith et al. |
| 5,014,125 A | 5/1991 | Pocock et al. |
| 5,019,899 A | 5/1991 | Boles et al. |
| 5,105,184 A | 4/1992 | Pirani |
| 5,155,591 A | 10/1992 | Wachob |
| 5,223,924 A | 6/1993 | Strubbe |
| 5,319,453 A | 6/1994 | Copriviza et al. |
| 5,321,750 A | 6/1994 | Nadan |
| 5,436,653 A | 7/1995 | Ellis et al. |
| 5,481,294 A | 1/1996 | Thomas et al. |
| 5,522,077 A | 5/1996 | Cuthbert et al. |
| 5,539,658 A | 7/1996 | McCullough |
| 5,557,334 A | 9/1996 | Legate |
| 5,572,246 A | 11/1996 | Ellis et al. |
| 5,612,729 A | 3/1997 | Ellis et al. |
| 5,636,346 A | 6/1997 | Saxe |
| 5,724,521 A | 3/1998 | Dedrick |
| 5,732,219 A | 3/1998 | Blumer et al. |
| 5,742,768 A | 4/1998 | Gennaro et al. |
| 5,745,884 A | 4/1998 | Carnegie et al. |
| 5,761,601 A | 6/1998 | Nemirofsky et al. |
| 5,761,648 A | 6/1998 | Golden et al. |
| 5,761,655 A | 6/1998 | Hoffman |
| 5,774,170 A | 6/1998 | Hite et al. |
| 5,774,673 A | 6/1998 | Beuk et al. |
| 5,805,974 A | 9/1998 | Hite et al. |
| 5,815,665 A | 9/1998 | Teper et al. |
| 5,822,525 A | 10/1998 | Tafoya et al. |
| 5,838,301 A | 11/1998 | Okamoto et al. |
| 5,838,317 A | 11/1998 | Bolnick et al. |
| 5,848,396 A | 12/1998 | Gerace |
| 5,850,517 A | 12/1998 | Verkler et al. |
| 5,892,900 A | 4/1999 | Ginter et al. |
| 5,903,729 A | 5/1999 | Reber et al. |
| 5,905,942 A | 5/1999 | Stoel et al. |
| 5,907,279 A | 5/1999 | Bruins et al. |
| 5,940,073 A | 8/1999 | Klosterman et al. |
| 5,948,061 A | 9/1999 | Merriman et al. |
| 5,966,705 A | 10/1999 | Koneru et al. |
| 5,977,962 A | 11/1999 | Chapman et al. |
| 5,978,835 A | 11/1999 | Ludwig et al. |
| 6,002,393 A | 12/1999 | Hite et al. |
| 6,002,443 A | 12/1999 | Iggulden |
| 6,009,409 A | 12/1999 | Adler et al. |
| 6,009,410 A | 12/1999 | LeMole et al. |
| 6,026,368 A | 2/2000 | Brown et al. |
| 6,026,369 A | 2/2000 | Capek |
| 6,032,181 A | 2/2000 | Bedgedjian et al. |
| 6,043,817 A | 3/2000 | Bolnick et al. |

(56) References Cited

U.S. PATENT DOCUMENTS

| | | |
|---|---|---|
| 6,055,510 A | 4/2000 | Henrick et al. |
| 6,064,980 A | 5/2000 | Jacobi et al. |
| 6,084,628 A | 7/2000 | Sawyer |
| 6,105,122 A | 8/2000 | Muller et al. |
| 6,112,181 A | 8/2000 | Shear et al. |
| 6,118,864 A | 9/2000 | Chang et al. |
| 6,119,098 A | 9/2000 | Guyot et al. |
| 6,137,892 A | 10/2000 | Powell et al. |
| 6,141,010 A | 10/2000 | Hoyle |
| 6,157,941 A | 12/2000 | Verkler et al. |
| 6,167,427 A | 12/2000 | Rabinovich et al. |
| 6,169,542 B1 | 1/2001 | Hooks et al. |
| 6,188,398 B1 | 2/2001 | Collins-Rector et al. |
| 6,192,476 B1 | 2/2001 | Gong |
| 6,195,696 B1 | 2/2001 | Baber et al. |
| 6,216,141 B1 | 4/2001 | Straub et al. |
| 6,219,696 B1 | 4/2001 | Wynblatt et al. |
| 6,247,077 B1 | 6/2001 | Muller et al. |
| 6,286,104 B1 | 9/2001 | Buhle et al. |
| 6,304,523 B1 | 10/2001 | Jones et al. |
| 6,304,852 B1 | 10/2001 | Loncteaux |
| 6,308,327 B1 | 10/2001 | Liu et al. |
| 6,310,889 B1 | 10/2001 | Parsons et al. |
| 6,332,127 B1 | 12/2001 | Bandera et al. |
| 6,349,289 B1 | 2/2002 | Peterson et al. |
| 6,351,467 B1 | 2/2002 | Dillon |
| 6,360,254 B1 | 3/2002 | Linden et al. |
| 6,381,362 B1 | 4/2002 | Deshpande et al. |
| 6,400,265 B1 | 6/2002 | Saylor et al. |
| 6,400,996 B1 | 6/2002 | Hoffberg et al. |
| 6,438,594 B1 | 8/2002 | Bowman-Amuah |
| 6,463,585 B1 | 10/2002 | Hendricks et al. |
| 6,469,749 B1 | 10/2002 | Dimitrova et al. |
| 6,481,010 B2 | 11/2002 | Nishikawa et al. |
| 6,484,148 B1 | 11/2002 | Boyd |
| 6,505,169 B1 | 1/2003 | Bhagavath et al. |
| 6,526,491 B2 | 2/2003 | Suzuoki et al. |
| 6,530,082 B1 | 3/2003 | Del Sesto et al. |
| 6,532,218 B1 | 3/2003 | Shaffer et al. |
| 6,536,041 B1 | 3/2003 | Knudson et al. |
| 6,546,554 B1 | 4/2003 | Schmidt et al. |
| 6,564,260 B1 | 5/2003 | Baber et al. |
| 6,564,263 B1 | 5/2003 | Bergman et al. |
| 6,574,793 B1 | 6/2003 | Ngo et al. |
| 6,577,346 B1 | 6/2003 | Perlman |
| 6,597,405 B1 | 7/2003 | Iggulden |
| 6,622,171 B2 | 9/2003 | Gupta et al. |
| 6,628,801 B2 | 9/2003 | Powell et al. |
| 6,631,523 B1 | 10/2003 | Matthews, III et al. |
| 6,651,251 B1 | 11/2003 | Shoff et al. |
| 6,718,551 B1 | 4/2004 | Swix et al. |
| 6,728,784 B1 | 4/2004 | Mattaway |
| 6,738,978 B1 | 5/2004 | Hendricks et al. |
| 6,757,685 B2 | 6/2004 | Raffaele et al. |
| 6,769,009 B1 | 7/2004 | Reisman |
| 6,771,316 B1 | 8/2004 | Iggulden |
| 6,799,196 B1 | 9/2004 | Smith |
| 6,804,659 B1 | 10/2004 | Graham et al. |
| 6,832,239 B1 | 12/2004 | Kraft et al. |
| 6,834,308 B1 | 12/2004 | Ikezoye et al. |
| 6,836,888 B1 | 12/2004 | Basu et al. |
| 6,845,452 B1 | 1/2005 | Roddy et al. |
| 6,907,458 B2 | 6/2005 | Tomassetti et al. |
| 6,946,715 B2 | 9/2005 | Hong |
| 6,959,288 B1 | 10/2005 | Medina et al. |
| 6,959,320 B2 | 10/2005 | Shah et al. |
| 6,978,470 B2 | 12/2005 | Swix et al. |
| 6,981,022 B2 | 12/2005 | Boundy |
| 6,983,478 B1 | 1/2006 | Grauch et al. |
| 6,983,481 B2 | 1/2006 | Fellenstein et al. |
| 6,990,453 B2 | 1/2006 | Wang et al. |
| 6,993,326 B2 | 1/2006 | Link, II et al. |
| 7,020,304 B2 | 3/2006 | Alattar et al. |
| 7,028,033 B2 | 4/2006 | Bright et al. |
| 7,028,327 B1 | 4/2006 | Dougherty et al. |
| 7,043,524 B2 | 5/2006 | Shah et al. |
| 7,051,351 B2 | 5/2006 | Goldman et al. |
| 7,064,796 B2 | 6/2006 | Roy et al. |
| 7,080,400 B1 | 7/2006 | Navar |
| 7,088,687 B2 | 8/2006 | Ayyagari et al. |
| 7,089,575 B2 | 8/2006 | Agnihotri et al. |
| 7,089,585 B1 | 8/2006 | Dharmarajan |
| 7,100,183 B2 | 8/2006 | Kunkel et al. |
| 7,111,230 B2 | 9/2006 | Euchner et al. |
| 7,113,090 B1 | 9/2006 | Saylor et al. |
| 7,116,661 B2 | 10/2006 | Patton |
| 7,117,439 B2 | 10/2006 | Barrett et al. |
| 7,136,875 B2 | 11/2006 | Anderson et al. |
| 7,139,882 B2 | 11/2006 | Suzuoki et al. |
| 7,146,627 B1 | 12/2006 | Ismail et al. |
| 7,158,666 B2 | 1/2007 | Deshpande et al. |
| 7,162,539 B2 | 1/2007 | Garcie-Luna-Aceves |
| 7,167,857 B2 | 1/2007 | Roberts |
| 7,181,415 B2 | 2/2007 | Blaser et al. |
| 7,185,353 B2 | 2/2007 | Schlack |
| 7,194,421 B2 | 3/2007 | Conkwright et al. |
| 7,210,157 B2 | 4/2007 | Devara |
| 7,228,280 B1 | 6/2007 | Scherf et al. |
| 7,243,362 B2 | 7/2007 | Swix et al. |
| 7,243,364 B2 | 7/2007 | Dunn et al. |
| 7,296,091 B1 | 11/2007 | Dutta et al. |
| 7,299,195 B1 | 11/2007 | Tawakol et al. |
| 7,308,489 B2 | 12/2007 | Weast |
| 7,328,448 B2 | 2/2008 | Eldering et al. |
| 7,330,875 B1 | 2/2008 | Parasnis et al. |
| 7,346,606 B2 | 3/2008 | Bharat |
| 7,346,649 B1 | 3/2008 | Wong |
| 7,349,967 B2 | 3/2008 | Wang |
| 7,349,980 B1 | 3/2008 | Darugar et al. |
| 7,359,889 B2 | 4/2008 | Wang et al. |
| 7,360,173 B2 | 4/2008 | Tuli |
| 7,366,975 B1 | 4/2008 | Lipton |
| 7,373,381 B2 | 5/2008 | Rust |
| 7,380,258 B2 | 5/2008 | Durden et al. |
| 7,383,243 B2 | 6/2008 | Conkwright et al. |
| 7,421,723 B2 | 9/2008 | Harkness et al. |
| 7,437,301 B2 | 10/2008 | Kageyama et al. |
| 7,444,658 B1 | 10/2008 | Matz et al. |
| 7,444,660 B2 | 10/2008 | Dudkiewicz |
| 7,444,666 B2 | 10/2008 | Edwards et al. |
| 7,454,515 B2 | 11/2008 | Lamkin et al. |
| 7,472,398 B2 | 12/2008 | Corell et al. |
| 7,486,827 B2 | 2/2009 | Kim |
| 7,500,007 B2 | 3/2009 | Ikezoye et al. |
| 7,509,402 B2 | 3/2009 | Moorer et al. |
| 7,516,074 B2 | 4/2009 | Bilobrov |
| 7,516,213 B2 | 4/2009 | Cunningham et al. |
| 7,525,955 B2 | 4/2009 | Velez-Rivera et al. |
| 7,529,659 B2 | 5/2009 | Wold |
| 7,545,940 B2 | 6/2009 | Alessi et al. |
| 7,546,619 B2 | 6/2009 | Anderson et al. |
| 7,552,228 B2 | 6/2009 | Parasnis et al. |
| 7,555,165 B2 | 6/2009 | Luo et al. |
| 7,559,017 B2 | 7/2009 | Datar et al. |
| 7,565,158 B1 | 7/2009 | Aholainen |
| 7,574,723 B2 | 8/2009 | Putterman et al. |
| 7,584,491 B2 | 9/2009 | Bruckner et al. |
| 7,590,998 B2 | 9/2009 | Hanley |
| 7,593,988 B2 | 9/2009 | Oreizy et al. |
| 7,596,620 B1 | 9/2009 | Colton et al. |
| 7,602,748 B2 | 10/2009 | Sinnreich et al. |
| 7,623,823 B2 | 11/2009 | Zito et al. |
| 7,624,142 B2 | 11/2009 | Jungck |
| 7,631,325 B2 | 12/2009 | Rys et al. |
| 7,634,533 B2 | 12/2009 | Rudolph et al. |
| 7,639,387 B2 | 12/2009 | Hull et al. |
| 7,650,616 B2 | 1/2010 | Lee |
| 7,653,008 B2 | 1/2010 | Patrick et al. |
| 7,664,081 B2 | 2/2010 | Luoma et al. |
| 7,665,082 B2 | 2/2010 | Wyatt et al. |
| 7,672,003 B2 | 3/2010 | Dowling et al. |
| 7,689,920 B2 | 3/2010 | Robbin et al. |
| 7,690,006 B2 | 3/2010 | Birnbaum et al. |
| 7,694,319 B1 | 4/2010 | Hassell et al. |

(56) References Cited

U.S. PATENT DOCUMENTS

| | | |
|---|---|---|
| 7,698,165 B1 | 4/2010 | Tawakol et al. |
| 7,701,882 B2 | 4/2010 | Jones et al. |
| 7,711,748 B2 | 5/2010 | Bright et al. |
| 7,711,838 B1 | 5/2010 | Boulter et al. |
| 7,716,161 B2 | 5/2010 | Dean et al. |
| 7,720,914 B2 | 5/2010 | Goodman et al. |
| 7,729,366 B2 | 6/2010 | Mok et al. |
| 7,734,624 B2 | 6/2010 | Anderson et al. |
| 7,739,140 B2 | 6/2010 | Vinson et al. |
| 7,769,756 B2 | 8/2010 | Krikorian et al. |
| 7,774,348 B2 | 8/2010 | Delli Santi et al. |
| 7,774,715 B1 | 8/2010 | Evans |
| 7,789,757 B2 | 9/2010 | Gemelos et al. |
| 7,793,318 B2 | 9/2010 | Deng |
| 7,797,433 B2 | 9/2010 | Kennedy et al. |
| 7,805,740 B2 | 9/2010 | Gilboa et al. |
| 7,822,809 B2 | 10/2010 | Dhupelia et al. |
| 7,831,426 B2 | 11/2010 | Bennett |
| 7,856,644 B2 | 12/2010 | Nicholson et al. |
| 7,861,260 B2 | 12/2010 | Shkedi |
| 7,870,592 B2 | 1/2011 | Hudson et al. |
| 7,870,596 B2 | 1/2011 | Schackow et al. |
| 7,873,716 B2 | 1/2011 | Maes |
| 7,877,461 B1 | 1/2011 | Rimmer |
| 7,877,774 B1 | 1/2011 | Basso et al. |
| 7,890,957 B2 | 2/2011 | Campbell |
| 7,904,503 B2 | 3/2011 | Van De Sluis |
| 7,904,925 B2 | 3/2011 | Jiang |
| 7,907,211 B2 | 3/2011 | Oostveen et al. |
| 7,908,273 B2 | 3/2011 | DiMaria et al. |
| 7,908,618 B2 | 3/2011 | Bruckner et al. |
| 7,912,822 B2 | 3/2011 | Bethlehem et al. |
| 7,921,037 B2 | 4/2011 | Hertling et al. |
| 7,929,551 B2 | 4/2011 | Dietrich et al. |
| 7,930,207 B2 | 4/2011 | Merriman et al. |
| 7,930,546 B2 | 4/2011 | Rhoads et al. |
| 7,933,451 B2 | 4/2011 | Kloer |
| 7,937,405 B2 | 5/2011 | Anderson et al. |
| 7,941,197 B2 | 5/2011 | Jain et al. |
| 7,941,816 B2 | 5/2011 | Harkness et al. |
| 7,950,055 B2 | 5/2011 | Blinn et al. |
| 7,962,007 B2 | 6/2011 | Abe et al. |
| 7,966,309 B2 | 6/2011 | Shacham et al. |
| 7,978,876 B2 | 7/2011 | Powell et al. |
| 7,979,570 B2 | 7/2011 | Chapweske et al. |
| 7,995,503 B2 | 8/2011 | Yu |
| 8,001,124 B2 | 8/2011 | Svendsen |
| 8,020,000 B2 | 9/2011 | Oostveen et al. |
| 8,035,656 B2 | 10/2011 | Blanchard et al. |
| 8,041,643 B2 | 10/2011 | Mukerji et al. |
| 8,046,839 B2 | 10/2011 | Lo |
| 8,055,784 B2 | 11/2011 | Kalama et al. |
| 8,060,399 B2 | 11/2011 | Ullah |
| 8,060,912 B2 | 11/2011 | Sato |
| 8,065,700 B2 | 11/2011 | Lee |
| 8,069,247 B2 | 11/2011 | Ruiz-Velasco et al. |
| 8,069,348 B2 | 11/2011 | Bacon |
| 8,071,869 B2 | 12/2011 | Chen et al. |
| 8,079,045 B2 | 12/2011 | Krapf et al. |
| 8,087,047 B2 | 12/2011 | Olague et al. |
| 8,090,706 B2 | 1/2012 | Bharat |
| 8,091,031 B2 | 1/2012 | Evans |
| 8,122,484 B2 | 2/2012 | Karjoth et al. |
| 8,126,963 B1 | 2/2012 | Rimmer |
| 8,131,585 B2 | 3/2012 | Nicholas et al. |
| 8,131,705 B2 | 3/2012 | Chevalier et al. |
| 8,131,734 B2 | 3/2012 | Austin et al. |
| 8,140,965 B2 | 3/2012 | Dean et al. |
| 8,141,111 B2 | 3/2012 | Gilley et al. |
| 8,145,645 B2 | 3/2012 | Delli Santi et al. |
| 8,145,705 B1 | 3/2012 | Rust |
| 8,150,729 B2 | 4/2012 | Wilhelm |
| 8,150,985 B2 | 4/2012 | Nakamura |
| 8,155,696 B2 | 4/2012 | Swanburg et al. |
| 8,161,511 B2 | 4/2012 | Kwak et al. |
| 8,171,030 B2 | 5/2012 | Pereira et al. |
| 8,171,510 B2 | 5/2012 | Kamen et al. |
| 8,175,413 B1 | 5/2012 | Ioffe et al. |
| 8,180,708 B2 | 5/2012 | Hurtado et al. |
| 8,180,891 B1 | 5/2012 | Harrison |
| 8,189,945 B2 | 5/2012 | Stojancic et al. |
| 8,191,091 B2 | 5/2012 | Harvey et al. |
| 8,195,689 B2 | 6/2012 | Ramanathan et al. |
| 8,195,692 B2 | 6/2012 | Baek et al. |
| 8,201,080 B2 | 6/2012 | Basson et al. |
| 8,209,397 B2 | 6/2012 | Ahn et al. |
| 8,209,404 B2 | 6/2012 | Wu |
| 8,214,256 B2 | 7/2012 | Riedl et al. |
| 8,219,411 B2 | 7/2012 | Matz et al. |
| 8,225,347 B1 | 7/2012 | Flickinger et al. |
| 8,229,227 B2 | 7/2012 | Stojancic et al. |
| 8,229,751 B2 | 7/2012 | Cheung |
| 8,239,340 B2 | 8/2012 | Hanson |
| 8,244,707 B2 | 8/2012 | Lin et al. |
| 8,245,270 B2 | 8/2012 | Cooperstein et al. |
| 8,255,949 B1 | 8/2012 | Bayer et al. |
| 8,260,665 B2 | 9/2012 | Foladare et al. |
| 8,261,341 B2 | 9/2012 | Stirbu |
| 8,271,649 B2 | 9/2012 | Kalofonos et al. |
| 8,275,791 B2 | 9/2012 | Raffaele et al. |
| 8,281,288 B1 | 10/2012 | Spencer |
| 8,285,880 B2 | 10/2012 | Ye et al. |
| 8,290,351 B2 | 10/2012 | Plotnick et al. |
| 8,296,763 B1 | 10/2012 | Peercy et al. |
| 8,301,596 B2 | 10/2012 | Lin et al. |
| 8,301,732 B2 | 10/2012 | Chapweske et al. |
| 8,302,170 B2 | 10/2012 | Kramer et al. |
| 8,307,093 B2 | 11/2012 | Klemets et al. |
| 8,316,450 B2 | 11/2012 | Robinson et al. |
| 8,326,872 B2 | 12/2012 | Zwilling et al. |
| 8,332,885 B2 | 12/2012 | Williamson et al. |
| 8,335,786 B2 | 12/2012 | Pereira et al. |
| 8,339,991 B2 | 12/2012 | Biswas et al. |
| 8,341,242 B2 | 12/2012 | Dillon et al. |
| 8,352,980 B2 | 1/2013 | Howcroft |
| 8,355,711 B2 | 1/2013 | Heins et al. |
| 8,358,966 B2 | 1/2013 | Zito et al. |
| 8,364,541 B2 | 1/2013 | Roth |
| 8,364,703 B2 | 1/2013 | Ramanathan et al. |
| 8,364,959 B2 | 1/2013 | Bhanoo et al. |
| 8,365,217 B2 | 1/2013 | Legrand |
| 8,375,131 B2 | 2/2013 | Rogers et al. |
| 8,381,026 B2 | 2/2013 | Talla et al. |
| 8,385,644 B2 | 2/2013 | Stojancic |
| 8,406,607 B2 | 3/2013 | Nesvadba et al. |
| 8,407,240 B2 | 3/2013 | Denton |
| 8,418,191 B2 | 4/2013 | Honishi et al. |
| 8,433,306 B2 | 4/2013 | Rodriguez |
| 8,433,574 B2 | 4/2013 | Jablokov et al. |
| 8,443,420 B2 | 5/2013 | Brown et al. |
| 8,451,762 B2 | 5/2013 | Liu et al. |
| 8,452,864 B1 | 5/2013 | Vendrow |
| 8,463,100 B2 | 6/2013 | Tse et al. |
| 8,468,357 B2 | 6/2013 | Roberts et al. |
| 8,472,289 B2 | 6/2013 | Scherf et al. |
| 8,473,575 B2 | 6/2013 | Marchwicki et al. |
| 8,479,246 B2 | 7/2013 | Hudson et al. |
| 8,488,838 B2 | 7/2013 | Sharma |
| 8,489,701 B2 | 7/2013 | Manion et al. |
| 8,494,907 B2 | 7/2013 | Lerman et al. |
| 8,495,611 B2 | 7/2013 | McCarthy et al. |
| 8,495,675 B1 | 7/2013 | Philpott et al. |
| 8,495,746 B2 | 7/2013 | Fissel et al. |
| 8,504,551 B2 | 8/2013 | Anderson et al. |
| 8,510,317 B2 | 8/2013 | Boetje et al. |
| 8,510,661 B2 | 8/2013 | Dharmaji et al. |
| 8,510,779 B2 | 8/2013 | Slothouber et al. |
| 8,516,533 B2 | 8/2013 | Davis et al. |
| 8,520,909 B2 | 8/2013 | Leung et al. |
| 8,527,594 B2 | 9/2013 | Lahaix |
| 8,533,192 B2 | 9/2013 | Moganti et al. |
| 8,537,157 B2 | 9/2013 | Adimatyam et al. |
| 8,539,025 B2 | 9/2013 | Husain et al. |
| 8,539,072 B1 | 9/2013 | Harrison |

(56) References Cited

U.S. PATENT DOCUMENTS

| | | |
|---|---|---|
| 8,539,523 B2 | 9/2013 | Philpott et al. |
| 8,548,820 B2 | 10/2013 | Matz et al. |
| 8,549,052 B2 | 10/2013 | Miles |
| 8,549,066 B1 | 10/2013 | Donahue et al. |
| 8,549,110 B2 | 10/2013 | Jerbi et al. |
| 8,549,550 B2 | 10/2013 | Lopatecki et al. |
| 8,566,154 B2 | 10/2013 | Merriman et al. |
| 8,566,158 B2 | 10/2013 | Cansler et al. |
| 8,566,867 B1 | 10/2013 | Yang et al. |
| 8,577,996 B2 | 11/2013 | Hughes et al. |
| 8,595,781 B2 | 11/2013 | Neumeier et al. |
| 8,607,267 B2 | 12/2013 | Shkedi |
| 8,611,701 B2 | 12/2013 | Zhang |
| 8,613,045 B1 | 12/2013 | Shigapov |
| 8,621,585 B2 | 12/2013 | Danieli et al. |
| 8,635,106 B2 | 1/2014 | Sarukkai et al. |
| 8,635,316 B2 | 1/2014 | Barnhill, Jr. |
| 8,639,826 B2 | 1/2014 | Slothouber et al. |
| 8,645,209 B2 | 2/2014 | Mandyam et al. |
| 8,645,992 B2 | 2/2014 | Russell et al. |
| 8,645,994 B2 | 2/2014 | Vemparala et al. |
| 8,646,063 B2 | 2/2014 | Dowlatkhah |
| 8,655,716 B1 | 2/2014 | Barnes et al. |
| 8,656,422 B2 | 2/2014 | Kumar et al. |
| 8,661,010 B2 | 2/2014 | Lin et al. |
| 8,666,168 B2 | 3/2014 | Stojancic et al. |
| 8,667,142 B2 | 3/2014 | Takei et al. |
| 8,677,253 B2 | 3/2014 | Duquene et al. |
| 8,694,656 B2 | 4/2014 | Douillet et al. |
| 8,695,032 B2 | 4/2014 | Shkedi |
| 8,700,699 B2 | 4/2014 | Shen et al. |
| 8,700,795 B2 | 4/2014 | Boulter et al. |
| 8,701,134 B2 | 4/2014 | Whinmill et al. |
| 8,707,351 B2 | 4/2014 | Dharmaji |
| 8,712,833 B2 | 4/2014 | Quach et al. |
| 8,719,396 B2 | 5/2014 | Brindley et al. |
| 8,719,870 B1 | 5/2014 | Davies et al. |
| 8,732,182 B2 | 5/2014 | Bethlehem et al. |
| 8,736,764 B2 | 5/2014 | Amundsen |
| 8,738,779 B2 | 5/2014 | Binding et al. |
| 8,739,208 B2 | 5/2014 | Davis et al. |
| 8,745,272 B2 | 6/2014 | Casalaina et al. |
| 8,751,942 B2 | 6/2014 | Lopez et al. |
| 8,756,686 B2 | 6/2014 | Plattner et al. |
| 8,763,033 B2 | 6/2014 | Dittus |
| 8,763,097 B2 | 6/2014 | Bhatnagar et al. |
| 8,769,584 B2 | 7/2014 | Neumeier et al. |
| 8,775,391 B2 | 7/2014 | Kalavade |
| 8,776,112 B2 | 7/2014 | Roberts et al. |
| 8,776,154 B2 | 7/2014 | Kim et al. |
| 8,776,244 B2 | 7/2014 | Kroeger et al. |
| 8,793,730 B2 | 7/2014 | Mowrey et al. |
| 8,799,357 B2 | 8/2014 | Clift et al. |
| 8,804,039 B2 | 8/2014 | Kim et al. |
| 8,804,721 B2 | 8/2014 | He et al. |
| 8,805,657 B2 | 8/2014 | Wells et al. |
| 8,805,854 B2 | 8/2014 | Chen et al. |
| 8,812,451 B2 | 8/2014 | Shukla et al. |
| 8,813,232 B2 | 8/2014 | Sreedharan et al. |
| 8,817,757 B2 | 8/2014 | Luo |
| 8,819,249 B2 | 8/2014 | Harrison |
| 8,819,255 B1 * | 8/2014 | Harrison ............... H04L 67/42 709/229 |
| 8,825,526 B2 | 9/2014 | Peters et al. |
| 8,826,327 B2 | 9/2014 | Adimatyam et al. |
| 8,832,729 B2 | 9/2014 | Nussel et al. |
| 8,838,149 B2 | 9/2014 | Hasek |
| 8,838,556 B1 | 9/2014 | Reiner et al. |
| 8,838,808 B2 | 9/2014 | Addala et al. |
| 8,843,584 B2 | 9/2014 | Arini et al. |
| 8,847,994 B2 | 9/2014 | Choi |
| 8,849,821 B2 | 9/2014 | Schloter |
| 8,855,796 B2 | 10/2014 | Otsuka et al. |
| 8,855,798 B2 | 10/2014 | DiMaria et al. |
| 8,856,028 B2 | 10/2014 | Yang et al. |
| 8,856,087 B2 | 10/2014 | Greene et al. |
| 8,856,874 B2 | 10/2014 | Pieczul et al. |
| 8,863,165 B2 | 10/2014 | Gordon |
| 8,863,168 B2 | 10/2014 | Craner |
| 8,863,174 B2 | 10/2014 | Neil et al. |
| 8,875,178 B2 | 10/2014 | Cansler et al. |
| 8,898,714 B2 | 11/2014 | Neumeier et al. |
| 8,904,021 B2 | 12/2014 | Harrison |
| 8,910,199 B2 | 12/2014 | Slaney et al. |
| 8,930,980 B2 | 1/2015 | Neumeier et al. |
| 8,949,872 B2 | 2/2015 | Slaney et al. |
| 8,966,525 B2 | 2/2015 | Mehta et al. |
| 8,972,485 B1 | 3/2015 | French et al. |
| 8,996,538 B1 | 3/2015 | Cremer et al. |
| 8,997,164 B2 | 3/2015 | Gordon et al. |
| 9,009,066 B2 | 4/2015 | Long et al. |
| 9,015,741 B2 | 4/2015 | Gordon |
| 9,026,668 B2 * | 5/2015 | Harrison ............... H04L 67/42 709/229 |
| 9,032,451 B2 | 5/2015 | Cansino et al. |
| 9,036,083 B1 | 5/2015 | Zhu et al. |
| 9,043,712 B2 | 5/2015 | Santoro et al. |
| 9,049,496 B2 | 6/2015 | Raesig et al. |
| 9,055,309 B2 | 6/2015 | Neumeier et al. |
| 9,106,804 B2 | 8/2015 | Roberts et al. |
| 9,113,107 B2 | 8/2015 | Jolna et al. |
| 9,118,945 B2 | 8/2015 | Rudman et al. |
| 9,131,279 B2 | 9/2015 | Raveendran et al. |
| 9,143,718 B2 | 9/2015 | Nagorski et al. |
| 9,146,990 B2 | 9/2015 | Scherf et al. |
| 9,152,727 B1 | 10/2015 | Balducci et al. |
| 9,154,942 B2 | 10/2015 | Harrison et al. |
| 9,160,837 B2 | 10/2015 | Jeffrey et al. |
| 9,167,419 B2 | 10/2015 | Harrison |
| 9,183,560 B2 | 11/2015 | Abelow |
| 9,185,462 B2 | 11/2015 | Das et al. |
| 9,204,275 B2 | 12/2015 | Johnson et al. |
| 9,213,747 B2 | 12/2015 | Cremer et al. |
| 9,215,217 B2 | 12/2015 | Abu-Hakima et al. |
| 9,232,279 B2 | 1/2016 | Beeson et al. |
| 9,258,383 B2 | 2/2016 | Harrison |
| 9,271,052 B2 | 2/2016 | Holden |
| 9,286,902 B2 | 3/2016 | Han et al. |
| 9,300,996 B2 | 3/2016 | Jeong et al. |
| 9,323,840 B2 | 4/2016 | Harron et al. |
| 9,356,914 B2 | 5/2016 | Jeffrey et al. |
| 9,361,606 B2 | 6/2016 | Hertel et al. |
| 9,372,531 B2 | 6/2016 | Benson et al. |
| 9,378,512 B2 | 6/2016 | Singh et al. |
| 9,380,383 B2 | 6/2016 | Brenner et al. |
| 9,386,356 B2 * | 7/2016 | Harrison ............ H04N 21/8352 |
| 9,398,262 B2 | 7/2016 | Li et al. |
| 9,465,995 B2 | 10/2016 | Harron et al. |
| 9,495,451 B2 | 11/2016 | Harron |
| 9,501,568 B2 | 11/2016 | Rafii |
| 9,510,044 B1 | 11/2016 | Pereira et al. |
| 9,510,057 B2 | 11/2016 | Harron et al. |
| 2001/0001160 A1 | 5/2001 | Shoff et al. |
| 2001/0011226 A1 | 8/2001 | Greer et al. |
| 2001/0016501 A1 | 8/2001 | King |
| 2001/0016947 A1 | 8/2001 | Nishikawa et al. |
| 2001/0029583 A1 | 10/2001 | Palatov et al. |
| 2001/0036224 A1 | 11/2001 | Demelloet et al. |
| 2001/0039658 A1 | 11/2001 | Walton |
| 2001/0049620 A1 | 12/2001 | Blasko |
| 2001/0054155 A1 | 12/2001 | Hagan et al. |
| 2002/0012347 A1 | 1/2002 | Fitzpatrick |
| 2002/0015105 A1 | 2/2002 | Abe et al. |
| 2002/0019769 A1 | 2/2002 | Barritz et al. |
| 2002/0026635 A1 | 2/2002 | Wheeler et al. |
| 2002/0032906 A1 | 3/2002 | Grossman |
| 2002/0042914 A1 | 4/2002 | Walker et al. |
| 2002/0044659 A1 | 4/2002 | Ohta |
| 2002/0044683 A1 | 4/2002 | Deshpande et al. |
| 2002/0052965 A1 | 5/2002 | Dowling |
| 2002/0059633 A1 | 5/2002 | Harkness et al. |
| 2002/0066100 A1 | 5/2002 | Hoang |
| 2002/0069100 A1 | 6/2002 | Arberman |
| 2002/0072966 A1 | 6/2002 | Eldering et al. |

(56) References Cited

U.S. PATENT DOCUMENTS

| | | |
|---|---|---|
| 2002/0072982 A1 | 6/2002 | Barton et al. |
| 2002/0078456 A1 | 6/2002 | Hudson et al. |
| 2002/0083435 A1 | 6/2002 | Blasko et al. |
| 2002/0083441 A1 | 6/2002 | Flickinger et al. |
| 2002/0083443 A1 | 6/2002 | Eldering et al. |
| 2002/0087401 A1 | 7/2002 | Leapman et al. |
| 2002/0087545 A1 | 7/2002 | Bright et al. |
| 2002/0087975 A1 | 7/2002 | Schlack |
| 2002/0087976 A1 | 7/2002 | Kaplan et al. |
| 2002/0087978 A1 | 7/2002 | Nicholson et al. |
| 2002/0091763 A1 | 7/2002 | Shah et al. |
| 2002/0104083 A1 | 8/2002 | Hendricks et al. |
| 2002/0116195 A1 | 8/2002 | Pitman et al. |
| 2002/0116549 A1 | 8/2002 | Raffaele et al. |
| 2002/0120498 A1 | 8/2002 | Gordon et al. |
| 2002/0120925 A1 | 8/2002 | Logan |
| 2002/0123928 A1 | 9/2002 | Eldering et al. |
| 2002/0133490 A1 | 9/2002 | Conkwright et al. |
| 2002/0133534 A1 | 9/2002 | Forslow |
| 2002/0138842 A1 | 9/2002 | Chong et al. |
| 2002/0143782 A1 | 10/2002 | Headings et al. |
| 2002/0144262 A1 | 10/2002 | Plotnick et al. |
| 2002/0147611 A1 | 10/2002 | Greene et al. |
| 2002/0151992 A1 | 10/2002 | Hoffberg et al. |
| 2002/0152474 A1 | 10/2002 | Dudkiewicz |
| 2002/0161741 A1 | 10/2002 | Wang et al. |
| 2002/0162117 A1 | 10/2002 | Pearson et al. |
| 2002/0162118 A1 | 10/2002 | Levy et al. |
| 2002/0174197 A1 | 11/2002 | Schimke et al. |
| 2002/0178447 A1 | 11/2002 | Plotnick et al. |
| 2002/0196789 A1 | 12/2002 | Patton |
| 2003/0001883 A1 | 1/2003 | Wang |
| 2003/0009538 A1 | 1/2003 | Shah et al. |
| 2003/0023489 A1 | 1/2003 | McGuire et al. |
| 2003/0028433 A1 | 2/2003 | Merriman et al. |
| 2003/0030752 A1 | 2/2003 | Begeja et al. |
| 2003/0031176 A1 | 2/2003 | Sim |
| 2003/0036949 A1 | 2/2003 | Kaddeche et al. |
| 2003/0070167 A1 | 4/2003 | Holtz et al. |
| 2003/0079226 A1 | 4/2003 | Barrett |
| 2003/0097426 A1 | 5/2003 | Parry |
| 2003/0097657 A1 | 5/2003 | Zhou et al. |
| 2003/0101451 A1 | 5/2003 | Bentolila et al. |
| 2003/0101454 A1 | 5/2003 | Ozer et al. |
| 2003/0121037 A1 | 6/2003 | Swix et al. |
| 2003/0121046 A1 | 6/2003 | Roy et al. |
| 2003/0135513 A1 | 7/2003 | Quinn et al. |
| 2003/0135853 A1 | 7/2003 | Goldman et al. |
| 2003/0145323 A1 | 7/2003 | Hendricks et al. |
| 2003/0149975 A1 | 8/2003 | Eldering et al. |
| 2003/0154475 A1 | 8/2003 | Rodriguez et al. |
| 2003/0163583 A1 | 8/2003 | Tarr |
| 2003/0163828 A1 | 8/2003 | Agnihotri et al. |
| 2003/0172374 A1 | 9/2003 | Vinson et al. |
| 2003/0188318 A1 | 10/2003 | Liew et al. |
| 2003/0188321 A1 | 10/2003 | Shoff et al. |
| 2003/0226141 A1 | 12/2003 | Krasnow et al. |
| 2003/0229765 A1 | 12/2003 | Suzuoki et al. |
| 2004/0006693 A1 | 1/2004 | Vasnani et al. |
| 2004/0006706 A1 | 1/2004 | Erlingsson |
| 2004/0025034 A1 | 2/2004 | Alessi et al. |
| 2004/0025174 A1 | 2/2004 | Cerrato |
| 2004/0031052 A1 | 2/2004 | Wannamaker et al. |
| 2004/0045020 A1 | 3/2004 | Witt et al. |
| 2004/0059708 A1 | 3/2004 | Dean et al. |
| 2004/0078809 A1 | 4/2004 | Drazin |
| 2004/0088348 A1 | 5/2004 | Yeager et al. |
| 2004/0143349 A1 | 7/2004 | Roberts et al. |
| 2004/0148625 A1 | 7/2004 | Eldering et al. |
| 2004/0158858 A1 | 8/2004 | Paxton et al. |
| 2004/0163101 A1 | 8/2004 | Swix et al. |
| 2004/0207719 A1 | 10/2004 | Tervo et al. |
| 2004/0210630 A1 | 10/2004 | Simonnet et al. |
| 2004/0215509 A1 | 10/2004 | Perry |
| 2004/0215515 A1 | 10/2004 | Perry |
| 2004/0216171 A1 | 10/2004 | Barone et al. |
| 2004/0225686 A1 | 11/2004 | Li et al. |
| 2004/0226035 A1 | 11/2004 | Hauser |
| 2004/0237102 A1 | 11/2004 | Konig et al. |
| 2004/0240562 A1 | 12/2004 | Bargeron et al. |
| 2004/0260791 A1 | 12/2004 | Jerbi et al. |
| 2004/0267723 A1 | 12/2004 | Bharat |
| 2005/0002640 A1 | 1/2005 | Putterman et al. |
| 2005/0015795 A1 | 1/2005 | Iggulden |
| 2005/0015796 A1 | 1/2005 | Bruckner et al. |
| 2005/0021670 A1 | 1/2005 | Maes |
| 2005/0028200 A1 | 2/2005 | Sardera |
| 2005/0028201 A1 | 2/2005 | Klosterman et al. |
| 2005/0028206 A1 | 2/2005 | Cameron et al. |
| 2005/0071224 A1 | 3/2005 | Fikes et al. |
| 2005/0080876 A1 | 4/2005 | Peiffer et al. |
| 2005/0080878 A1 | 4/2005 | Cunningham et al. |
| 2005/0091301 A1 | 4/2005 | Oreizy et al. |
| 2005/0108213 A1 | 5/2005 | Riise et al. |
| 2005/0108745 A1 | 5/2005 | Linzer |
| 2005/0120391 A1 | 6/2005 | Haynie et al. |
| 2005/0165696 A1 | 7/2005 | Jakobsson et al. |
| 2005/0183143 A1 | 8/2005 | Anderholm et al. |
| 2005/0204381 A1 | 9/2005 | Ludvig et al. |
| 2005/0210502 A1 | 9/2005 | Flickinger et al. |
| 2005/0232411 A1 | 10/2005 | Srinivasan et al. |
| 2005/0235318 A1 | 10/2005 | Grauch et al. |
| 2005/0251491 A1 | 11/2005 | Medina et al. |
| 2005/0251577 A1 | 11/2005 | Guo et al. |
| 2005/0251820 A1 | 11/2005 | Stefanik et al. |
| 2005/0259819 A1 | 11/2005 | Oomen et al. |
| 2005/0267896 A1 | 12/2005 | Goodman et al. |
| 2005/0283796 A1 | 12/2005 | Flickinger |
| 2006/0029368 A1 | 2/2006 | Harville |
| 2006/0031381 A1 | 2/2006 | Van Luijt et al. |
| 2006/0064299 A1 | 3/2006 | Uhle et al. |
| 2006/0064583 A1 | 3/2006 | Birnbaum et al. |
| 2006/0072144 A1 | 4/2006 | Dowling et al. |
| 2006/0072542 A1 | 4/2006 | Sinnreich et al. |
| 2006/0085383 A1 | 4/2006 | Mantle et al. |
| 2006/0085642 A1 | 4/2006 | Multerer et al. |
| 2006/0092834 A1 | 5/2006 | Honishi et al. |
| 2006/0133414 A1 | 6/2006 | Luoma et al. |
| 2006/0136964 A1 | 6/2006 | Diez et al. |
| 2006/0143188 A1 | 6/2006 | Bright et al. |
| 2006/0149624 A1 | 7/2006 | Baluja et al. |
| 2006/0153296 A1 | 7/2006 | Deng |
| 2006/0156362 A1 | 7/2006 | Perrot |
| 2006/0168291 A1 | 7/2006 | van Zoest et al. |
| 2006/0168616 A1 | 7/2006 | Candelore |
| 2006/0195860 A1 | 8/2006 | Eldering et al. |
| 2006/0212908 A1 | 9/2006 | Hunter et al. |
| 2006/0218617 A1 | 9/2006 | Bradstreet et al. |
| 2006/0230130 A1 | 10/2006 | Cho et al. |
| 2006/0245724 A1 | 11/2006 | Hwang et al. |
| 2006/0247011 A1 | 11/2006 | Gagner |
| 2006/0247937 A1 | 11/2006 | Binding et al. |
| 2006/0248558 A1 | 11/2006 | Barton et al. |
| 2006/0253330 A1 | 11/2006 | Maggio et al. |
| 2006/0265493 A1 | 11/2006 | Brindley et al. |
| 2006/0287912 A1 | 12/2006 | Raghuvamshi |
| 2007/0016918 A1* | 1/2007 | Alcorn ............ G06F 17/30743 725/22 |
| 2007/0047781 A1 | 3/2007 | Hull et al. |
| 2007/0050832 A1 | 3/2007 | Wright et al. |
| 2007/0050854 A1 | 3/2007 | Cooperstein et al. |
| 2007/0056008 A1 | 3/2007 | Nagamoto et al. |
| 2007/0061724 A1 | 3/2007 | Slothouber et al. |
| 2007/0061831 A1 | 3/2007 | Savoor et al. |
| 2007/0072676 A1 | 3/2007 | Baluja |
| 2007/0073581 A1 | 3/2007 | Kempe et al. |
| 2007/0078706 A1 | 4/2007 | Datta et al. |
| 2007/0083908 A1 | 4/2007 | McCarthy et al. |
| 2007/0088801 A1 | 4/2007 | Levkovitz et al. |
| 2007/0088852 A1 | 4/2007 | Levkovitz |
| 2007/0089158 A1 | 4/2007 | Clark et al. |
| 2007/0100690 A1 | 5/2007 | Hopkins |
| 2007/0106405 A1 | 5/2007 | Cook et al. |
| 2007/0106721 A1 | 5/2007 | Schloter |

(56) References Cited

U.S. PATENT DOCUMENTS

| | | |
|---|---|---|
| 2007/0108721 A1 | 5/2007 | Bayne et al. |
| 2007/0109449 A1 | 5/2007 | Cheung |
| 2007/0113243 A1 | 5/2007 | Brey |
| 2007/0113263 A1 | 5/2007 | Chatani |
| 2007/0116365 A1 | 5/2007 | Kloer |
| 2007/0124756 A1 | 5/2007 | Covell et al. |
| 2007/0129108 A1 | 6/2007 | Swanburg et al. |
| 2007/0143796 A1 | 6/2007 | Malik |
| 2007/0156726 A1 | 7/2007 | Levy |
| 2007/0157231 A1 | 7/2007 | Eldering et al. |
| 2007/0168389 A1 | 7/2007 | Lipscomb |
| 2007/0174059 A1 | 7/2007 | Rhoads et al. |
| 2007/0180459 A1 | 8/2007 | Smithpeters et al. |
| 2007/0186240 A1 | 8/2007 | Ward et al. |
| 2007/0192450 A1 | 8/2007 | Lewis |
| 2007/0198339 A1 | 8/2007 | Shen et al. |
| 2007/0208619 A1 | 9/2007 | Branam et al. |
| 2007/0208711 A1 | 9/2007 | Rhoads et al. |
| 2007/0220024 A1 | 9/2007 | Putterman et al. |
| 2007/0220575 A1 | 9/2007 | Cooper et al. |
| 2007/0234382 A1 | 10/2007 | Swix et al. |
| 2007/0244750 A1 | 10/2007 | Grannan et al. |
| 2007/0250590 A1 | 10/2007 | Flannery et al. |
| 2007/0250716 A1 | 10/2007 | Brunk et al. |
| 2007/0253594 A1 | 11/2007 | Lu et al. |
| 2007/0260520 A1 | 11/2007 | Jha et al. |
| 2007/0266403 A1 | 11/2007 | Ou et al. |
| 2007/0271300 A1 | 11/2007 | Ramaswamy |
| 2007/0274537 A1 | 11/2007 | Srinivasan |
| 2007/0283384 A1 | 12/2007 | Haeuser et al. |
| 2007/0283402 A1 | 12/2007 | Yu |
| 2007/0288985 A1 | 12/2007 | Candelore et al. |
| 2007/0291747 A1 | 12/2007 | Stern et al. |
| 2007/0291761 A1 | 12/2007 | Kauniskangas et al. |
| 2007/0300264 A1 | 12/2007 | Turner |
| 2007/0300273 A1 | 12/2007 | Turner |
| 2007/0300280 A1 | 12/2007 | Turner et al. |
| 2008/0004957 A1 | 1/2008 | Hildreth et al. |
| 2008/0010133 A1 | 1/2008 | Pyhalammi et al. |
| 2008/0040666 A1 | 2/2008 | Wang et al. |
| 2008/0040767 A1 | 2/2008 | McCarthy et al. |
| 2008/0046945 A1 | 2/2008 | Hanley |
| 2008/0052195 A1 | 2/2008 | Roth et al. |
| 2008/0059285 A1 | 3/2008 | Hamoui |
| 2008/0060002 A1 | 3/2008 | Noll et al. |
| 2008/0066080 A1 | 3/2008 | Campbell |
| 2008/0066098 A1 | 3/2008 | Witteman et al. |
| 2008/0089551 A1 | 4/2008 | Heather et al. |
| 2008/0109376 A1 | 5/2008 | Walsh et al. |
| 2008/0109844 A1 | 5/2008 | Baldeschwieler et al. |
| 2008/0109888 A1 | 5/2008 | Ullah |
| 2008/0127263 A1 | 5/2008 | Klosterman et al. |
| 2008/0140476 A1 | 6/2008 | Anand et al. |
| 2008/0154678 A1 | 6/2008 | Botelho |
| 2008/0155588 A1 | 6/2008 | Roberts et al. |
| 2008/0155591 A1 | 6/2008 | Mahajan et al. |
| 2008/0155627 A1 | 6/2008 | O'Connor et al. |
| 2008/0172243 A1 | 7/2008 | Kelly |
| 2008/0172747 A1 | 7/2008 | Hurtado et al. |
| 2008/0174570 A1 | 7/2008 | Jobs et al. |
| 2008/0181225 A1 | 7/2008 | Zampiello |
| 2008/0186933 A1 | 8/2008 | Willman et al. |
| 2008/0189757 A1 | 8/2008 | Schackow et al. |
| 2008/0195457 A1 | 8/2008 | Sherman et al. |
| 2008/0195749 A1 | 8/2008 | Krig |
| 2008/0201222 A1 | 8/2008 | Lahaix |
| 2008/0201734 A1 | 8/2008 | Lyon et al. |
| 2008/0221987 A1 | 9/2008 | Sundaresan et al. |
| 2008/0222045 A1 | 9/2008 | Mukerji et al. |
| 2008/0222711 A1 | 9/2008 | Michaelis |
| 2008/0228581 A1 | 9/2008 | Yonezaki et al. |
| 2008/0229335 A1 | 9/2008 | Robbin et al. |
| 2008/0243535 A1 | 10/2008 | Binding et al. |
| 2008/0244418 A1 | 10/2008 | Manolescu et al. |
| 2008/0263600 A1 | 10/2008 | Olague et al. |
| 2008/0268828 A1 | 10/2008 | Nagaraja |
| 2008/0276265 A1 | 11/2008 | Topchy et al. |
| 2008/0276266 A1 | 11/2008 | Huchital et al. |
| 2008/0276270 A1 | 11/2008 | Kotaru et al. |
| 2008/0288631 A1 | 11/2008 | Faisal et al. |
| 2008/0300011 A1 | 12/2008 | Rhoads et al. |
| 2008/0306820 A1 | 12/2008 | Passmore |
| 2008/0307460 A1 | 12/2008 | Knudson et al. |
| 2008/0310731 A1 | 12/2008 | Stojancic et al. |
| 2008/0313140 A1 | 12/2008 | Pereira et al. |
| 2008/0313648 A1 | 12/2008 | Wang et al. |
| 2008/0317278 A1 | 12/2008 | Lefebvre et al. |
| 2009/0006207 A1 | 1/2009 | Datar et al. |
| 2009/0011744 A1 | 1/2009 | Daley et al. |
| 2009/0044223 A1 | 2/2009 | Jiang et al. |
| 2009/0049384 A1 | 2/2009 | Yau |
| 2009/0052784 A1 | 2/2009 | Covell et al. |
| 2009/0055537 A1 | 2/2009 | Takei et al. |
| 2009/0061841 A1 | 3/2009 | Chaudhri et al. |
| 2009/0063691 A1 | 3/2009 | Kalofonos et al. |
| 2009/0070473 A1 | 3/2009 | Baum et al. |
| 2009/0076821 A1 | 3/2009 | Brenner et al. |
| 2009/0077580 A1 | 3/2009 | Konig et al. |
| 2009/0083417 A1 | 3/2009 | Hughes et al. |
| 2009/0088878 A1 | 4/2009 | Otsuka et al. |
| 2009/0089251 A1 | 4/2009 | Johnston et al. |
| 2009/0094093 A1 | 4/2009 | Phan |
| 2009/0100361 A1 | 4/2009 | Abello et al. |
| 2009/0119576 A1 | 5/2009 | Pepper et al. |
| 2009/0147718 A1 | 6/2009 | Liu et al. |
| 2009/0153289 A1 | 6/2009 | Hope et al. |
| 2009/0163227 A1 | 6/2009 | Collins |
| 2009/0164483 A1 | 6/2009 | Miles |
| 2009/0164641 A1 | 6/2009 | Rogers et al. |
| 2009/0164904 A1 | 6/2009 | Horowitz et al. |
| 2009/0165140 A1 | 6/2009 | Robinson et al. |
| 2009/0172728 A1 | 7/2009 | Shkedi et al. |
| 2009/0172746 A1 | 7/2009 | Aldrey et al. |
| 2009/0185723 A1 | 7/2009 | Kurtz et al. |
| 2009/0197524 A1 | 8/2009 | Haff et al. |
| 2009/0199236 A1 | 8/2009 | Barrett et al. |
| 2009/0199283 A1 | 8/2009 | Jain |
| 2009/0210899 A1 | 8/2009 | Lawrence-Apfelbaum et al. |
| 2009/0210902 A1 | 8/2009 | Slaney et al. |
| 2009/0216768 A1* | 8/2009 | Zwilling ........... G06F 17/30557 |
| 2009/0231485 A1 | 9/2009 | Steinke |
| 2009/0232305 A1 | 9/2009 | Alessi et al. |
| 2009/0234738 A1 | 9/2009 | Britton et al. |
| 2009/0235312 A1 | 9/2009 | Morad et al. |
| 2009/0240821 A1 | 9/2009 | Juncker et al. |
| 2009/0248736 A1 | 10/2009 | Adelman et al. |
| 2009/0254554 A1 | 10/2009 | Hicken |
| 2009/0254572 A1 | 10/2009 | Redlich et al. |
| 2009/0259612 A1 | 10/2009 | Hanson |
| 2009/0271398 A1 | 10/2009 | Scherf et al. |
| 2009/0276313 A1 | 11/2009 | Wilhelm |
| 2009/0292610 A1 | 11/2009 | Quach et al. |
| 2009/0298480 A1 | 12/2009 | Khambete et al. |
| 2009/0299817 A1 | 12/2009 | Fok et al. |
| 2009/0299843 A1 | 12/2009 | Shkedi |
| 2009/0300109 A1 | 12/2009 | Porter |
| 2009/0307048 A1 | 12/2009 | Grossman |
| 2009/0327076 A1 | 12/2009 | Sinyagin et al. |
| 2009/0327496 A1 | 12/2009 | Klemets et al. |
| 2010/0007797 A1 | 1/2010 | Stojancic |
| 2010/0022231 A1 | 1/2010 | Heins et al. |
| 2010/0023392 A1 | 1/2010 | Merriman et al. |
| 2010/0023499 A1 | 1/2010 | Johnson et al. |
| 2010/0023582 A1 | 1/2010 | Pedersen et al. |
| 2010/0049711 A1 | 2/2010 | Singh et al. |
| 2010/0050220 A1 | 2/2010 | Rys et al. |
| 2010/0058380 A1 | 3/2010 | Yu et al. |
| 2010/0063970 A1 | 3/2010 | Kim |
| 2010/0071070 A1 | 3/2010 | Jawa et al. |
| 2010/0083303 A1 | 4/2010 | Redei et al. |
| 2010/0094897 A1 | 4/2010 | Sumrall et al. |
| 2010/0099359 A1 | 4/2010 | Lee et al. |
| 2010/0107189 A1 | 4/2010 | Steelberg et al. |
| 2010/0119208 A1 | 5/2010 | Davis et al. |

(56) References Cited

U.S. PATENT DOCUMENTS

| | | |
|---|---|---|
| 2010/0121891 A1 | 5/2010 | Zampiello |
| 2010/0131973 A1 | 5/2010 | Dillon et al. |
| 2010/0145938 A1 | 6/2010 | Boetje et al. |
| 2010/0146552 A1 | 6/2010 | Hassell et al. |
| 2010/0158391 A1 | 6/2010 | Cunningham et al. |
| 2010/0161424 A1 | 6/2010 | Sylvain |
| 2010/0174605 A1 | 7/2010 | Dean et al. |
| 2010/0175078 A1 | 7/2010 | Knudson et al. |
| 2010/0180216 A1 | 7/2010 | Bates et al. |
| 2010/0185513 A1 | 7/2010 | Anderson et al. |
| 2010/0199188 A1 | 8/2010 | Abu-Hakima et al. |
| 2010/0205166 A1 | 8/2010 | Boulter et al. |
| 2010/0205562 A1 | 8/2010 | de Heer |
| 2010/0205628 A1 | 8/2010 | Davis et al. |
| 2010/0226582 A1 | 9/2010 | Luo et al. |
| 2010/0228611 A1 | 9/2010 | Shenfield |
| 2010/0228625 A1 | 9/2010 | Priyadarshan et al. |
| 2010/0251278 A1 | 9/2010 | Agarwal et al. |
| 2010/0251289 A1 | 9/2010 | Agarwal et al. |
| 2010/0257052 A1 | 10/2010 | Zito et al. |
| 2010/0269138 A1 | 10/2010 | Krikorian et al. |
| 2010/0287026 A1 | 11/2010 | Smith |
| 2010/0287049 A1 | 11/2010 | Rousso et al. |
| 2010/0306193 A1 | 12/2010 | Pereira et al. |
| 2010/0306773 A1 | 12/2010 | Lee et al. |
| 2010/0306805 A1 | 12/2010 | Neumeier et al. |
| 2010/0306808 A1 | 12/2010 | Neumeier et al. |
| 2010/0311345 A1 | 12/2010 | Santori et al. |
| 2010/0318628 A1 | 12/2010 | Pacella et al. |
| 2010/0318917 A1 | 12/2010 | Holladay et al. |
| 2010/0319062 A1 | 12/2010 | Danieli et al. |
| 2010/0324992 A1 | 12/2010 | Birch |
| 2010/0325495 A1 | 12/2010 | Talla et al. |
| 2010/0325552 A1 | 12/2010 | Sloo et al. |
| 2011/0010737 A1 | 1/2011 | Bouazizi et al. |
| 2011/0029555 A1 | 2/2011 | Gao et al. |
| 2011/0029666 A1 | 2/2011 | Lopatecki et al. |
| 2011/0032334 A1 | 2/2011 | Raveendran et al. |
| 2011/0035382 A1* | 2/2011 | Bauer .................. G06F 17/3002 707/741 |
| 2011/0043652 A1 | 2/2011 | King et al. |
| 2011/0061073 A1 | 3/2011 | Nicholson et al. |
| 2011/0078753 A1 | 3/2011 | Christianson et al. |
| 2011/0082939 A1 | 4/2011 | Montemurro et al. |
| 2011/0082940 A1 | 4/2011 | Montemurro et al. |
| 2011/0088075 A1 | 4/2011 | Eyer |
| 2011/0099065 A1 | 4/2011 | Georgis et al. |
| 2011/0099609 A1 | 4/2011 | Malhotra et al. |
| 2011/0107385 A1 | 5/2011 | Hudson et al. |
| 2011/0119139 A1 | 5/2011 | Dean et al. |
| 2011/0122836 A1 | 5/2011 | Kim |
| 2011/0125586 A1 | 5/2011 | Evans |
| 2011/0131597 A1 | 6/2011 | Cera et al. |
| 2011/0136539 A1 | 6/2011 | Jain et al. |
| 2011/0138059 A1 | 6/2011 | Schleifer et al. |
| 2011/0145926 A1 | 6/2011 | Dalcher et al. |
| 2011/0154498 A1 | 6/2011 | Fissel et al. |
| 2011/0179010 A1 | 7/2011 | Lin et al. |
| 2011/0179447 A1 | 7/2011 | Harkness et al. |
| 2011/0191178 A1 | 8/2011 | Newberg et al. |
| 2011/0191352 A1 | 8/2011 | Jones et al. |
| 2011/0213881 A1 | 9/2011 | Stavenow et al. |
| 2011/0219322 A1 | 9/2011 | Ramamurthy et al. |
| 2011/0238379 A1 | 9/2011 | Misra et al. |
| 2011/0247044 A1 | 10/2011 | Jacoby |
| 2011/0251987 A1 | 10/2011 | Buchheit |
| 2011/0251992 A1 | 10/2011 | Bethlehem et al. |
| 2011/0265114 A1 | 10/2011 | Legrand |
| 2011/0265116 A1 | 10/2011 | Stern et al. |
| 2011/0270672 A1 | 11/2011 | Hillard et al. |
| 2011/0273625 A1* | 11/2011 | McMahon ............ G06F 21/445 348/734 |
| 2011/0274179 A1 | 11/2011 | Holden |
| 2011/0279445 A1 | 11/2011 | Murphy et al. |
| 2011/0283322 A1 | 11/2011 | Hamano |
| 2011/0289114 A1 | 11/2011 | Yu et al. |
| 2011/0289524 A1 | 11/2011 | Toner et al. |
| 2011/0289532 A1 | 11/2011 | Yu et al. |
| 2011/0289544 A1 | 11/2011 | Goosen et al. |
| 2011/0296303 A1 | 12/2011 | Duquene et al. |
| 2011/0304771 A1 | 12/2011 | Blanchard et al. |
| 2011/0310100 A1 | 12/2011 | Adimatyam et al. |
| 2011/0314051 A1 | 12/2011 | Cavet et al. |
| 2011/0317885 A1 | 12/2011 | Leung et al. |
| 2011/0321003 A1 | 12/2011 | Doig et al. |
| 2011/0321109 A1 | 12/2011 | Hudson et al. |
| 2012/0011541 A1 | 1/2012 | McCarthy |
| 2012/0017240 A1 | 1/2012 | Shkedi |
| 2012/0023522 A1 | 1/2012 | Anderson et al. |
| 2012/0047277 A1 | 2/2012 | Keidar et al. |
| 2012/0054300 A1 | 3/2012 | Marchwicki et al. |
| 2012/0054440 A1 | 3/2012 | Doig et al. |
| 2012/0069131 A1 | 3/2012 | Abelow |
| 2012/0072291 A1 | 3/2012 | Bharat |
| 2012/0072420 A1 | 3/2012 | Moganti et al. |
| 2012/0076049 A1 | 3/2012 | Rudolf et al. |
| 2012/0084814 A1 | 4/2012 | Olague et al. |
| 2012/0086857 A1 | 4/2012 | Kim et al. |
| 2012/0089700 A1 | 4/2012 | Safruti et al. |
| 2012/0101907 A1 | 4/2012 | Dodda |
| 2012/0102515 A1 | 4/2012 | Ramaswamy |
| 2012/0109755 A1 | 5/2012 | Birch et al. |
| 2012/0124498 A1 | 5/2012 | Santoro et al. |
| 2012/0130822 A1 | 5/2012 | Patwa et al. |
| 2012/0130825 A1 | 5/2012 | Evans |
| 2012/0131095 A1 | 5/2012 | Luna et al. |
| 2012/0144416 A1 | 6/2012 | Wetzer et al. |
| 2012/0150944 A1 | 6/2012 | Steelberg et al. |
| 2012/0151015 A1 | 6/2012 | Plastina et al. |
| 2012/0151521 A1 | 6/2012 | Gilley et al. |
| 2012/0159542 A1 | 6/2012 | Minwalla |
| 2012/0163770 A1 | 6/2012 | Kaiser et al. |
| 2012/0163776 A1 | 6/2012 | Hassell et al. |
| 2012/0167001 A1 | 6/2012 | Ortiz et al. |
| 2012/0167132 A1 | 6/2012 | Mathews et al. |
| 2012/0174155 A1 | 7/2012 | Mowrey et al. |
| 2012/0191716 A1 | 7/2012 | Omoigui |
| 2012/0207402 A1 | 8/2012 | Stojancic et al. |
| 2012/0209706 A1 | 8/2012 | Ramer et al. |
| 2012/0209726 A1 | 8/2012 | Dean et al. |
| 2012/0210224 A1 | 8/2012 | Wong et al. |
| 2012/0215622 A1 | 8/2012 | Ramer et al. |
| 2012/0233163 A1 | 9/2012 | Kirkpatrick |
| 2012/0240151 A1 | 9/2012 | Tapper |
| 2012/0245722 A1 | 9/2012 | Yamamura |
| 2012/0257110 A1 | 10/2012 | Amundsen |
| 2012/0260184 A1 | 10/2012 | Dawes et al. |
| 2012/0265616 A1 | 10/2012 | Cao et al. |
| 2012/0272134 A1 | 10/2012 | Steelberg et al. |
| 2012/0278825 A1 | 11/2012 | Tran et al. |
| 2012/0280908 A1 | 11/2012 | Rhoads et al. |
| 2012/0284746 A1 | 11/2012 | Evans et al. |
| 2012/0284757 A1 | 11/2012 | Rajapakse |
| 2012/0297406 A1 | 11/2012 | Bartholomay et al. |
| 2012/0303710 A1 | 11/2012 | Roberts et al. |
| 2012/0311074 A1* | 12/2012 | Arini ................ H04N 21/44008 709/217 |
| 2012/0311629 A1 | 12/2012 | Zaslavsky et al. |
| 2012/0311702 A1 | 12/2012 | Krstic et al. |
| 2012/0315014 A1 | 12/2012 | Shuster |
| 2012/0317175 A1 | 12/2012 | Husain et al. |
| 2012/0317178 A1 | 12/2012 | Husain et al. |
| 2012/0317181 A1 | 12/2012 | Husain et al. |
| 2012/0324495 A1 | 12/2012 | Matthews et al. |
| 2012/0324566 A1 | 12/2012 | Baum et al. |
| 2013/0013665 A1 | 1/2013 | Sng et al. |
| 2013/0019262 A1 | 1/2013 | Bhatia et al. |
| 2013/0019268 A1 | 1/2013 | Fitzsimmons et al. |
| 2013/0036434 A1 | 2/2013 | Shkedi et al. |
| 2013/0041664 A1 | 2/2013 | McKoen et al. |
| 2013/0042262 A1 | 2/2013 | Riethmueller |
| 2013/0045681 A1 | 2/2013 | Dua |
| 2013/0051300 A1 | 2/2013 | He et al. |
| 2013/0055309 A1 | 2/2013 | Dittus |

(56) References Cited

U.S. PATENT DOCUMENTS

| | | |
|---|---|---|
| 2013/0060905 A1 | 3/2013 | Mickens et al. |
| 2013/0061259 A1 | 3/2013 | Raman et al. |
| 2013/0061267 A1 | 3/2013 | Cansino et al. |
| 2013/0078946 A1 | 3/2013 | Pecen et al. |
| 2013/0080242 A1 | 3/2013 | Alhadeff et al. |
| 2013/0085865 A1 | 4/2013 | Zhou et al. |
| 2013/0094423 A1 | 4/2013 | Wengrovitz et al. |
| 2013/0104160 A1 | 4/2013 | Beeson et al. |
| 2013/0104232 A1 | 4/2013 | Johnson et al. |
| 2013/0117782 A1 | 5/2013 | Mehta et al. |
| 2013/0139209 A1 | 5/2013 | Urrabazo et al. |
| 2013/0139210 A1 | 5/2013 | Huang et al. |
| 2013/0151728 A1 | 6/2013 | Currier |
| 2013/0185153 A1 | 7/2013 | Howcroft |
| 2013/0185422 A1 | 7/2013 | Rogers et al. |
| 2013/0202150 A1 | 8/2013 | Sinha et al. |
| 2013/0205317 A1 | 8/2013 | Sinha et al. |
| 2013/0205319 A1 | 8/2013 | Sinha et al. |
| 2013/0205348 A1 | 8/2013 | Hudson et al. |
| 2013/0238702 A1 | 9/2013 | Sheth et al. |
| 2013/0254884 A1 | 9/2013 | Dalcher et al. |
| 2013/0263166 A1 | 10/2013 | Fleischman |
| 2013/0290502 A1* | 10/2013 | Bilobrov ............... G06F 21/10 709/223 |
| 2013/0297727 A1 | 11/2013 | Levy |
| 2013/0311168 A1 | 11/2013 | Li |
| 2013/0318157 A1 | 11/2013 | Harrison |
| 2013/0326554 A1 | 12/2013 | Shkedi |
| 2013/0340011 A1 | 12/2013 | Rodriguez |
| 2013/0340050 A1 | 12/2013 | Harrison |
| 2014/0002247 A1 | 1/2014 | Harrison et al. |
| 2014/0007155 A1 | 1/2014 | Vemparala et al. |
| 2014/0007156 A1 | 1/2014 | Harrison et al. |
| 2014/0007157 A1 | 1/2014 | Harrison et al. |
| 2014/0007162 A1 | 1/2014 | Harrison |
| 2014/0007187 A1 | 1/2014 | Harrison |
| 2014/0007262 A1 | 1/2014 | Metsäpelto et al. |
| 2014/0029847 A1 | 1/2014 | Frye et al. |
| 2014/0032286 A1 | 1/2014 | Lansford et al. |
| 2014/0040027 A1 | 2/2014 | Darrell Anderson et al. |
| 2014/0040443 A1 | 2/2014 | Syu et al. |
| 2014/0047480 A1 | 2/2014 | Knudson et al. |
| 2014/0074621 A1 | 3/2014 | Chai et al. |
| 2014/0074839 A1 | 3/2014 | Popp et al. |
| 2014/0082663 A1 | 3/2014 | Neumeier et al. |
| 2014/0090008 A1 | 3/2014 | Li et al. |
| 2014/0130076 A1 | 5/2014 | Moore et al. |
| 2014/0141714 A1 | 5/2014 | Ghosh et al. |
| 2014/0143043 A1 | 5/2014 | Wickramasuriya et al. |
| 2014/0150006 A1 | 5/2014 | Vemparala et al. |
| 2014/0181856 A1 | 6/2014 | Lewis |
| 2014/0184827 A1 | 7/2014 | Chartrand |
| 2014/0195584 A1 | 7/2014 | Harrison |
| 2014/0195620 A1 | 7/2014 | Srinivasan et al. |
| 2014/0195649 A1 | 7/2014 | Harrison |
| 2014/0195690 A1 | 7/2014 | Harrison et al. |
| 2014/0195934 A1 | 7/2014 | Harrison |
| 2014/0196085 A1 | 7/2014 | Dunker et al. |
| 2014/0201645 A1 | 7/2014 | Mo et al. |
| 2014/0201769 A1 | 7/2014 | Neumeier et al. |
| 2014/0201772 A1 | 7/2014 | Neumeier et al. |
| 2014/0201773 A1 | 7/2014 | Neumeier et al. |
| 2014/0201774 A1 | 7/2014 | Neumeier et al. |
| 2014/0201787 A1 | 7/2014 | Neumeier et al. |
| 2014/0218620 A1 | 8/2014 | Griffin et al. |
| 2014/0229271 A1 | 8/2014 | Clapp et al. |
| 2014/0237496 A1 | 8/2014 | Julian |
| 2014/0244351 A1 | 8/2014 | Symons |
| 2014/0244863 A1 | 8/2014 | Bradley et al. |
| 2014/0280304 A1 | 9/2014 | Scherf et al. |
| 2014/0282673 A1 | 9/2014 | Neumeier et al. |
| 2014/0282735 A1 | 9/2014 | Davis et al. |
| 2014/0289315 A1 | 9/2014 | Harrison |
| 2015/0003799 A1 | 1/2015 | Oostveen et al. |
| 2015/0074526 A1 | 3/2015 | Brenner et al. |
| 2015/0074703 A1 | 3/2015 | Cremer et al. |
| 2015/0082331 A1 | 3/2015 | Neumeier et al. |
| 2015/0089526 A1 | 3/2015 | Gordon |
| 2015/0095972 A1 | 4/2015 | Sharma et al. |
| 2015/0178280 A1 | 6/2015 | DiMaria et al. |
| 2015/0181263 A1 | 6/2015 | Gordon |
| 2015/0181268 A1 | 6/2015 | Harrison et al. |
| 2015/0181311 A1 | 6/2015 | Harrison et al. |
| 2015/0194151 A1 | 7/2015 | Jeyachandran et al. |
| 2015/0195597 A1 | 7/2015 | Gordon |
| 2015/0228306 A1 | 8/2015 | Roberts et al. |
| 2015/0229690 A1 | 8/2015 | Raesig et al. |
| 2015/0245090 A1 | 8/2015 | Davis et al. |
| 2015/0262229 A1 | 9/2015 | Brenner et al. |
| 2015/0302086 A1 | 10/2015 | Roberts et al. |
| 2015/0331660 A1 | 11/2015 | Kalampoukas et al. |
| 2015/0331661 A1 | 11/2015 | Kalampoukas et al. |
| 2015/0331938 A1 | 11/2015 | Kalampoukas et al. |
| 2015/0332669 A1 | 11/2015 | Kalampoukas et al. |
| 2015/0332687 A1 | 11/2015 | Kalampoukas et al. |
| 2015/0350725 A1 | 12/2015 | Zhu et al. |
| 2015/0356178 A1 | 12/2015 | Scherf et al. |
| 2015/0365456 A1 | 12/2015 | Harrison |
| 2016/0007083 A1 | 1/2016 | Gurha |
| 2016/0019598 A1 | 1/2016 | Harrison |
| 2016/0019876 A1 | 1/2016 | Jeffrey et al. |
| 2016/0110537 A1* | 4/2016 | Harrison ............... H04L 67/16 705/14.66 |
| 2016/0112770 A1 | 4/2016 | Harrison |
| 2016/0124953 A1 | 5/2016 | Cremer et al. |
| 2016/0139756 A1 | 5/2016 | Benson et al. |
| 2016/0140122 A1 | 5/2016 | Harrison |
| 2016/0182971 A1 | 6/2016 | Ortiz |
| 2016/0196105 A1 | 7/2016 | Vartakavi et al. |
| 2016/0196270 A1 | 7/2016 | DiMaria et al. |
| 2016/0196344 A1 | 7/2016 | Cremer et al. |
| 2016/0217799 A1 | 7/2016 | Han et al. |
| 2016/0241540 A1 | 8/2016 | Jeffrey et al. |
| 2016/0267180 A1 | 9/2016 | Harron et al. |
| 2016/0323533 A1 | 11/2016 | Nagorski et al. |
| 2016/0373197 A1 | 12/2016 | Brenner et al. |

FOREIGN PATENT DOCUMENTS

| | | |
|---|---|---|
| CA | 2884534 A1 | 3/2014 |
| CN | 1726489 A | 1/2006 |
| CN | 101147378 A | 3/2008 |
| CN | 101622599 A | 1/2010 |
| CN | 101909201 B | 6/2013 |
| DE | 69615695 T2 | 6/2004 |
| DE | 602004008936 T2 | 6/2008 |
| EP | 1010098 A2 | 6/2000 |
| EP | 1010098 B1 | 6/2003 |
| EP | 1324567 A2 | 7/2003 |
| EP | 1324567 A3 | 8/2003 |
| EP | 1347661 A1 | 9/2003 |
| EP | 1410380 A2 | 4/2004 |
| EP | 1421521 A2 | 5/2004 |
| EP | 1573462 A3 | 10/2005 |
| EP | 1592198 A1 | 11/2005 |
| EP | 1605416 A1 | 12/2005 |
| EP | 1779659 A1 | 5/2007 |
| EP | 1803270 A1 | 7/2007 |
| EP | 1934828 A2 | 6/2008 |
| EP | 1362485 B1 | 8/2008 |
| EP | 1934828 A4 | 10/2008 |
| EP | 2001583 A2 | 12/2008 |
| EP | 1550297 B1 | 3/2009 |
| EP | 2100216 A2 | 9/2009 |
| EP | 1314110 B1 | 10/2009 |
| EP | 2100216 A4 | 12/2009 |
| EP | 2136306 A1 | 12/2009 |
| EP | 1324567 B1 | 1/2010 |
| EP | 2145411 A2 | 1/2010 |
| EP | 2169854 A1 | 3/2010 |
| EP | 1410380 B1 | 4/2010 |
| EP | 1797552 B1 | 4/2010 |
| EP | 2206114 A1 | 7/2010 |
| EP | 2001583 A4 | 9/2010 |

(56) References Cited

FOREIGN PATENT DOCUMENTS

| | | |
|---|---|---|
| EP | 2226757 A1 | 9/2010 |
| EP | 2206114 A4 | 7/2012 |
| EP | 1887754 B1 | 12/2012 |
| EP | 2541961 A2 | 1/2013 |
| EP | 2136306 B1 | 3/2013 |
| EP | 2541961 A3 | 4/2013 |
| EP | 1969810 B2 | 8/2013 |
| EP | 2520084 A4 | 11/2013 |
| EP | 2285066 B1 | 5/2014 |
| EP | 2747370 A1 | 6/2014 |
| EP | 2200258 B1 | 11/2014 |
| EP | 2895971 A2 | 7/2015 |
| EP | 2944051 A1 | 11/2015 |
| EP | 2895971 A4 | 5/2016 |
| EP | 3084646 A1 | 10/2016 |
| EP | 2944051 A4 | 11/2016 |
| EP | 3090330 A1 | 11/2016 |
| EP | 3090429 A1 | 11/2016 |
| EP | 3117390 A1 | 1/2017 |
| GB | 2457694 A | 8/2009 |
| JP | 2007220137 A | 8/2007 |
| JP | 2007257820 A | 10/2007 |
| JP | 2007280382 A | 10/2007 |
| JP | 2009075603 A | 4/2009 |
| JP | 2013013092 A | 1/2013 |
| KR | 20030005279 A | 1/2003 |
| KR | 20040021684 A | 3/2004 |
| KR | 20040024870 A | 3/2004 |
| KR | 20040029452 A | 4/2004 |
| KR | 20040086350 A | 10/2004 |
| KR | 20050046815 A | 5/2005 |
| KR | 20050061566 A | 6/2005 |
| KR | 20050061594 A | 6/2005 |
| KR | 20050086470 A | 8/2005 |
| KR | 20050113614 A | 12/2005 |
| KR | 20050117558 A | 12/2005 |
| KR | 20070095282 A | 9/2007 |
| KR | 20080043358 A | 5/2008 |
| KR | 100961461 B1 | 6/2010 |
| KR | 20150054861 A | 5/2015 |
| KR | 20150106904 A | 9/2015 |
| KR | 1020160101979 A | 8/2016 |
| KR | 20160135751 A | 11/2016 |
| WO | 9512278 A1 | 5/1995 |
| WO | 0052929 A1 | 9/2000 |
| WO | 0054504 A1 | 9/2000 |
| WO | 0144992 A1 | 6/2001 |
| WO | 0182625 A1 | 11/2001 |
| WO | 0189213 A1 | 11/2001 |
| WO | 0189217 A1 | 11/2001 |
| WO | 0231742 A2 | 4/2002 |
| WO | 03009277 A2 | 1/2003 |
| WO | 03012695 A2 | 2/2003 |
| WO | 03019560 A2 | 3/2003 |
| WO | 03025762 A1 | 3/2003 |
| WO | 03009277 A3 | 9/2003 |
| WO | 2003019560 A3 | 1/2004 |
| WO | 03012695 A3 | 3/2004 |
| WO | 2004040416 A2 | 5/2004 |
| WO | 2004044820 A1 | 5/2004 |
| WO | 2005041455 A1 | 5/2005 |
| WO | 2005050620 A1 | 6/2005 |
| WO | 2004040416 A3 | 8/2005 |
| WO | 2005125198 A2 | 12/2005 |
| WO | 2006018790 A1 | 2/2006 |
| WO | 2006041928 A1 | 4/2006 |
| WO | 2007022533 A2 | 2/2007 |
| WO | 2007022533 A3 | 6/2007 |
| WO | 2007103583 A2 | 9/2007 |
| WO | 2007114796 A1 | 10/2007 |
| WO | 2008029188 A1 | 3/2008 |
| WO | 2007103583 A3 | 5/2008 |
| WO | 2008052205 A2 | 5/2008 |
| WO | 2008086104 A2 | 7/2008 |
| WO | 2008086104 A3 | 8/2008 |
| WO | 2008112858 A1 | 9/2008 |
| WO | 2008131247 A1 | 10/2008 |
| WO | 2008137756 A2 | 11/2008 |
| WO | 2009023647 A1 | 2/2009 |
| WO | 2009042858 A1 | 4/2009 |
| WO | 2009091338 A1 | 7/2009 |
| WO | 2009114622 A2 | 9/2009 |
| WO | 2009131861 A2 | 10/2009 |
| WO | 2009132084 A1 | 10/2009 |
| WO | 2008137756 A3 | 12/2009 |
| WO | 2009150425 A2 | 12/2009 |
| WO | 2010046123 A1 | 4/2010 |
| WO | 2010072986 A2 | 7/2010 |
| WO | 2010129693 A1 | 11/2010 |
| WO | 2010151421 A1 | 12/2010 |
| WO | 2011011002 A1 | 1/2011 |
| WO | 2011030231 A1 | 3/2011 |
| WO | 2011090540 A2 | 7/2011 |
| WO | 2011090541 A2 | 7/2011 |
| WO | 2012005994 A1 | 1/2012 |
| WO | 2012013893 A1 | 2/2012 |
| WO | 2012021538 A1 | 2/2012 |
| WO | 2012028976 A1 | 3/2012 |
| WO | 2012051115 A1 | 4/2012 |
| WO | 2012109666 A1 | 8/2012 |
| WO | 2012120253 A1 | 9/2012 |
| WO | 2012154541 A1 | 11/2012 |
| WO | 2013028899 A1 | 2/2013 |
| WO | 2013032787 A1 | 3/2013 |
| WO | 2013068619 A1 | 5/2013 |
| WO | 2013089674 A1 | 6/2013 |
| WO | 2013147587 A1 | 10/2013 |
| WO | 2014042826 A2 | 3/2014 |
| WO | 2014052015 A1 | 4/2014 |
| WO | 2014042826 A3 | 5/2014 |
| WO | 2014107311 A1 | 7/2014 |
| WO | 2014142758 A1 | 9/2014 |
| WO | 2014145929 A1 | 9/2014 |
| WO | 2014145938 A1 | 9/2014 |
| WO | 2014145947 A1 | 9/2014 |
| WO | 2015094558 A1 | 6/2015 |
| WO | 2015102921 A1 | 7/2015 |
| WO | 2015103384 A1 | 7/2015 |
| WO | 2015138601 A1 | 9/2015 |
| WO | 2015167901 A1 | 11/2015 |
| WO | 2015183914 A1 | 12/2015 |
| WO | 2016018472 A2 | 2/2016 |
| WO | 2016018472 A3 | 3/2016 |
| WO | 2016109500 A1 | 7/2016 |
| WO | 2016109553 A2 | 7/2016 |
| WO | 2016109682 A2 | 7/2016 |
| WO | 2016109553 A3 | 8/2016 |
| WO | 2016109682 A3 | 9/2016 |

OTHER PUBLICATIONS

"HTML & CSS: The Complete Reference", The McGraw-Hill Companies, 2010 by Thomas A. Powell (pp. 857) http://www.pdfiles.com/pdf/files/English/Web_Apps_Programming_&_Internet/HTML_&_CSS_The_Complete_Reference.pdf.

"Web Services Essentials", O'Reilly, Feb. 2002 by Ethan Cerami (pp. 286) http://spurrier.gatorglory.com/PDFs/O'Reilly%20-%20Web%20Services%20Essentials.pdf.

"UPnP Device Architecture 1.0", UPnP Forum, Oct. 15, 2008 (pp. 81) http://upnp.org/specs/arch/UPnP-arch-DeviceArchitecture-v1.0.pdf.

"Mac OS X Snow Leopard: The Missing Manual", O'Reilly Media, Inc., 2009 by David Pogue (pp. 903) http://crypto.cs.mcgill.ca/~simonpie/webdav/ipad/EBook/MacOSX/Mac%20OS%20X%20Snow%20Leopard%20The%20Missing%20Manual.pdf.

"The Common Object Request Broker: Architecture and Specification Revision 2.0", Feb. 1997 (pp. 634) http://www.omg.org/spec/CORBA/2.0/PDF.

"Internet: The Complete Reference", Tata McGraw-Hill Education Pvt. Ltd., 2002 by Margaret Levine Young http://www.abebooks.com/Internet-Complete-Reference-Second-Edition-Margaret/5122896620/bd.

(56) References Cited

OTHER PUBLICATIONS

"HTML 4.0 Sourcebook", John Wiley & Sons, Apr. 1998 by Ian S. Graham (pp. 656) http://www.wiley.com/WileyCDA/WileyTitle/productCd-0471257249.html.
"Zero Configuration Networking: The Definitive Guide", O'Reilly Media, Dec. 2005 by Daniel H Steinberg et al. (pp. 254) http://shop.oreilly.com/product/9780596101008.do#tab_04_2.
https://web.archive.org/web/20110722022038/http://www.flingo.tv/.
https://web.archive.org/web/20120616002448/http://www.flingo.tv/.
https://web.archive.org/web/20130423033122/http://flingo.tv/.
https://web.archive.org/web/20101015033305/http://flingo.org/.
https://web.archive.org/web/20110609062427/http://www.flingo.org/.
"Secure Browsing with Ceedo", Ceedo Flexible computing (pp. 2).
"Sandboxes and Silver Bullets: Vendors Promote New/Old Detection Techniques to Stop Zero-Day Threats", IT Current Analysis Connection Blogs, Mar. 29, 2013 by Paula Musich (p. 1) http://itcblogs.currentanalysis.com/2013/03/29/sandboxes-and-silver-bullets-vendors-promote-newold-detection-techniques-to-stop-zero-day-threats/.
"Introduction to security" (pp. 8) http://help.adobe.com/en_US/flex/using/WS2db454920e51e63e3d11c0bf6167e-7fff.html#WS2db454920e96a9e51e3d11c0bf6167e-7ff9.
"Screenshot of Wikipedia page of Samba TV", Jan. 5, 2015 (pp. 2) http://en.wikipedia.org/wiki/Samba_TV.
"Screenshot of Wikipedia page of Smart TV", Jan. 5, 2015 (pp. 4) http://en.wikipedia.org/wiki/Smart_TV.
"Screenshot of Wikipedia page of Interactive television", From Wikipedia, Jan. 5, 2015 (pp. 8) http://en.wikipedia.org/wiki/Interactive_television.
"Screenshot of Wikipedia page of Social television", From Wikipedia, Jan. 5, 2015 (pp. 3) http://en.wikipedia.org/wiki/Social_television.
"Screenshot of Wikipedia page of Enhanced TV", From Wikipedia, Jan. 5, 2015 (p. 1) http://en.wikipedia.org/wiki/Enhanced_TV.
"Screenshot of Wikipedia page of Digital video fingerprinting", From Wikipedia, Jan. 5, 2015 (pp. 4) http://en.wikipedia.org/wiki/Digital_video_fingerprinting.
"Screenshot of Wikipedia page of Second screen", From Wikipedia, Jan. 5, 2015 (pp. 3) http://en.wikipedia.org/wiki/Second_screen.
Reverse Sandboxing with SafeCentral, SafeCentral (pp. 3) http://www.safecentral.com/pdfs/ReverseSandboxing.pdf.
"Collect, Manage, and Analyze everything occurring on your network", RSA Security Analytics, Detect & Investigate Threats. (pp. 5) http://www.emc.com/collateral/data-sheet/security-analytics-infrastructure-ds.pdf.
"Metazen—metadata capture for metagenomes", Standards in Genomic Sciences, by Jared Bischof et al. (pp. 6) http://www.standardsingenomics.com/content/pdf/1944-3277-9-18.pdf.
"Semantic Annotation of Images and Videos for Multimedia Analysis", by Stephan Bloehdorn et al. (pp. 15) http://image.ntua.gr/papers/345.pdf.
"Architecture for Interoperability of Services between an ACAP Receiver and Home Networked Devices", Jan. 15, 2006, by Yu-Seok Bae et al. (pp. 6).
"Smart SoftPhone Device for Networked AudioVisual QoS/QoE Discovery & Measurement", Digital Media Laboratory, Information and Communications University, Republic of Korea, by Jinsul Kim, (pp. 23) http://cdn.intechopen.com/pdfs-wm/5446.pdf.
"Market Potential for Interactive Audio-visual Media", IEEE Xplore, by Andra Leurdijk et al., (p. 1) http://ieeexplore.ieee.org/xpl/login.jsp?tp=&arnumber=1592082&url=http%3A%2F%Fieeexplore.ieee.org%2Fxpls%2Fabs_all.jsp%3Farnumber3%D1592082.
"Design of a multi-sender 3D videoconferencing application over an end system multicast protocol", '03 Proceedings of the eleventh ACM international conference on Multimedia, New York, NY, USA, 2003 by Mojtaba Hosseini et al., (p. 1) http://dl.acm.org/citation.cfm?id=957119.
Cisco Medianet Data Sheer, Cisco 3900 Series Integrated Services Routers, (pp. 8) http://www.cisco.com/c/en/us/products/collateral/routers/3900-series-integrated-services-routers-isr/data_sheet_c78-612429.html.
"Delivery of Personalized and Adaptive Content to Mobile Devices: A Framework and Enabling Technology", Communications of the Association for Information Systems (vol. 12, 2003)183-202, by D. Zhang, (pp. 22) http://aisel.aisnet.org/cgi/viewcontent.cgi?article=3178&context=cais.
"Single Sign-On for Java Web Start Applications Using MyProxy", by Terry Fleury et al. (pp. 7) http://grid.ncsa.illinois.edu/papers/sws-myproxy-jws.pdf.
"MonALISA : A Distributed Monitoring Service Architecture", CHEP03, La Jolla, California, Mar. 24-28, 2003 by H.B. Newman et al. (pp. 8) http://monalisa.caltech.edu/documentation/MOET001.pdf.
"Exploratory geospatial analysis using GeoVISTA Studio: from a desktop to the Web", IEEE Xplore, Dec. 3-6, 2001, by M. Takatsuka et al. (p. 1) http://ieeexplore.ieee.org/xpl/login.jsp?tp=&arnumber=996715&url=http%3A%2F%2Fieeexplore.ieee.org%2Fxpls%2Fabs_all.jsp%3Farnumber%3D996715.
"Comprehensive Multi-platform Collaboration", Department of Computer Science, Columbia University, by kundan Singh et al. (pp. 36) http://www.cs.columbia.edu/~library/TR-repository/reports/reports-2003/cucs-027-03.pdf.
"Privacy-Preserving Remote Diagnostics", The University of Texas at Austin, by Justin Brickell et al. (pp. 10) https://www.cs.utexas.edu/~shmat/shmat_ccs07.pdf.
"Supporting Dynamic Ad hoc Collaboration Capabilities", LBNL, Berkeley, CA 94720, USA, by D. Agarwal et al. (pp. 6) http://arxiv.org/ftp/cs/papers/0307/0307037.pdf.
"A Framework for Classifying Peer-to-Peer Technologies", IEEE Xplore, May 21-24, 2002, by K. Kant et al. (p. 1) http://ieeexplore.ieee.org/xpl/login.jsp?tp=&arnumber=1540491&url=http%3A%2F%2Fieeexplore.ieee.org%2Fiel5%2F10335%2F32898%2F01540491.pdf%Farnumber%3D1540491.
"Cognitive Radio Technology", from The Guest Editor in IEEE Signal Processing Magazine on Nov. 2008 by Maria Gabriella di Benedetto et al. (p. 1) http://ieeexplore.ieee.org/stamp/stamp.jsp?arnumber=4644050.
"Automated Content Recognition creating content aware ecosystems", in CSI Magazine in Sep. 2012 (pp. 16) http://www.csimagazine.com/csi/whitepapers/ACR%20Creating%20%20content-aware%20ecosystems%20-Civolution%20White%20Paper%20-%20Sept%202012.pdf.
"A Confidence Based Recognition System for TV Commercial Extraction", in 2008 by Yijun Li et al. (pp. 8) http://crpit.com/confpapers/CRPITV75Li.pdf.
"TV Retargeting", Market View, wywy—Maximizing TV Advertising ROI, Dec. 31, 2015 (pp. 2) http://wywy.com/market-view/tv-retargeting/.
"The New Age of Second Screen: Enabling Interaction", admonsters webpage, Jun. 5, 2013, Joshua R. Weaver (pp. 3) https://www.admonsters.com/blog/second-screen-enabling-interaction.
"Complaint for Patent Infringement", Case 2:15-cv-01725-RWS Document 1, Nov. 6, 2015 (pp. 7).
"Flingo is about to make your smart TV even smarter", Jul. 7, 2011, by Ryan Lawler (pp. 6) https://gigaom.com/2011/07/07/flingo-launch/.
"The TV That Watches You", Aug. 19, 2011, by Tom Sirnonite (pp. 5) https://www.technologyreview.com/s/425081/the-tv-that-watches-you/.
"Security in the Large: Is Java's Sandbox Scalable?", HP Hewlett Packard Apr. 1998 by Qun Zhong et al. (pp. 9) http://www.hpl.hp.com/techreports/98/HPL-98-79.pdf.
"For Developers", Flingo Article, Oct. 2010, by FLINGO https://web.archive.org/web/20101028221214/flingo.org/developers.html.

(56) References Cited

OTHER PUBLICATIONS

"Anomaly Detection in Dynamic Execution Environments"; NSPW 2002, by Hajime Inoue et al. (pp. 9) http://www.nspw.org/papers/2002/nspw2002-inoue.pdf.
"iPhone Security Analysis", Department of Computer Science San Jose State University, May 2008, by Vaibhav Pandya. (pp. 44) http://www.cs.sjsu.edu/faculty/stamp/students/pandya_vaibhay.pdf.
"I, Me and My Phone: Identity and Personalization using Mobile Devices", HP Invest, Nov. 2007 by Riddhiman Ghosh et al. (pp. 14) http://www.hpl.hp.com/techreports/2007/HPL-2007-134.pdf.
"Extending the web to support personal network services", SAC '13, Mar. 2013, by John Lyle et al, (pp. 6) https://www.cs.ox.ac.uk/files/5273/sac2013.pdf.
"Java and Java Virtual Machine Security Vulnerabilities and their Exploitation Techniques", Black Hat Briefings, Singapore, Oct. 2002, by Delirium. (pp. 91) http://www.blackhat.com/presentations/bh-asia-02/LSD/bh-asia-02-isd.pdf.
"Shazam Announces Application for iPhone", by Shazam, Jul. 2008. http://news.shazam.com/pressreleases/shazam-announces-application-for-iphone-890432.
"Shazam Launches Android Application Integrated with MySpace and Amazon MP3", by Shazam, Oct. 2008. http/news.shazam.com/pressreleases/shazam-launches-android-application-integrated-with-myspace-and-amazon-mp3-890456.
"The Shazam music recognition service",Communications of the ACM—Music information retrieval, Aug. 2006, by Shazam. https://www.researchgate.net/publication/220423945_The_Shazam_music_recognition_service.
"An Industrial-Strength Audio Search Algorithm", International Conference on Music Information Retrieval, 2003, by Avery Wang. https://www.ee.columbia.edu/~dpwe/papers/Wang03-shazam.pdf.
"It Just Works: UPnP in the Digital Home", The Journal of Spontaneous Networking, Oct. 2004, by Michael Jeronimo. http://www.artima.com/spontaneous/upnp_digihome.html.
"Data-Confined HTML5 Applications", European Symposium on Research in Computer Security, London Mar. 2013, by Devdatta Akhawe (pp. 18) http://devd.me/papers/dcs-esorics.pdf.
"A Component-based Software Infrastructure for Ubiquitous Computing", Parallel and Distributed Computing, 2005, by Areski Flissi et al. (pp. 22) http://www.lifl.fr/ispdc2005/presentations/flissi_ispdc_slides.pdf.
"A robust image fingerprinting system using the Radon transform", Signal Processing: Image Communication 19 (2004) 325-339, May 2004, by Jin Seo et al. http://www.123seminarsonly.com/Seminar-Reports/027/60224236-Finger-Printing.pdf.
"An Authentication and Authorization Architecture for Jini Services", CrteSeer, by Oct. 2000, by Thomas Schoch et al. http://www.vs.inf.ethz.ch/publ/papers/da-schoch.pdf.
"Analysis and Prediction of Set-Top-Box Reliability in Multi-Application Environments using Artificial Intelligence Techniques", Spring Technical Forum, 2004,Louis Slothouber et al. (pp. 9) file:///C:/Users/User/Downloads/2004-analysis-and-prediction-of-set-top-box-reliability-in-multi-application-environments-using-artificial-intelligence-techniques%20(1).pdf.
"Artificial Intelligence in Cable TV Applications", Advancing Technology's Agends, Louis Slothouber et al., 2003, (pp. 8) file:///C:/Users/User/Downloads/2003-artifcial-intelligence-in-cable-tv-applications%20(2).pdf.
"Exploiting Cross Context Scripting Vulnerabilities in Firefox", Security-Assessment.com Addendum, Apr. 2010, by Nick Freeman et al. (pp. 8) http://www.security-assessment.com/files/whitepapers/Exploiting_Cross_Context_Scripting_vulnerabilities_in_Firefox.pdf.
"Design and Implementation of Fingerprinting-based Broadcasting Content Identification System", Creative Content Research Laboratory, ETRI(Electronics and Telecommunications Research Institute), Feb. 2014, by Jihyun Park et al. http://www.icact.org/upload/2014/0249/20140249_biography.pdf.
"Efficient Software-Based Fault Isolation", SOSP '93 Proceedings of the fourteenth ACM symposium on Operating systems principles, Dec. 1993, by Robert Wahbe et al. (pp. 14) http://crypto.stanford.edu/cs155/papers/sfi.pdf.
"Java and .NET Security",Secure Computer Systems, Oct. 2005 by Martin Russold et al. (pp. 6) https://www.it.uu.se/edu/course/homepage/sakdat/ht05/assignments/pm/programme/Java_and_NET.pdf.
"JAVA™ Web Start Overview", White Paper, May 2005, by Sun Microsystems, Inc. (pp. 14) http://www.oracle.com/technetwork/java/javase/jws-white-paper-150004.pdf.
"Programming the Grid with gLite", Enabling Grids for E-Science, Mar. 2006, by Laure et al. (pp. 18) http://cds/cern.ch/record/936685/files/egee-tr-2006-001.pdf.
"Shazam Turns Up the Volume on Mobile Music", Nov. 2007, by Shazam. http://news.shazam.com/pressreleases/shazam-turns-up-the-volume-on-mobile-music-890300.
"The Evolution of the JAVA Security Model", International Conference on Computer Systems and Technologies—CompSysTech' 2005, by Nikolaj Cholakov et al. (pp. 6) http://ecet.ecs.uni-ruse.bg/cst05/Docs/cp/SIII/IIIB.12.pdf.
"The iPhone Developer's Cookbook—Building Applications with the iPhone SDK", Developer's Library, 2008, by Erica Sadun. (pp. 380) http://www.ebooksbucket.com/uploads/itprogramming/iosapdeveloprnent/The_iPhone_Developers_Cookbook.pdf.
"Towards Distributed Service Discovery in Pervasive Computing Environments", IEEE Transactions on Mobile Computing, vol. 5, No. , pp. 97-112, Feb. 2006, by Dipanjan Chakraborty. https://www.computer.org/csdl/trans/tm/2006/02/h0097-abs.html.
"Twisted Python and Bonjour", Indelible.org, Jan. 2009, by Parise. http://www.indelible.org/ink/twisted-bonjour/.
"UPnP in Digital Home Networking", QuEST, by Quest Global Services, 2015. (pp. 7) https://www.quest-global.com/wp-content/uploads/2015/03/UPnP-in_Digital_Home_Networking.pdf.
"Cross Context Scripting with Firefox", Security-Assessment.com White Paper, Apr. 2010, by Roberto Liverani. (pp. 24) http://www.security-assessment.com/files/documents/whitepapers/Cross_Context_Scripting_with_Firefox.pdf.
"Vulnerabilities and Threats to Mobile Device Security From a Practitioner's Point of View", Issues in Information Systems, vol. XII, No. 2, pp. 131-193, 2011, by Joseph Laverty et al.. (pp. 13) http://iacis.org/iis/2011/181-193_AL2011_1693.pdf.
"Android (operating system)", Sep. 2008, by SPICE. (pp. 9) "http://www.si2imobility.com/spicemobiles/pdf/Support-%20FAQs/Android.pdf".
"WAP Architecture" by Wireless Application Protocol Forum, Published on Jul. 12, 2001 (pp. 24) http://www.openmobilealliance.org/tech/affiliates/wap/wap-210-waparch-20010712-a.pdf.
"EFI Framework" by Wireless Application Protocol Forum, Published on Dec. 17, 2001 (pp. 50) http://www.openmobilealliance.org/tech/affiliates/wap/wap-231-efi-20011217-a.pdf.
"Push OTA Protocol" by Wireless Application Protocol Forum, Published on Apr. 25, 2001 (pp. 44) http://www.openmobilealliance.org/tech/affiliates/wap/wap-235-pushota-20010425-a.pdf.
"Pandora on the iPhone" uploaded on YouTube on Jul. 14, 2008 by Radiopandora, found online on May 24, 2017 (pp. 28) https://www.youtube.com/watch?v=tNMSntXtPc0.
"Pioneer Brings Pandora into Your Car" uploaded on YouTube on Aug. 4, 2010 by Pioneerelectronics, found online on May 24, 2017 (pp. 16) https://www.youtube.com/watch?v=HdyOKPhBoi4.
"iDA-X305S: Control Pandora from your dash" uploaded on YouTube on Mar. 26, 2010 by AlpineTV, found online on May 24, 2017 (pp. 14) https://www.youtube.com/watch?v=8TkWI_ILVzU.
"Sync + Retarget, Extend your TV campaign to all screen in real-time" by Samba TV, found online on May 24, 2017 (pp. 4) https://samba.tv/advertising/sync-retarget/.
"Pandora system everywhere", by Pandora, found online on May 24, 2017 (pp. 9) https://www.pandora.com/everywhere.
Title: Content Interaction Methods and Systems Employing Portable Devices, U.S. Appl. No. 61/112,573, Name of Inventor: Bruce L. Davis, filed Nov. 7, 2008.
Title: Second Screen Methods and Arrangements, U.S. Appl. No. 61/152,226, Name of Inventor: Bruce L. Davis, filed Feb. 12, 2009.

(56) References Cited

OTHER PUBLICATIONS

Title: Second Screen Methods and Arrangements, U.S. Appl. No. 61/160,660, Name of Inventor: Bruce L. Davis, filed Mar. 16, 2009.
Title: Second Screen Methods and Arrangements, U.S. Appl. No. 61/167,828, Name of Inventor: Bruce L. Davis, filed Apr. 8, 2009.

* cited by examiner

| FINGERPRINT DATA SEQUENCE 2000 | FINGERPRINT DATABASE 1900 | MATCH 2002 |
|---|---|---|
| 751-242-369-520-818 | 751-242-369-520-818 | YES |
| 314-275-860-926-437 | 751-242-369-520-818 | NO |
| 314-275-860-926-437 | 751-242-369-520-818<br>314 | NO |
| 314-275-860-926-437 | 751-242-369-520-818<br>314-275 | NO |
| 314-275-860-926-437 | 751-242-369-520-818<br>314-275-860 | YES |
| 314-275-860-926-437 | 751-242-369-520-818<br>314-275-860-926 | YES |
| ... | ... | ... |

TABLE 2050 OF FINGERPRINT DATABASE 1900

FIGURE 20

| CHANNEL 2100 | FINGERPRINT DATA SEQUENCE 2000 | RECURRING SEQUENCE 2102 |
|---|---|---|
| 95.9 | 371-452-191-680-328-934-065 | UNKNOWN |
| 103.5 | 292-768-452-191-680-328-504 | UNKNOWN |
| 4 | 213-408-949-452-191-680-328 | 452-191-680-328 |
| 11 | 650-452-191-680-328-323-310 | 452-191-680-328 |
| ... | ... | ... |

TABLE 2150 OF FINGERPRINT DATABASE 1900

FIGURE 21

| FINGERPRINT DATA SEQUENCE 2000 | PROVISIONAL IDENTIFICATION 2400 |
|---|---|
| 751-242-369-520-818 | "I DREAMED A DREAM" |
| 314-275-860-926-437 | "FORREST GUMP" + "CHANNEL 4" |
| 314-275-860-926-437 | NONE |
| 314-275-860-926-437 | "FORREST GUMP" |
| 314-275-860-926-437 | "POWERPUFF GIRLS" + "CHANNEL 4" |
| 314-275-860-926-437 | "FORREST GUMP" + "KTTV" |
| 314-275-860-926-437 | "FORREST GUMP" |
| 314-275-860-926-437 | "FORREST GUMP" + "CHANNEL 11" |
| ... | ... |

TABLE 2450 OF FINGERPRINT DATABASE 1900

FIGURE 24

| FINGERPRINT DATA SEQUENCE 2000 | PROVISIONAL IDENTIFICATION 2400 | IDENTIFICATION 1304 |
|---|---|---|
| 314-275-860-926-437 | "FORREST GUMP" + "CHANNEL 4" | "FORREST GUMP" |
| 314-275-860-926-437 | "FORREST GUMP" | "FORREST GUMP" |
| 314-275-860-926-437 | "FORREST GUMP" + "KTTV" | "FORREST GUMP" |
| 314-275-860-926-437 | "POWERPUFF GIRLS" + "CHANNEL 4" | "FORREST GUMP" |
| 314-275-860-926-437 | "FORREST GUMP" | "FORREST GUMP" |
| 314-275-860-926-437 | "FORREST GUMP" + "CHANNEL 11" | "FORREST GUMP" |
| ... | ... | ... |

TABLE 2550 OF FINGERPRINT DATABASE 1900

FIGURE 25

RELEVANCY IMPROVEMENT THROUGH TARGETING OF INFORMATION BASED ON DATA GATHERED FROM A NETWORKED DEVICE ASSOCIATED WITH A SECURITY SANDBOX OF A CLIENT DEVICE

CLAIM OF PRIORITY

This patent application is a Continuation of, and hereby incorporates the entirety of the disclosures of and claims priority to each of the following cases:

(1) U.S. Provisional patent application 62/183,756 titled SECOND SCREEN NETWORKING, TARGETING, AND COMMUNICATION METHODOLOGIES AND SYSTEMS and filed on Jun. 24, 2015, (2) Co-pending U.S. Continuation patent application Ser. No. 14/018,408 titled EXPOSURE OF PUBLIC INTERNET PROTOCOL ADDRESSES IN AN ADVERTISING EXCHANGE SERVER TO IMPROVE RELEVANCY OF ADVERTISEMENTS filed on Sep. 4, 2013,
  a. which further claims priority to U.S. Provisional patent application 61/696,711 titled SYSTEMS AND METHODS OF RECOGNIZING CONTENT filed on Sep. 4, 2012,
  b. on which a Petition has been filed, but not yet granted, which requests to further claim priority to U.S. Provisional Patent Application 61/803,754 titled APPLICATIONS OF ZEROCONF BIDIRECTIONAL COMMUNICATIONS BETWEEN A NETWORKED DEVICE AND A SECURITY SANDBOX COMPRISING TARGETED ADVERTISEMENT, ENVIRONMENT AWARENESS, USER MAPPING, GEOLOCATION SERVICES, AND CONTENT IDENTIFICATION filed on Mar. 20, 2013, (3) Co-pending U.S. Continuation patent application Ser. No. 14/981,928 titled RELEVANCY IMPROVEMENT THROUGH TARGETING OF INFORMATION BASED ON DATA GATHERED FROM A NETWORKED DEVICE ASSOCIATED WITH A SECURITY SANDBOX OF A CLIENT DEVICE filed on Dec. 29, 2015,
  a. which is a U.S. Continuation patent application of Ser. No. 14/744,045 titled TARGETED ADVERTISING AND ATTRIBUTION ACROSS MULTIPLE SCREENS BASED ON PLAYING GAMES ON A GAME CONSOLE THROUGH A TELEVISION filed on Jun. 19, 2015,
    i. which further claims priority to U.S. Provisional patent application 62/026,017 titled AUTOMATIC GAMING ADVERTISEMENT IDENTIFICATION, TIME STAMPING, AND CATALOGING BASED ON VIEWING HISTORY OF A USER OPERATING A MOBILE DEVICE COMMUNICATIVELY COUPLED WITH A NETWORKED TELEVISION, AND DELIVERY OF A TARGETED ADVERTISEMENT TO THE MOBILE DEVICE BASED ON THE IDENTIFICATION AND CATALOGING WITHIN A THRESHOLD AMOUNT OF TIME FROM A TIME STAMP OF AN IDENTIFIED ADVERTISEMENT DISPLAYED ON THE NETWORKED TELEVISION filed on Jul. 17, 2014,
  b. which is a U.S. Continuation patent application of Ser. No. 14/274,800 titled "MONETIZATION OF TELEVISION AUDIENCE DATA ACROSS MULTIPLE SCREENS OF A USER WATCHING TELEVISION" filed on May 12, 2014 and issued as U.S. Pat. No. 9,258,383 on Feb. 9, 2016,
    i. which itself is a U.S. Continuation patent application of Ser. No. 13/943,866 titled RELEVANCY IMPROVEMENT THROUGH TARGETING OF INFORMATION BASED ON DATA GATHERED FROM A NETWORKED DEVICE ASSOCIATED WITH A SECURITY SANDBOX OF A CLIENT DEVICE filed on Jul. 17, 2013 and issued as U.S. Pat. No. 8,819,255 on Aug. 26, 2014,
      1. which further is a U.S. Continuation patent application of Ser. No. 13/904,015 titled REAL-TIME AND RETARGETED ADVERTISING ON MULTIPLE SCREENS OF A USER WATCHING TELEVISION filed on May 28, 2013 and issued as U.S. Pat. No. 9,026,668 on May 5, 2015,
        a. which further claims priority to U.S. Provisional patent application 61/652,153 titled CONTENT RECOGNITION SYSTEM filed on May 26, 2012,
      2. which further is a U.S. Continuation patent application of Ser. No. 13/736,031 titled ZERO CONFIGURATION COMMUNICATION BETWEEN A BROWSER AND A NETWORKED MEDIA DEVICE filed on Jan. 7, 2013 and issued as U.S. Pat. No. 9,154,942 on Oct. 6, 2015,
        a. which further claims priority to U.S. Provisional patent application 61/584,168 titled CAPTURING CONTENT FOR DISPLAY ON A TELEVISION and filed on Jan. 6, 2012,
      3. which further is a U.S. Continuation patent application of Ser. No. 13/470,814 titled GENERATION OF A TARGETED ADVERTISEMENT IN AN UNTRUSTED SANDBOX BASED ON A PSUEDONYM filed on May 14, 2012 and granted into U.S. Pat. No. 8,539,072 of Sep. 17, 2013,
        a. which itself is a U.S. Continuation patent application of Ser. No. 12/592,377 titled DISCOVERY, ACCESS CONTROL, AND COMMUNICATION WITH NETWORKED SERVICES FROM WITHIN A SECURITY SANDBOX, filed on Nov. 23, 2009 and granted into U.S. Pat. No. 8,180,891 on May 15, 2012,
          i. which claims priority to U.S. Provisional patent application 61/118,286 titled DISCOVERY, ACCESS CONTROL, AND COMMUNICATION WITH NETWORKED SERVICES FROM WITHIN A SECURITY SANDBOX filed on Nov. 26, 2008.

FIELD OF TECHNOLOGY

This disclosure relates generally to the technical field of networking, data recognition systems, and data recommendation systems. More particularly, this disclosure relates to a method, apparatus, and system of relevancy improvement through targeting of information based on data gathered from a networked device associated with a security sandbox of a client device in one example embodiment.

BACKGROUND

A networked device (e.g., a television, a set-top box, a computer, a multimedia display, an audio device, a weather measurement device, a geolocation device) may have access to an information associated with a user. For example, the information may comprise an identification of a movie viewed by the user, a weather information, a geolocation information, and/or a behavioral characteristic of the user when the user interacts with the networked device. However, the user may need to configure the networked device to share the information with an other networked device. For example, the user may need to read a manual to understand a configuration protocol. The user may be unable to understand the configuration protocol. As such, the user may spend a significant amount of customer support time in configuring the networked device. Alternatively, the user may need to expend a significant amount of financial resources for a network administrator to assist the user in configuring the networked device. As a result, the user may give up and remain unable to configure the networked device to share the information with the other networked device.

Furthermore, the networked device may present to the user an information that is irrelevant to the user. As a result, the user may get tired, annoyed, and/or bored with the networked device. Additionally, the user may waste a significant amount of time processing the information that is irrelevant to the user. Therefore, a revenue opportunity may be missed, because an interested party (e.g., a content creator, a retailer, a manufacturer, an advertiser) may be unable to access an interested audience. In addition, the user may be inconvenienced when the information on the networked device and the client device remain independent of each other.

SUMMARY

A method, apparatus, and system related to relevancy improvement through targeting of information based on data gathered from a networked device associated with a security sandbox of a client device are disclosed. In one aspect, a method of a relevancy-matching server includes matching primary data generated from a fingerprint data with targeted data using the relevancy matching server based on a relevancy factor, and locating in a storage the targeted data, a reference to the targeted data, and/or a metadata of the targeted data. A mobile device is associated with a television. An executable environment is constrained in a security sandbox of the mobile device. A sandboxed application is executed in the executable environment capable of bypassing at least one access control of the security sandbox. An embedded object from the relevancy-matching server is processed in the sandboxed application. The television and/or the mobile device are to generate the fingerprint data from characteristic features of media data. The relevancy-matching server is to match the targeted data with the primary data such that the relevancy-matching server is to locate in the storage a matching item and/or a related item based on a relevancy factor.

The methods, system, and/or apparatuses disclosed herein may be implemented in any means for achieving various aspects, and may be executed in a form of machine readable medium embodying a set of instruction that, when executed by a machine, causes the machine to perform any of the operations disclosed herein. Other features will be apparent from the accompanying drawing and from the detailed description that follows.

BRIEF DESCRIPTION OF DRAWINGS

Example embodiments are illustrated by way of example and not limitation in the figures of the accompanying drawings, in which like references indicate similar elements and in which:

FIG. 20 is a table 2050 depicting a determination of the identification 1304 of the media data 1004 by comparing a fingerprint data sequence 2000 to a fingerprint database 1900, according to one embodiment.

FIG. 21 is a table 2150 depicting a determination of a recurring sequence 2102, according to one embodiment.

FIG. 24 is a table view of the content identification server 1006 gathering a provisional identification 2400 of the media data 1004 and a number of other provisional identifications 2400 of a number of other media data 1108, 1112, according to one embodiment.

FIG. 25 is a table view of the content identification server 1006 determining the identification 1304 of the media data 1004 based on a consensus, according to one embodiment.

Other features of the present embodiments will be apparent from the accompanying drawings and from the detailed description that follows.

DETAILED DESCRIPTION

Example embodiments, as described below, relate to a method, an apparatus, and a system related to relevancy improvement through targeting of information based on data gathered from a networked device associated with a security sandbox of a client device, according to one or more embodiments.

Figure 1:
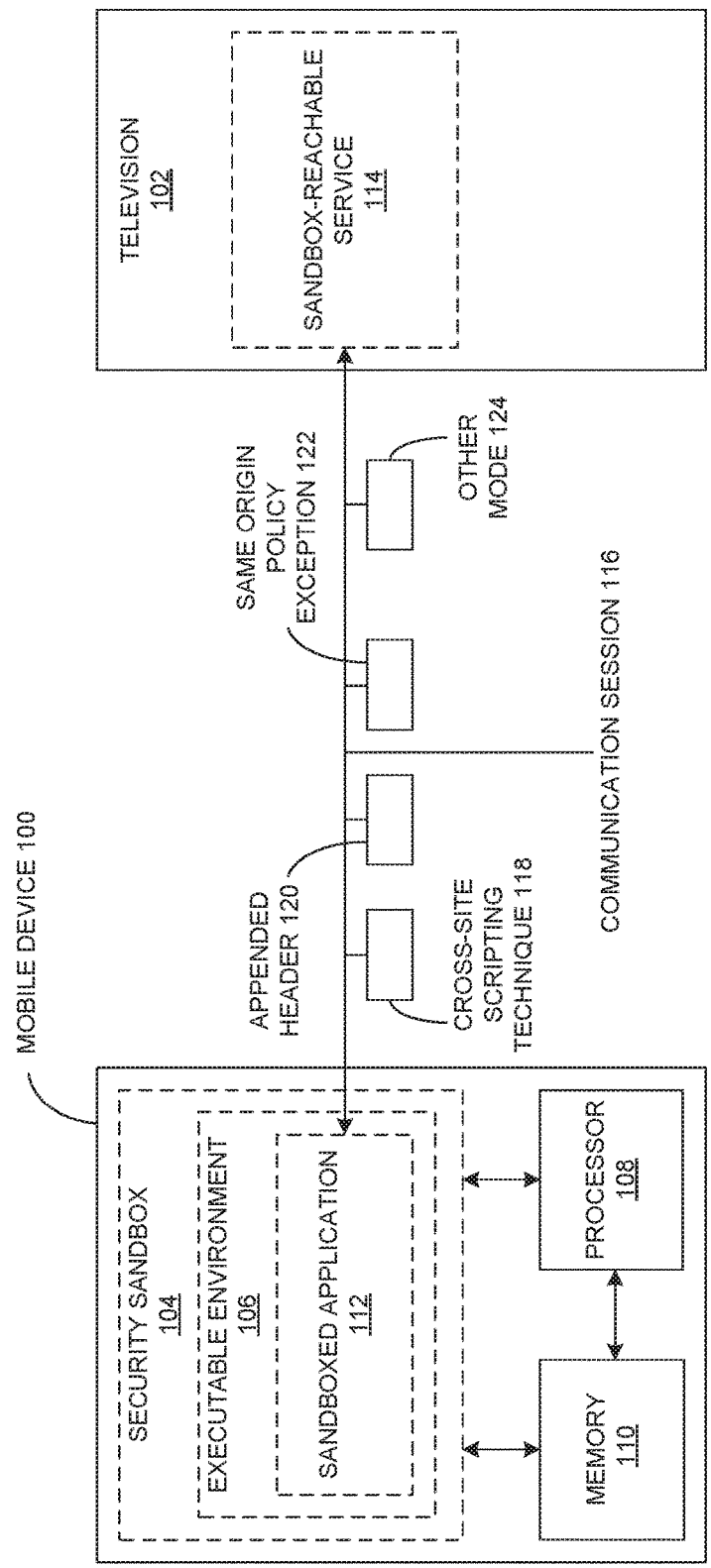
FIG. 1 is a block diagram depicting a system of automatic bidirectional communication between multiple devices, according to one embodiment.

FIG. 1 is a block diagram depicting a system of automatic bidirectional communication (e.g., sending and receiving information in both directions without prior configuration by a human) between multiple devices, according to one embodiment. FIG. 1 shows a client device 100, a networked device 102, a security sandbox 104, an executable environment 106, a processor 108, a memory 110, a sandboxed application 112, a sandbox-reachable service 114, a communication session 116, a cross-site scripting technique 118, an appended header 120, a same origin policy exception 122, and an other mode 124. The client device 100 communicates bidirectionally with the networked device 102 of FIG. 1.

According to one embodiment, the client device 100 may be a computer, a smartphone, and/or an other hardware that may be configured to initiate contact with a server to make use of a resource. The client device 100 may constrain the executable environment 106 in the security sandbox 104. The client device 100 may also execute the sandboxed application 112 in the executable environment 106 using the processor 108 and the memory 110. Further, the client device 100 may automatically establish the communication session 116 between the sandboxed application 112 and the sandbox-reachable service 114 of the networked device 102. The communication session 116 may be established between the sandboxed application 112 and the sandbox-reachable service 114 through the cross-site scripting technique 118, the appended header 120, the same origin policy exception 122, and/or the other mode 124 of bypassing a number of (e.g., at least one) access controls of the security sandbox 104.

According to one embodiment, the networked device 102 may be a geolocation device, a hygrometer, a thermometer, a barometer, an anemometer, a television, an audio device, a game console, a set top box, an other computer, and/or an other hardware connected by a number of communications channels that allow sharing of a number of resources and/or a number of information. The networked device 102 may perform a number of sandbox-reachable services (e.g., a geolocation service, a hygrometer service, a thermometer service, an anemometer service, a barometer service, a content identification service 1002, a Media Access Control address service, a private Internet Protocol address service) using a processor and a memory. Thus, the networked device 102 may generate a primary data 500 and/or a preliminary data 702. The primary data 500 and/or the preliminary data 702 may be associated with a user 902.

The networked device 102 may also be configured to automatically announce the sandbox-reachable service 114 of the networked device 102 to a discovery module 302 prior to an establishment of the communication session 116 between the sandboxed application 112 and the sandbox-reachable service 114. A service agent module of the networked device 102 may coordinate a number of communications with the discovery module 302 by listening on a socket, acting as a means for a number of services on the networked device 102 to discover each other, and/or announcing on behalf of the number of services. An announcement may identify the sandbox-reachable service 114 being offered and how to reach the sandbox-reachable service 114 (e.g., by communicating an identification data 304 of the networked device 102 and/or the sandbox-reachable service 114 of the networked device 102). Thus, the client device 100 may be configured to automatically process the identification data 304 of the networked device 102 and/or the sandbox-reachable service 114 of the networked device 102 from the discovery module 302. The client device 100 may also be configured to automatically associate with the networked device 102 through the sandboxed application 112 of the client device 100 communicatively coupled to the sandbox-reachable service 114 based on the identification data 304.

For example, the geolocation service may be announced by performing a HTTP POST to a URL http://flingo.tv/fling/announce with a body {
"service": "gps",
"model_id": "Foo GPS Z5",
"guid": "8df5f7271e36cdbc4db4513a9e660817ff0fa94a",
"description": "Service providing local GPS coordinates"
}

The announcement may also contain the primary data 500. Thus, the announcement may contain the body {
"service": "gps",
"model_id": "Foo GPS Z5",
"guid": "8df5f7271e36cdbc4db4513a9e660817ff0fa94a",
"description": "Service providing local GPS coordinates", "latitude": 43.60336,
"longitude": −110.7362
}
Alternatively, the primary data 500 may be separated from a service description such that the URL specifies the service description while the body specifies the primary data 500 provided by the service. For example,
http://flingo.tv/fling/announce?service=gps&model_id=Foo+GPS+Z5&guid=8df5f7271e36cdbc4db4513a9e660817ff0fa94a&description=Service+providing+local+GPS+coordinates with the body
{
"latitude": 43.60336,
"longitude": −110.7362
}
The primary data 500 may take an XML format, a JSON format, a binary format, and/or an other format. A wireless base station may be instrumented with a number of networked devices (e.g., a set of sensors) to announce the primary data 500 about an environment.

The networked device 102 may also announce an availability of the sandbox-reachable service 114 across a range of public addresses such that the sandboxed application 112 communicates with the sandbox-reachable service 114 in any one of the range of public addresses. However, the range of public addresses may be known by a pairing server 300 such that the announcement of the availability of the sandbox-reachable service 114 across the range of public addresses is unnecessary. Thus, the sandbox-reachable service 114 may communicate a global unique identifier (GUID) 704, an alphanumeric name, and/or a private address pair of the sandbox-reachable service 114 to the pairing server 300. The private address pair may comprise (e.g., include, but not be limited to) a private Internet Protocol (IP) address and a port number associated with the sandbox-reachable service 114.

Further, the networked device 102 may render (e.g., present, transmit in a consumable format, deliver) a media data 1004 to the user 902. The media data 1004 may comprise a television program, a movie, a musical composition, a newspaper article, a web page, or an advertisement. When the networked device 102 comprises a media device (e.g., a hardware that renders a published information), the networked device 102 may comprise a networked media device, an other networked media device 1106A, 1106B, and/or a heterogeneous (e.g., incompatible with an operating system and/or the sandboxed application 112 of the client device 100) networked media device.

The content identification (CID) service 1000, 1002 and/or an other CID service 1104, 1110 may comprise a provision of a discrete function of identifying the content of the media data 1004 and/or an other media data 1108, 1112, 1904 within a systems environment. The CID service 1000, 1002 and/or the other CID service 1104, 1110 may employ a number of methods (e.g., a fingerprinting method, a watermarking method, a metadata extraction method) for determining an identification 1304 (e.g., a content identification) of the media data 1004. The CID service 1000, 1002 and/or the other CID service 1104, 1110 may be a hardware, a software, a firmware, and/or an integrated circuit. The sandbox-reachable service 114 may comprise the CID service 1002 of the networked device 102. The CID service 1002 of the networked device 102 may also communicate the identification 1304 of the media data 1004 to the sandboxed application 112 through the communication session 116 and/or the announcement.

For example, the networked device 102 offering the CID service 1002 may announce http://flingo.tv/fling/announce with the body {
"service": "cid",
"make": "Whiz Bang",
"model_id": "WZB1000",
"description": "Identifies content currently being viewed on the TV.",
"private_ip": ["192.168.1.12:8080"]
}

The sandboxed application 112 may then discover the number of sandbox-reachable services. For example, the sandboxed application 112 may use the cross-site scripting technique 118 based on a script tag (e.g., using a JSONP technique, using a jQuery® JavaScript library). <script type="text/javascript">
function cb (x) {
var s=JSON.stringify (x,undefined, 4);
document.getElementById ("result")
.innerHTML="<pre>"+s+"</pre>";
}
function jsonp (url, cb){
$.ajax({url: url, dataType: 'jsonp', success: cb,
error: function ( ) {
alert ("jsonp failed for url="+url);
},
timeout: 5000});
}
var doit=function ( ) {
jsonp ('http://flingo.tv/fling/discover', cb);
}
$ (document).ready (doit);
</script>
Thus, the sandboxed application 112 containing a list of a number of devices and/or a number of services on a network (e.g., a local area network, a multicast network, an anycast network, a multilan network, a private network, and/or an other collection of hardware interconnected by communication channels that allow sharing of resources and information) is created.
{
"count": 1,
"yourip": "208.90.215.161",
"interval": 900,
"devices": [
{
"model_id": "WZB1000",
"description": "Whiz Bang 1000 100\" OLED TV",
"make": "Whiz Bang Inc.",
"t": 1325643090,
"services": [
{
"description": "Identifies content currently being viewed on the TV.",
"service": "cid",
"t": 1325643090,
"version": "2011-12-29T22:10:56-cc4dc7b20cle",
"private_ip": ["192.168.1.12:8080"],
"name": "FLINGO Content ID"
},
{
"description": "Service for playing flung videos.",
"service": "flingo",
"name": "Fling Queue",
}
],
"guid":
"8821877d58ce99ef54aa370419529e2fab40dad2",
},
]
}

A discovery may also be limited to the number of devices providing a particular service. For example, the discovery may be limited to a number of CID services 1000, 1002 by querying http://flingo.tv/fling/discover?service=cid The sandboxed application 112 may then extract the GUID 704 of the networked device 102. The sandboxed application 112 may also query the sandbox-reachable service 114 of the networked device 102 (e.g., using JSONP).
<script>
. . .
  jsonp(http://flingo.tv/cid/content_id?guid=+guid, id_cb);
. . .
  function id_cb(id) {
  alert("content_id="+id.content_id);
  }
</script>
Thus, the sandboxed application 112 may obtain the identification 1304 of the media data 1004 from the CID service 1002. Similarly, the sandboxed application 112 may obtain the primary data 500 from the sandbox-reachable service 114 of an intermediary networked device that communicates with a sandbox-unreachable service of the networked device 102.

Additionally, the identification 1304 of the media data 1004 may be used to query for a number of metadata associated with the identification 1304 of the media data 1004. For example, the identification 1304 "t:22343: 959030" may correspond to "The Office" episode titled "Ben Franklin."
$ curl "http://flingo.tv/cid/metadata?content_id=t:22343: 959030"
{
"show_url": "http://www.tv.com/shows/the-office/",
"show_id": "22343",
"content_type": "tv_show",
"show_desc": "The Office: Based on the popular British series of the same name, this faster-paced American version follows the daily interactions of a group of . . . ",
"timestamp": 1313480002.472693,
"ep_desc": "Michael celebrates Phyllis' wedding shower by bringing two performers into the office: a stripper and a Ben Franklin impersonator. Meanwhile, Karen confronts Pam about her past history with Jim.",
"ep_url": "http://www.tv.com/shows/the-office/ben-franklin-959030/",
"ep_id": "959030",
"guide": "TV.com",
. . .
}

The security sandbox 104, the processor 108, and the memory 110 each exist within the client device 100 of FIG. 1 and communicate bidirectionally with each other. According to one embodiment, the security sandbox 104 may be the operating system on which the sandboxed application 112 is hosted, a browser application of the operating system, and/or an other mechanism for separating a number of running programs to execute an untested code and/or a number of untrusted programs from a number of unverified third-parties, a number of suppliers, a number of untrusted users, and/or a number of untrusted websites.

Each of a number of applications of a web browser and/or a mobile device may be constrained inside the security sandbox 104. The security sandbox 104 may constrain what each of the number of applications is allowed to do. For example, the security sandbox 104 may limit access to the network, thereby making it difficult for the client device 100 to find the networked device 102 of the user 902 and/or to obtain information directly from the networked device 102. Such information may include what is currently playing on the networked device 102.

The mobile device may also impose the security sandbox 104. The security sandbox 104 of the mobile device may exist at an operating system level. The operating system of the mobile device may differ from a traditional operating system in that the traditional operating system mostly applied a security to the user 902, a number of individual files, and/or a number of individual directories so that a user application could not corrupt the traditional operating system. This is different from having a separate security sandbox for each of the number of applications so that each of the number of applications cannot access a data of an other application and/or limiting a specific application from having access to a number of operating system services (e.g., a GPS service, a network service).

According to one embodiment, the processor 108 may be a central processing unit (CPU), a microprocessor, an integrated circuit such as an application-specific integrated circuit (ASIC), a hardwired electronic logic circuit, a discrete element circuit, a programmable logic device such as a field-programmable gate array (FPGA), and/or an other part of a computer system that carries out the instructions of a program by performing the arithmetical, logical, and/or input/output operations of the system. According to one embodiment, the memory 110 may be a random access memory (RAM), a read only memory (ROM), a flash memory, and/or an other machine-readable storage media.

The executable environment 106 exists within the security sandbox 104 of FIG. 1. According to one embodiment, the executable environment 106 may be a virtual machine, a jail, a scripting language interpreter, a scratch space on a disk and/or a memory, and/or an other tightly controlled set of resources in which to run a number of guest programs.

The sandboxed application 112 exists within the executable environment 106 of FIG. 1. According to one embodiment, the sandboxed application 112 and/or an other sandboxed application may be an untested code, an untrusted program (e.g., from an untrusted web page), and/or an other software that can be executed with an appropriate runtime environment of the security sandbox 104.

The sandbox-reachable service 114 exists within the networked device 102 of FIG. 1. According to one embodiment, the sandbox-reachable service 114 may be a smart television application, a set top box application, an audio device application, a game console application, a computer application, and/or an other service that can be discovered and/or communicated with from within the security sandbox 104. The sandbox-reachable service 114 may comprise the other sandboxed application when the sandbox-reachable service 114 is constrained by the security sandbox 104 of a device in which the sandbox-reachable service 114 resides.

The communication session 116 exists between the client device 100 and the networked device 102 of FIG. 1. According to one embodiment, the communication session 116 may be an information interchange between two terminals. The communication session 116 may exist directly between the client device 100 and the networked device 102. Alternatively, the communication session 116 may exist indirectly between the client device 100 and the networked device 102 (e.g., through the pairing server 300).

The cross-site scripting technique 118 exists as a component of the communication session 116 of FIG. 1. According to one embodiment, the cross-site scripting technique 118 may be a type of a computer security vulnerability that enables an injection of a client-side script to bypass the number of access controls.

The appended header 120 also exists as a component of the communication session 116 of FIG. 1. According to one embodiment, the appended header 120 may be a mechanism (e.g., a cross-origin resource sharing) that allows a cross-domain request by adding a new header (e.g., an origin header, a referrer header).

Additionally, the same origin policy exception 122 exists as a component of the communication session 116 of FIG. 1. According to one embodiment, the same origin policy exception 122 may be a technique for relaxing a rule preventing an access to a number of methods and/or a number of properties across a number of pages on a number of different sites. For example, a hyperlink, a form, a script 706, a frame, a header, and/or an image 502 may be used to establish the communication session 116.

Further, the other mode 124 exists as a component of the communication session 116 of FIG. 1. According to one embodiment, the other mode 124 may be a mechanism of bypassing the number of access controls of the security sandbox 104. The other mode 124 may enable the discovery via a multicast-based discovery protocol, a broadcast-based discovery protocol, and/or an anycast-based discovery protocol. The other mode 124 may also enable a pairing via an entry of a short code and/or an account name in the client device 100 and/or the networked device 102. For example, the other mode 124 may comprise a Facebook® Connect feature and/or an OAuth service.

Figure 2:
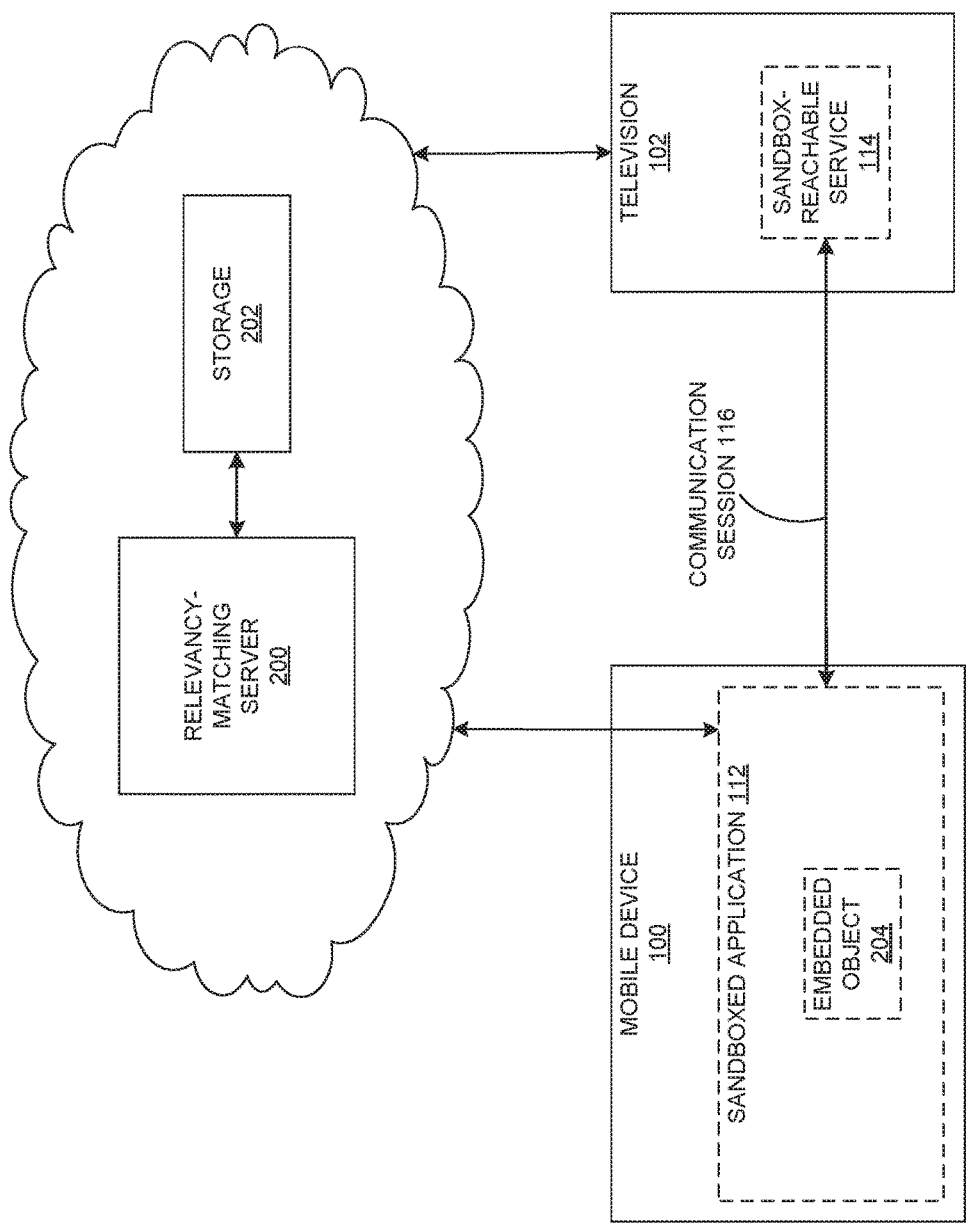
FIG. 2 is a block diagram depicting a system of bidirectional communication between a relevancy-matching server 200, a client device 100, and a networked device 102, according to one embodiment.

FIG. 2 depicts a system of bidirectional communication between a relevancy-matching server 200, the client device 100, and the networked device 102, according to one embodiment. FIG. 2 shows the client device 100, the networked device 102, the sandboxed application 112, the sandbox-reachable service 114, the communication session 116, the relevancy-matching server 200, a storage 202, and an embedded object 204.

The relevancy-matching server 200 exists in the cloud 712 and is communicatively coupled to the storage 202, the client device 100, and the networked device 102 of FIG. 2. According to one embodiment, the relevancy-matching server 200 may be a computer hardware system dedicated to matching, using a processor and a memory, a targeted data 800 with the primary data 500 based on a relevancy factor associated with the user 902. The relevancy factor may comprise a category of the primary data 500, a behavioral history of the user 902, a category of the sandboxed application 112, and/or an other information associated with the user 902. The relevancy-matching server 200 may comprise a computer, a plurality (e.g., at least two) of computers, and/or a peer-to-peer network of computers. The relevancy-matching server 200 may be the pairing server 300 and/or an intermediary server 700. The relevancy-matching server 200 may also be configured to render the targeted data 800 to the user 902 through the networked device 102 and/or the sandboxed application 112 of the client device 100.

The storage 202 also exists in the cloud 712 and is communicatively coupled to the relevancy-matching server 200 of FIG. 2. According to one embodiment, the storage 200 may be a technology comprising a number of computer components and/or a recording media used to retain a digital data. The storage 200 may be a volatile memory, a non-volatile memory, a disk, and/or an other repository of the targeted data 800. The storage 200 may exist within the relevancy-matching server 200. Alternatively, the storage 200 may be external to the relevancy-matching server 200.

The storage 200 may also reside on a different network from the relevancy-matching server 200. The relevancy-matching server 200 may match the targeted data 800 with the primary data 500 by searching the storage 200 for a matching item and/or a related item based on the relevancy factor.

The embedded object 204 exists within the sandboxed application 112 of FIG. 2. According to one embodiment, the embedded object 204 may be the script 706, the image 502, a player, an iframe, and/or an other external media included in the sandboxed application 112. The sandboxed application 112 of the client device 100 may process the embedded object 204 from the relevancy-matching server 200 (e.g., by pulling in the embedded object 204 from the relevancy-matching server 200). The client device 100 may also gather the primary data 500 through the embedded object 204 and/or the sandboxed application 112. When the embedded object 204 comprises a statically rendered object (e.g., the image 502), the sandboxed application 112 may be configured to gather the primary data 500 from the networked device 102 through the communication session 116. When the embedded object 204 comprises an executable code 600 (e.g., the script 706, the player, the iframe), the executable code 600 may be configured to gather the primary data 500 from the networked device 102 through the communication session 116 (e.g., by discovering and querying a number of reachable devices for the primary data 500).

For example, the user 902 may visit example.com and download a web page index.html from example.com. The index.html web page may pull in the script 706 <SCRIPT>*s* from the relevancy-matching server 200 example_ads.com. The script 706 may use an extension 404 and/or the pairing server 300 to discover and query the networked device 102 for the primary data 500. If the primary data 500 comprises the identification 1304 of the media data 1004, the script 706 may pull in a JavaScript code that uses a XMLHttpRequest to perform a HTTP GET request to an URL http://flingo.tv/fling/discover?service=cid A discovery service (e.g., detects the number of devices and/or the number of services on the network) may return a list of the number of devices in the network of the user 902 that offer the CID service 1000, 1002. If one of the number of devices has the GUID 704 "f51eba3ab7c3410379e9dcfeb58bb3d3878a2978", the script 706 may query for the identification 1304 of the media data 1004 using http://flingo.tv/cid/content_id?guid= f51eba3ab7c3410379e9dcfeb58bb3d3878a2978 A state for the networked device 102 with the GUID 704 may be maintained inside a content identification server 1006 (e.g., a computer hardware system dedicated to identifying a content of the media data 1004 and/or the other media data 1108, 1112, 1904 using a processor and a memory). In response, the content identification server 1006 may return {
"count": 253,
"rel_ts": 262604,
"content_id": "SH006197570000",
"ts": 1344045862604,
"notifications": [ ]
}

The client device 100 may communicate the primary data 500 to the relevancy-matching server 200 through the embedded object 204. When the relevancy-matching server 200 has the primary data 500, the relevancy-matching server 200 may use the primary data 500 to select the targeted data 800 to render to the user 902. The relevancy-matching server 200 may synchronize the targeted data 800 on the client device 100 to the primary data 500 on the networked device 102.

For example, a web page starting from zero knowledge may query the networked device 102 offering the sandbox-reachable service 114 to learn the temperature and/or the humidity in the locale of the user. The web page may then be automatically modified accordingly.

Figure 3:
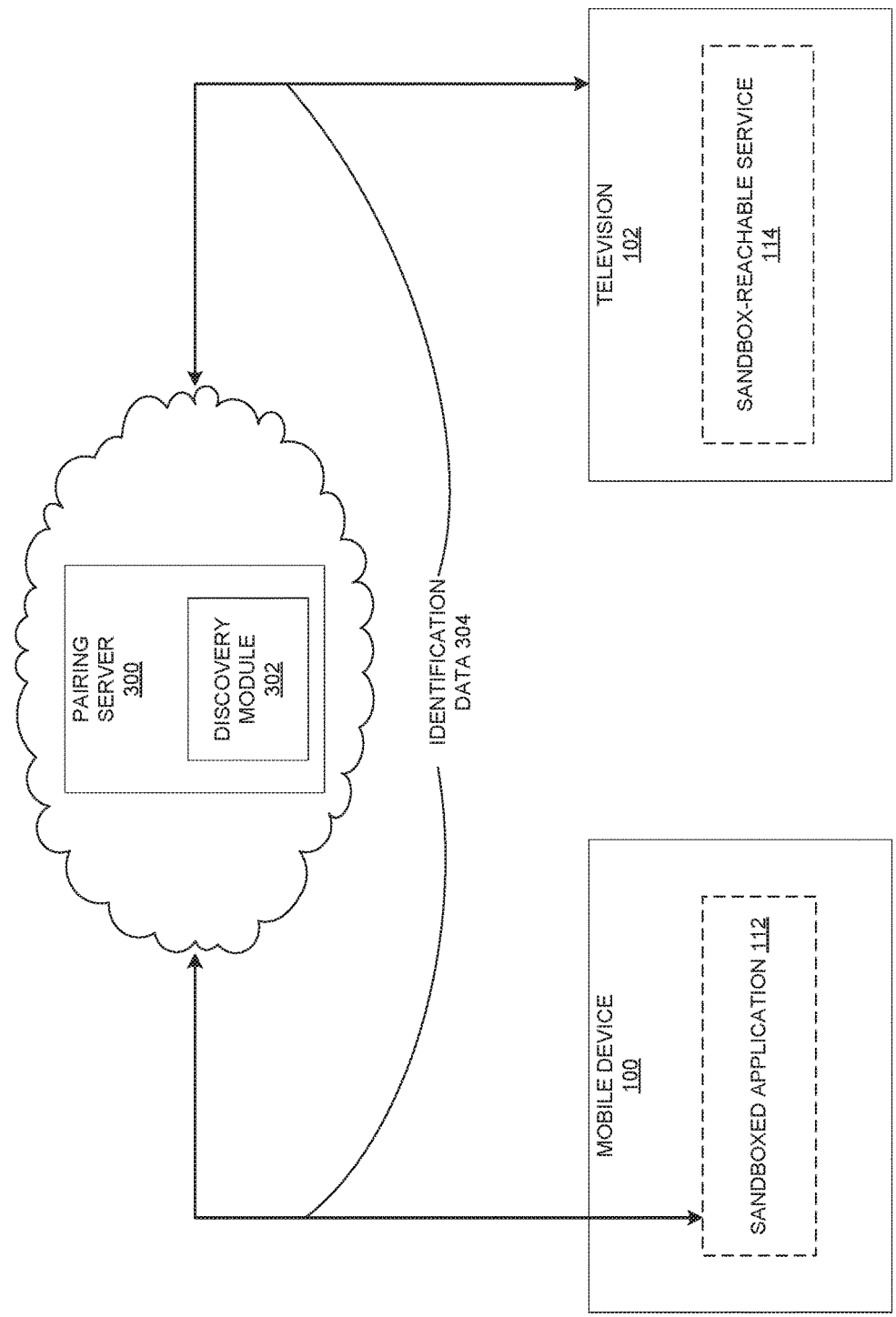
FIG. 3 is a block diagram depicting a system of performing a discovery through a pairing server 300, according to one embodiment.

FIG. 3 depicts a system of performing the discovery through the pairing server 300, according to one embodiment. FIG. 3 shows the client device 100, the networked device 102, the sandboxed application 112, the sandbox-reachable service 114, the pairing server 300, the discovery module 302, and the identification data 304.

The pairing server 300 exists in the cloud 712 and is communicatively coupled to the client device 100 and the networked media device 102 of FIG. 3. According to one embodiment, the pairing server 300 may be a computer hardware system dedicated to enabling, using a processor and a memory, the communication session 116 between the sandboxed application 112 and the sandbox-reachable service 114. The pairing server 300 may comprise a computer, a plurality of computers, and/or a peer-to-peer network of computers. The pairing server 300 may also be the relevancy-matching server 200 and/or the intermediary server 700

The client device 100 may be configured to process the identification data 304 of the networked device 102 and/or the sandbox-reachable service 114 of the networked device 102 in a manner such that the client device 100 is configured to access the discovery module 302 of the pairing server 300. The pairing server 300 may be configured to receive in the announcement from the networked device 102 and to communicate to the client device 100 the identification data 304 when a shared network is determined to be commonly associated with the client device 100 and the networked device 102.

The pairing server 300 may also provide a relay service (e.g., transmits a data between two terminals that are incapable of communicating directly) between the client device 100 and the networked device 102. A WebSocket (e.g., a web technology providing a number of full-duplex communications channels over a single Transmission Control Protocol connection) and/or a long-polling message query interface may be used to reduce a latency of a message delivery in a manner such that a polling period between a number of consecutive pollings may be less than a timeout period of a session through the relay service. However, when the pairing server 300 communicates the hardware address of the networked device 102 (e.g., a MAC address) and/or the private address pair of the sandbox-reachable service 114 to the client device 100, the client device 100 may communicate directly with the networked device 102 (i.e. bypassing the relay service of the pairing server 300).

The discovery module 302 exists within the pairing server 300 of FIG. 3. According to one embodiment, the discovery module 302 may be a self-contained component that performs the discovery service. The discovery module 302 may also be a software, a hardware, a firmware, and/or an integrated circuit. The client device 100 may access the discovery module 302 of the pairing server 300 to perform the discovery.

The identification data 304 exists between the pairing server 300 and the client device 100 as well as between the pairing server 300 and the networked device 102 of FIG. 3. According to one embodiment, the identification data 304 may comprise a geolocation, the GUID 704, the alphanumeric name, the hardware address associated with the networked device 102, a public address pair (e.g., a public Internet Protocol address and a port number) associated with the sandbox-reachable service 114 of the networked device 102, and/or the private address pair associated with the sandbox-reachable service 114 of the networked device 102. The identification data 304 may enable the communication session 116 between the client device 100 and the networked device 102 when the client device 100 and the networked device 102 no longer reside on the shared network.

Figure 4:
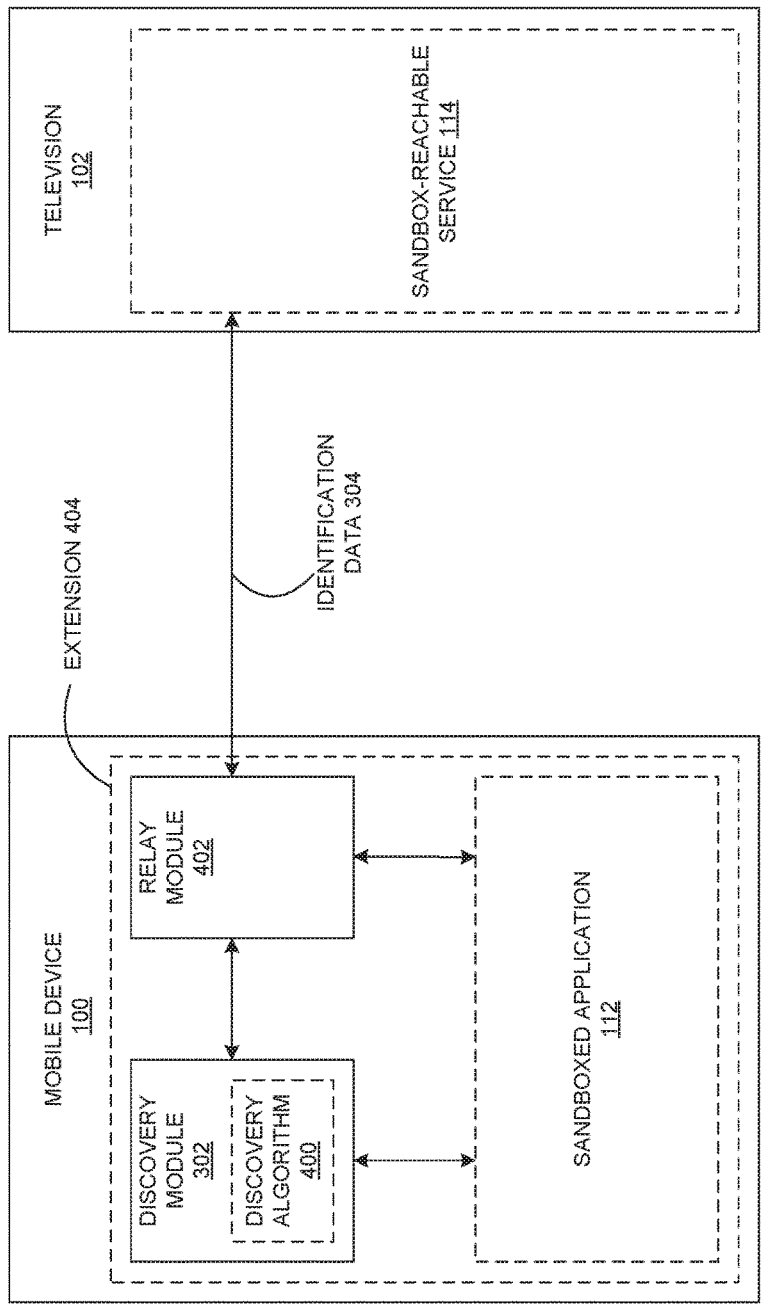
FIG. 4 is a block diagram depicting a system of bidirectional communication between the client device 100 and the networked device 102 using an extension 404 of a security sandbox 104, according to one embodiment.

FIG. 4 is a block diagram depicting a system of bidirectional communication between the client device 100 and the networked device 102 using the extension 404 of the security sandbox 104, according to one embodiment. FIG. 4 shows the client device 100, the networked device 102, the sandboxed application 112, the sandbox-reachable service 114, the discovery module 302, the identification data 304, a discovery algorithm 400, a relay module 402, and the extension 404.

The discovery algorithm 400 exists within the discovery module 302 of FIG. 4. According to one embodiment, the discovery algorithm 400 may be a procedure for detecting the number of devices and/or the number of services on the network. The discovery algorithm 400 may utilize a protocol comprising a Bonjour® protocol, a Simple Service Discovery Protocol (SSDP) protocol, a local service discovery (LSD) uTorrent® protocol, a multicast protocol, an anycast protocol, and/or a local area network (LAN)-based protocol that discovers a number of services in a LAN 708 based on a broadcast from any one of an operating system service, the security sandbox 104, the client device 100, the sandbox-reachable service 114, and the networked device 102.

The relay module 402 exists within the extension 404 and communicates with the sandboxed application 112, the discovery module 302, and the sandbox-reachable service 114 of FIG. 4. According to one embodiment, the relay module 402 may be a self-contained component that performs the relay service. The relay module 402 may also be a software, a hardware, a firmware, and/or an integrated circuit.

The extension 404 of the security sandbox 104 exists within the client device 100 of FIG. 4. According to one embodiment, the extension 404 may be a program adding a number of capabilities of the discovery module 302 and/or the relay module 402 to the sandboxed application 112. The extension 404 may be a plugin, an add-on, and/or an addition to a core functionality (e.g., a modification of a core code and/or a runtime) of the sandboxed application 112. The client device 100 may extend the security sandbox 104 with the discovery module 302 and the relay module 402 added to the security sandbox 104. The sandboxed application 112 of the client device 100 may use the extension 404 to process the identification data 304 of the networked device 102 and/or the sandbox-reachable service 114 of the networked device 102.

When the client device 100 pairs with the networked device 102, the automatic bidirectional communication may comprise the client device 100 pushing the media data 1004 to the networked device 102. According to one exemplary embodiment, the sandboxed application 112 of the client device 100 may be a web browser. The user may visit a web page and drag a bookmark from the web page to a bookmark bar of the web browser. The bookmark may comprise a bookmarklet (e.g., the bookmark that contains a number of JavaScript commands). The bookmarklet may not be constrained to a same origin policy and may send and/or receive a number of results using a XmlHttpRequest exchanged directly with the discovery service and/or the relay service.

A bookmarklet remote procedure call (RPC) may communicate a private broadcast to the number of services in the network. Alternatively, the bookmarklet RPC may send a discovery request to the discovery service to find the number of services in the network and then communicate via the relay service with the number of services in the network. If the discovery service and/or the relay service returns a number of private address pairs, the bookmarklet may use the XmlHttpRequest to directly communicate with the number of devices in the network and/or perform a number of RPC calls.

The bookmarklet may forward a property (e.g., a window.location.href property) that returns the URL of the web page to the discovery service and/or the relay service. A new web page may be opened to request that the user confirm an intent to push the media data 1004 to the networked device 102. A form may be presented to request that the user select the networked device 102 to receive the media data 1004. The discovery service and/or the relay service may discover a number of networked media devices sharing a local network based on an IP address of the client device 100.

A device (e.g., the pairing server 300, the client device 100, a server) in which the discovery service and/or the relay service exists and/or an other device (e.g., an other server) to which the discovery service and/or the relay service communicates the URL of the web page may extract a raw URL. The device and/or the other device may also use a fragile code to extract a metadata from the web page. For example, http://www.youtube.com/watch?v=FMRg11h QLds corresponds to a YouTube® web page with an embedded video. The YouTube® web page contains three metadata tags. A thumbnail for each video may also be obtained by pulling a video identifier out of the URL using http:// i3.ytimg.com/vi/FMRg11hQLds/default.jpg and/or http:// i3.ytimg.com/vi/FMRg11hQLds/hqdefault.jpg. A number in "i3" may be changeable between "i1" and "i4" while returning a same image. The number of results comprising the raw URL, the metadata, and/or the thumbnail may be communicated to the number of networked media devices sharing the local network.

The bookmarklet RPC may be used to retrieve the number of results from the device and/or the other device. The number of results may be displayed in an alert and/or passed to a Document Object Model of the web page (e.g., if an error occurs). The bookmarklet RPC may also be used to obtain an information from the networked device 102. The bookmarklet may then pass the information on to a third-party website. For example, the bookmarklet may send the XmlHttpRequest to the networked device 102 discovered by the discovery service of the pairing server 300. The bookmarklet may query for the identification 1304 of the media data 1004 currently being rendered by the networked device 102. The bookmarklet may then pass the identification 1304 as a number of query-value parameters to a metadata association server (e.g., an IMDb® database) to obtain the number of metadata about the media data 1004 presently being rendered by the networked device 102.

In another embodiment, the automatic bidirectional communication may also comprise the client device 100 communicating an object (e.g., a data upon which an operation is performed) of a function (e.g., open a web page, play a video, play a musical composition, display a video game graphic) of the sandboxed application 112 and/or a request (e.g., a longpoll HTTP request, a command to play a song) to perform the function of the sandboxed application 112 to the heterogeneous networked media device. The sandboxed application 112 of the client device 100 may establish the communication session 116 with the sandbox-reachable service 114 of the heterogeneous networked media device using the pairing server 300, the extension 404, and/or the remote access token. The sandbox-reachable service 114 of the heterogeneous networked media device may comprise a sandboxed application function service (e.g., a web page opener service, a video playing service, a music playing service, a video game playing service). For example, the user 902 may pick up an iPhone® and open an App that plays music. When the user 902 gets home, the music stops playing on an iPhone® and immediately starts playing on a Bose® audio system. However, the user 902 retains the volume and playback controls for the music on the iPhone®.

The sandboxed application 112 may be configured to communicate with the other sandboxed application in a manner such that the client device 100 may be configured to offer the sandboxed application 112 as sandbox-reachable service to the other sandboxed application and/or forward a number of communications to the other sandboxed application through the relay service. The other sandboxed application may comprise the sandboxed application function service of the heterogeneous networked media device. For example, a web page may communicate with an other web page in the same manner in which the webpage communicated with the sandbox-reachable service 114 through the communication session 116 (e.g., the webpage may forward the request to the relay service, and the other web page may long poll the relay service for the request).

The sandboxed application function service may be configured to communicate with the sandboxed application 112 of the client device 100 in a manner such that the sandboxed application function service may be configured to incorporate a first executable code (e.g., a callback comprising an argument in a query string) into an invocation procedure of the sandboxed application function service, generate a second executable code (e.g., a return result that calls the callback with the return result), and execute the first executable code with the second executable code. According to one embodiment, the invocation procedure may a sandbox-reachable (e.g., using JSONP) service call. For example, the invocation procedure may be a remote procedure call (RPC).

The client device 100 may be configured to retain a number of control operations (e.g., a playback operation, a rewind operation, a navigation operation) of the sandboxed application 112 when the heterogeneous networked media device is configured to perform the function of the sandboxed application 112. For example, a video game may be displayed on the heterogeneous networked media device while the client device 100 may be used to play the video game.

The relay service may be configured to forward the request to perform the function of the sandboxed application 112 from the client device 100 to the heterogeneous networked media device. The heterogeneous networked media device may be configured to constantly listen for the request through a connection application comprising a polling application, a streaming application, a WebSocket application, and/or a long-polling application. The long-polling application may be configured to optimize a polling period between a long-polling and a consecutive long-polling in a manner such that the polling period is less than a timeout period of the long-polling.

For example, the sandboxed application function service may always be running. The sandboxed application function service may communicate a message query (e.g, an initiation of a process of retrieving an asynchronous communication) to the relay service by HTTP long-polling the relay service and/or a device providing the relay service. By optimizing the polling period such that the polling period is less than the timeout period of the session of the relay service, the heterogeneous networked media device may constantly listen for the request. If an "open" message arrives as the body to the longpoll HTTP request, the heterogeneous networked media device may open a fullscreen window containing the web page.

In another exemplary embodiment, the heterogeneous networked media device may be configured to run a sandboxed application server (e.g., a computer hardware and/or a computer software dedicated to providing a data to the sandboxed application 112, the other sandboxed application, and/or the sandboxed application function service). For example, the sandboxed application server may comprise a web server. The sandboxed application server may comprise a computer, a plurality of computers, and/or a peer-to-peer network of computers. The sandboxed application server may also be the sandboxed application function service, the heterogeneous networked media device, the pairing server, and/or the trusted intermediary server. Further, the sandboxed application server 700 may be a firmware and/or an integrated circuit.

The sandboxed application server may be configured to provide the sandboxed application function service. The sandboxed application function service may also be configured to process the object of the function of the sandboxed application 112 from the client device 100 and to perform the function of the sandboxed application 112 through the sandboxed application server.

For example, the object may comprise a URI of a web page. The user 902 may navigate to a web page *w* using the client device 100. The web page *w* may discover the heterogeneous networked media device and communicate an intent of the user 902 to open a web page *v*. The heterogeneous networked media device may run the sandboxed application server (e.g., the web server) that offers the sandboxed application function service. The sandboxed application function service may provide the invocation procedure at a URL "http://x:y/open" where x refers to an IP address and/or a domain name of the heterogeneous networked media device and y is a port that provides the sandboxed application function service.

The sandboxed application 112 may communicate the object (e.g., POST a URL *u* to http://x:y/open) causing the sandboxed application server to open the web page *v* pointing at the URL *u*. The sandboxed application 112 may communicate with the invocation procedure using the first executable code comprising the argument in the query string of http://x:y/open. The return result may be the second executable code (e.g., a JSON script) that calls the first executable code.

The sandboxed application 112 may communicate the URI of the webpage to the sandboxed application server that offers the sandboxed application function service. The sandboxed application server may then open a browser window pointing at the URI of the web page.

A trusted intermediary (e.g., a computer hardware and/or a computer software that enforces and/or prompts the user 902 to set a number of communication policies) may be configured to request an authorization to perform the function of the sandboxed application 112 through the heterogeneous networked media device. The trusted intermediary may also be configured to store the authorization in the sandboxed application 112 and/or a trusted intermediary server (e.g, a server from which the trusted intermediary is downloaded). Additionally, the trusted intermediary may be configured to request the authorization through the client device 100.

For example, the trusted intermediary may be the pairing server 300, an iframe, a browser window, a browser tab, a new web page, etc. When the trusted intermediary comprises the iframe, the number of communication policies may be enforced from within the client device 100. The sandboxed application 112 may communicate the object to the sandboxed application function service of the heterogeneous networked media device. The sandboxed application server in the heterogeneous networked media device offering the sandboxed application function service may return the trusted intermediary comprising the iframe asking the user 902 whether to permit the web page to open on the heterogeneous networked media device. Thus, the iframe may prompt the user 902 for the authorization through the sandboxed application 112. The trusted intermediary may store the authorization with the trusted intermediary in a web browser as a cookie. The authorization may also be stored in the trusted intermediary server (e.g., the pairing server 300, the sandbox application server).

Figure 5:
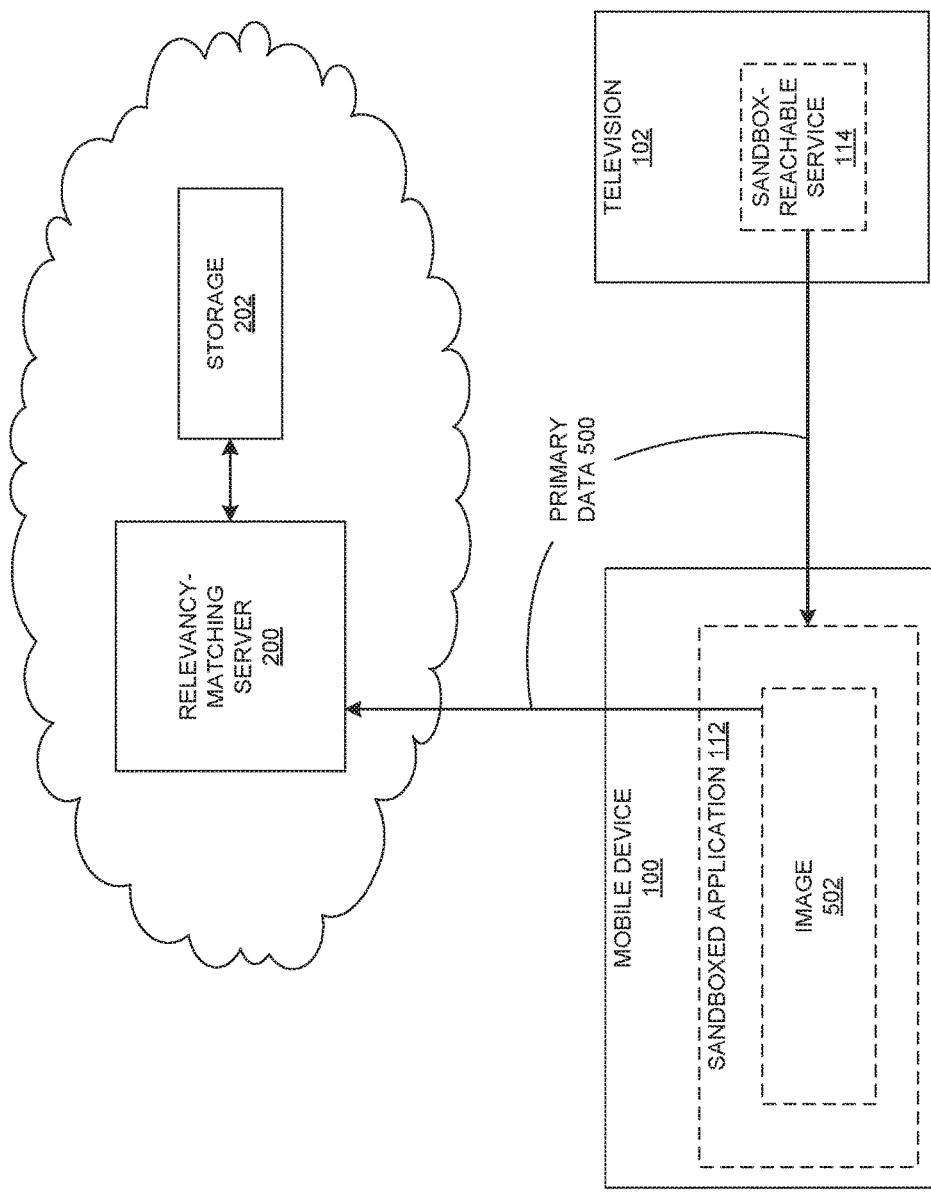
FIG. 5 is a block diagram depicting the client device 100 gathering a primary data 500 through a sandboxed application 112 and communicating the primary data 500 to the relevancy-matching server 200 through an image 502, according to one embodiment.

FIG. 5 is a block diagram depicting the client device 100 gathering the primary data 500 through the sandboxed application 112 and communicating the primary data 500 to the relevancy-matching server 200 through the image 502, according to one embodiment. FIG. 5 shows the client device 100, the networked device 102, the sandboxed application 112, the sandbox-reachable service 114, the relevancy-matching server 200, the storage 202, the primary data 500, and the image 502.

The primary data 500 exists between the sandbox-reachable service 114 and the sandboxed application 112 as well as between the image 502 and the relevancy-matching server 200 of FIG. 5. According to one embodiment, the primary data 500 may comprise the identification 1304 (e.g., a title, an episode number) of the media data 1004, a number of descriptive metadata 1206 (e.g., a face recognition, a voice recognition, a music recognition, a product recognition, a brand name recognition) associated with the identification 1304 of the media data 1004, a content identification history (e.g., a viewing history, a listening history, a subset of the media data 1004 previously rendered by the networked device 102), a monitored event 802, the geolocation (e.g., a GPS coordinate, a Geo-IP coordinate), a weather information, the Media Access Control (MAC) address of the client device 100, a private Internet Protocol (IP) address, and/or an other data stored in a volatile memory and/or a non-volatile memory (e.g., a hard disk drive, a solid state drive, a RAM).

The image 502 exists within the sandboxed application 112 of FIG. 5. According to one embodiment, the image 502 may be a HTML tag that incorporates a number of in-line graphics into an HTML document. The embedded object 204 may comprise the image 502. The sandboxed application 112 may query the sandbox-reachable service 114 for the primary data 500. The sandboxed application 112 may also pull in the image 502 from the relevancy-matching server 200. The image 502 may then be used to pass along the primary data 500 to the relevancy-matching server 200. Thus, the identification data 304 of the client device 100 and/or the networked device 102 may remain unknown to the relevancy-matching server 200.

Figure 6:
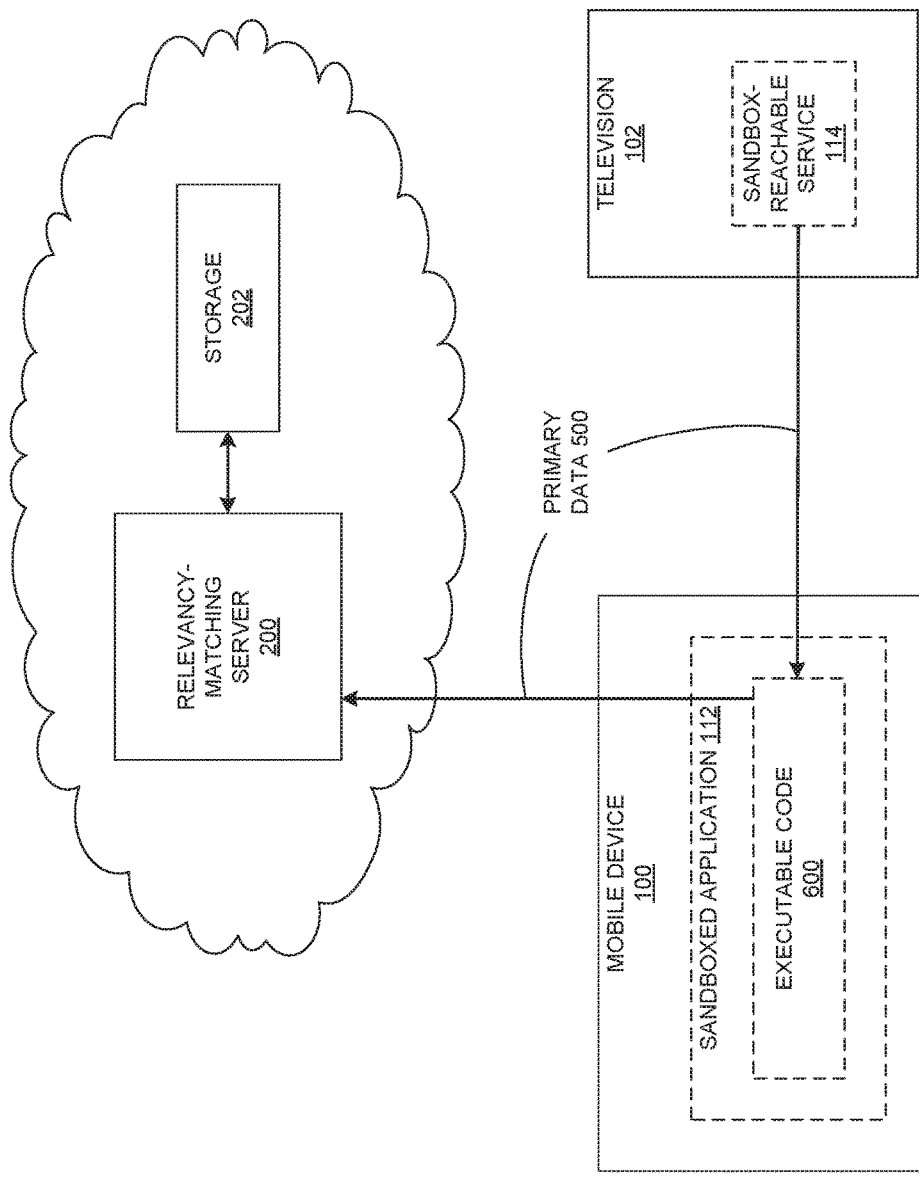
FIG. 6 is a block diagram depicting the client device 100 gathering the primary data 500 through an executable code 600 and communicating the primary data 500 to the relevancy-matching server 200 through the executable code 600, according to one embodiment.

FIG. 6 is a block diagram depicting the client device 100 gathering the primary data 500 through the executable code 600 and communicating the primary data 500 to the relevancy-matching server 200 through the executable code 600, according to one embodiment. FIG. 6 shows the client device 100, the networked device 102, the sandboxed application 112, the sandbox-reachable service 114, the relevancy-matching server 200, the storage 202, the primary data 500, and the executable code 600.

The executable code 600 exists within the sandboxed application 112 and communicates with the sandbox-reachable service 114 and the relevancy-matching server 200 of FIG. 6. According to one embodiment, the executable code 600 may be the script 706, the player, the iframe, and/or an other set of instructions that runs within the client device 100. The sandboxed application 112 may pull in the executable code 600 from the relevancy-matching server 200. The executable code 600 may be configured to gather the primary data 500 from the sandbox-reachable service 114 and/or the networked device 102. The executable code 600 may then be used to pass along the primary data 500 to the relevancy-matching server 200. Thus, the identification data 304 of the client device 100 and/or the networked device 102 may remain unknown to the relevancy-matching server 200.

Figure 7:
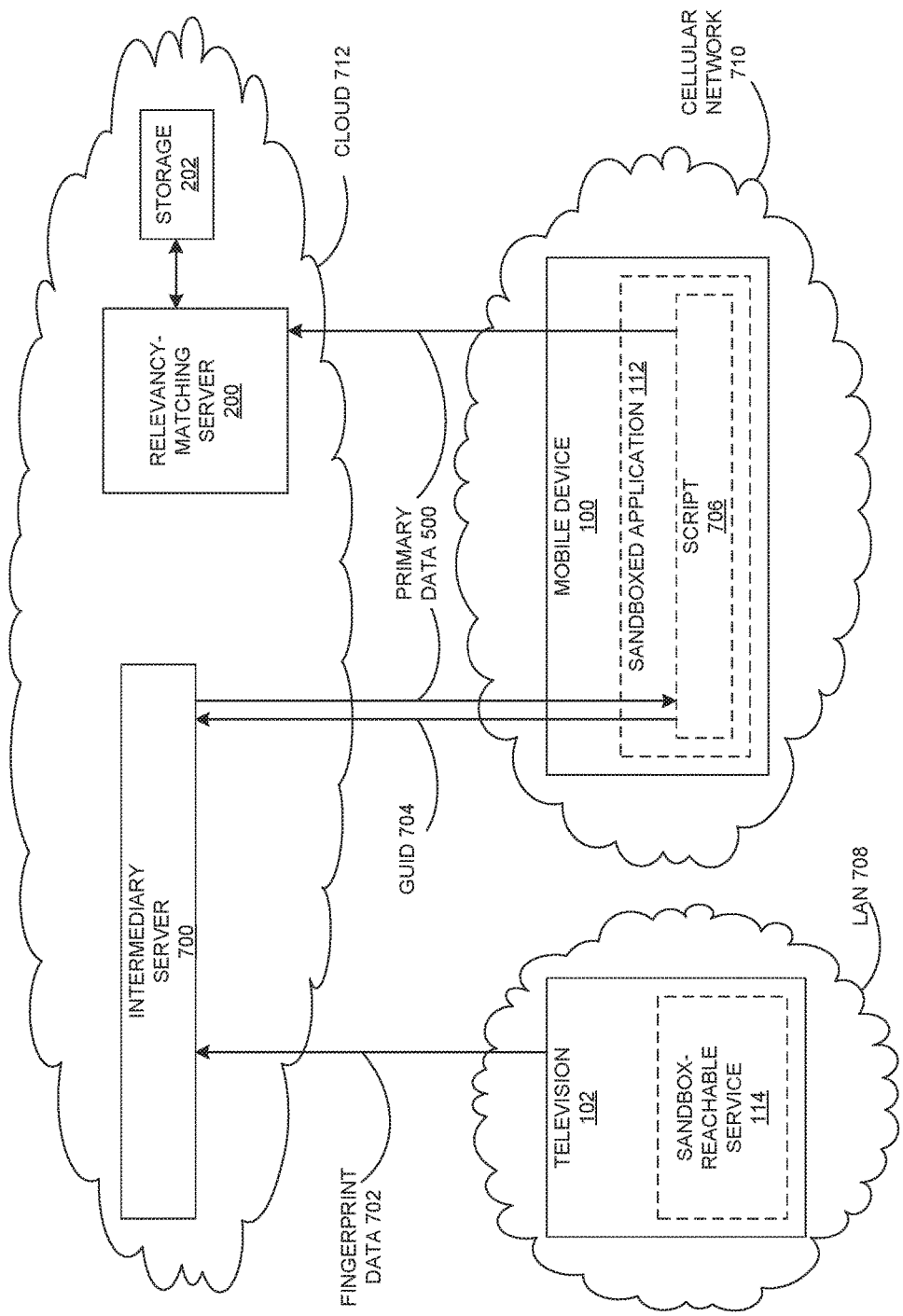
FIG. 7 is a block diagram depicting the client device 100 residing on a separate network from the networked device 102 and gathering the primary data 500 from an intermediary server 700, according to one embodiment.

FIG. 7 is a block diagram depicting the client device 100 residing on a separate network from the networked device 102 and gathering the primary data 500 from the intermediary server 700, according to one embodiment. FIG. 7 shows the client device 100, the networked device 102, the sandboxed application 112, the sandbox-reachable service 114, the relevancy-matching server 200, the storage 202, the primary data 500, the intermediary server 700, the preliminary data 702, the GUID 704, the script 706, the LAN 708, a cellular network 710, and the cloud 712.

The intermediary server 700 exists within the cloud 712 and is communicatively coupled to the client device 100 and the networked device 102 of FIG. 7. According to one embodiment, the intermediary server 700 may be a computer hardware system dedicated to generating the primary data 500 based on the preliminary data 702 using a processor and a memory. The intermediary server 700 may comprise a computer, a plurality of computers, and/or a peer-to-peer network of computers. The intermediary server 700 may also be the pairing server 300 and/or the relevancy-matching server 200. The intermediary server 700 may be configured to process the preliminary data 702 from the networked device 102 and/or the client device 100 and to generate the primary data 500 based on the preliminary data 702. The intermediary server 700 may also be configured to communicate the primary data 500 to any of a number of devices with the access to the identification data 304 of the networked device 102 and/or the sandbox-reachable service 114 of the networked device 102 (e.g., via a remote access token).

For example, the intermediary server 700 may be the content identification server 1006. The intermediary server 700 may process the preliminary data 702 comprising a watermark data 1204 extracted by the CID service 1002 of the networked device 102. The intermediary server 700 may compare the watermark data 1204 to a watermark database 1700 to determine the identification 1304 of the media data 1004 associated with the watermark data 1204. Thus, the intermediary server 700 may generate the primary data 500 comprising the identification 1304 of the media data 1004 based on the watermark data 1204.

The intermediary server 700 may then communicate the primary data 500 to the client device 100 if the client device 100 knows the identification data 304 of the networked device 102 and/or the sandbox-reachable service 114 comprising the CID service 1002. For example, the client device 100 may have obtained the GUID 704 of the networked device 102 from the discovery module 302 of the pairing server 300 when the client device 100 and the networked device 102 previously resided on the shared network. The client device 100 may have stored the GUID 704 in the remote access token (e.g., a cookie). Thus, the client device 100 may query the intermediary server 700 for the identification 1304 of the media data 1004 using the GUID 704 of the networked device 102. The intermediary server 700 may act as a trusted intermediary to enforce a policy regarding which of the number of devices may access the primary data 500 of the networked device 102.

The preliminary data 702 exists between the networked device 102 and the intermediary server 700 of FIG. 7. According to one embodiment, the preliminary data 702 may be an information associated with the user 902 that is generated by the networked device 102. The preliminary data 702 may be identical to the primary data 500 (e.g., a content identifying metadata extracted by the networked device 102). Alternatively, the preliminary data 702 may need to be converted into the primary data 500 to be usable by the relevancy-matching server 200 (e.g., a digital fingerprint generated by the networked device 102 that must be compared to a fingerprint database 1900 by the intermediary server 700 to generate the identification 1304 of the media data 1004). The preliminary data 702 may comprise a CID data 1200, 1300 automatically generated by the CID service 1000, 1002 based on the media data 1004. The preliminary data 702 may also comprise a timestamp of the CID data 1200, 1300 and/or a device identifier (e.g., a model identifier, a GUID, a Media Access Control address, an Internet Protocol address). The timestamp may be automatically generated by the CID service 1000, 1002. The timestamp may exist within the content of the media data 1004.

The GUID 704 exists between the client device 100 and the intermediary server 700 of FIG. 7. According to one embodiment, the GUID 704 may be a reference number used to uniquely identify a location of a data object. The GUID 704 of the networked device 102 and/or the sandbox-reachable service 114 may be used by the client device 100 to access the primary data 500 generated by the intermediary server 700. The identification data 304 may comprise the GUID 704. The identification data 304 may also comprise the geolocation of the networked device 102. The client device 100 may also store the geolocation in the remote access token. The geolocation may be used to authenticate the communication session 116 between the client device 100 and the networked device 102 (e.g., by confirming that the client device 100 and the networked device 102 currently and/or previously shared the geolocation of the networked device 102). The geolocation may also be used by the client device 100 to obtain the primary data 500 of the networked device 102 through the intermediary server 700.

The script 706 exists within the sandboxed application 112 of FIG. 7. According to one embodiment, the script 706 may be a program written for a software environment that automates an execution of a number of tasks. The embedded object 204 and/or the executable code 600 may comprise the script 706. The script 706 may gather the primary data 500 from the intermediary server 700 and communicate the primary data 500 to the relevancy-matching server 200.

The LAN 708 is associated with the networked device 102 of FIG. 7. According to one embodiment, the LAN 708 may be a collection of a number of links and a number of nodes that interconnects a number of devices in a limited area.

The cellular network 710 is associated with the client device 100 of FIG. 7. According to one embodiment, the cellular network 710 may be a radio network distributed over a number of land areas served by a fixed-location transceiver. The client device 100 on the cellular network 710 may obtain the primary data 500 of the networked device 102 on the LAN 708 through the intermediary server 700.

The cloud 712 is associated with the intermediary server 700, the relevancy-matching server 200, and the storage 202 of FIG. 7. According to one embodiment, the cloud 712 may be a remote location accessible over the Internet that makes available a number of computing resources. The intermediary server 700, the relevancy-matching server 200, and the storage 202 may each reside in a different remote location.

For example, the identification 1304 of the media data 1004 may be communicated via the cloud 712. The networked device 102 may communicate the identification 1304 of the media data 1004 to a server in the cloud 712. The server in the cloud 712 may then store and/or forward the identification 1304 of the media data 1004 to any of the number of devices that are paired (e.g., have access to the identification data 304) with the networked device 102. A communication of the identification 1304 of the media data 1004 may occur immediately and/or at a later time (e.g., to retarget a client-device advertisement a number of hours after the user saw the content associated with the identification 1304 of the media data 1004). Using the relay service of the server in the cloud 712 to relay the identification 1304 of the media data 1004 may be necessary if the client device 100 cannot establish a direct connection to the networked device 102 (e.g., when the client device 100 is a mobile phone using a wireless 4G data network while the networked device 102 is behind a firewall on a wired ISP).

Figure 8:
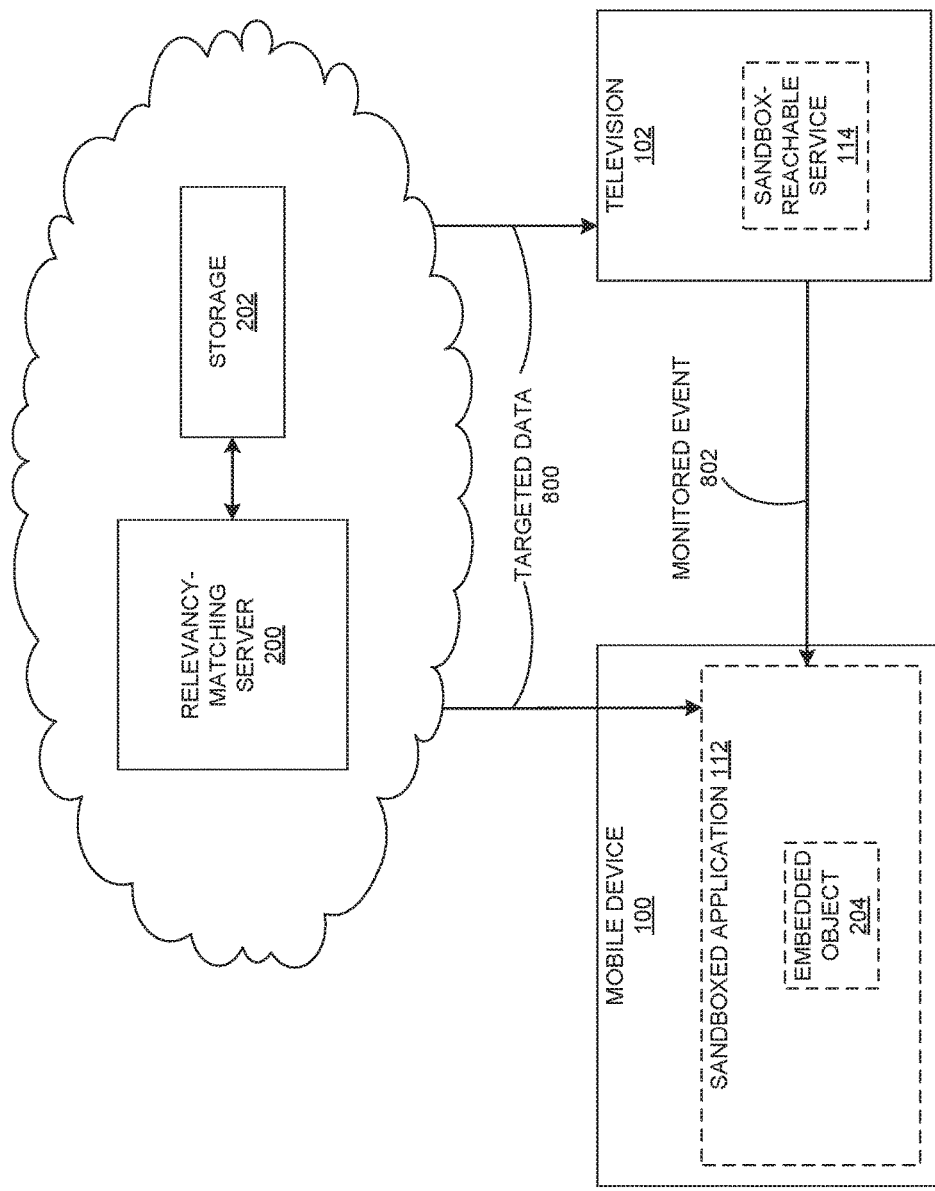
FIG. 8 is a block diagram depicting the relevancy-matching server 200 communicating a targeted data 800 to the client device 100 and the networked device 102, according to one embodiment.

FIG. 8 is a block diagram depicting the relevancy-matching server 200 communicating the targeted data 800 to the client device 100 and the networked device 102, according to one embodiment. FIG. 8 shows the client device 100, the networked device 102, the sandboxed application 112, the sandbox-reachable service 114, the relevancy-matching server 200, the storage 202, the embedded object 204, the targeted data 800, and the monitored event 802.

The targeted data 800 exists between the relevancy-matching server 200 and the client device 100 as well as between the relevancy-matching server 200 and the networked device 102 of FIG. 8. According to one embodiment, the targeted data 800 may comprise a content recommendation, an advertisement, a product recommendation, and/or an other information related to the primary data 500. The targeted data 800 may comprise the matching item and/or the related item in the storage 202. The targeted data 800 may be communicated to the client device 100 and/or the networked device 102.

The monitored event 802 exists between the networked device 102 and the client device 100 of FIG. 8. According to one embodiment, the monitored event 802 may be an interaction between the user 902 and the networked device 102. For example, the targeted data 800 may comprise an interactive advertisement. The interaction between the user 902 and the networked device 102 may become the primary data 500 of the networked device 102. The interaction may then be communicated to the client device 100.

Figure 9:
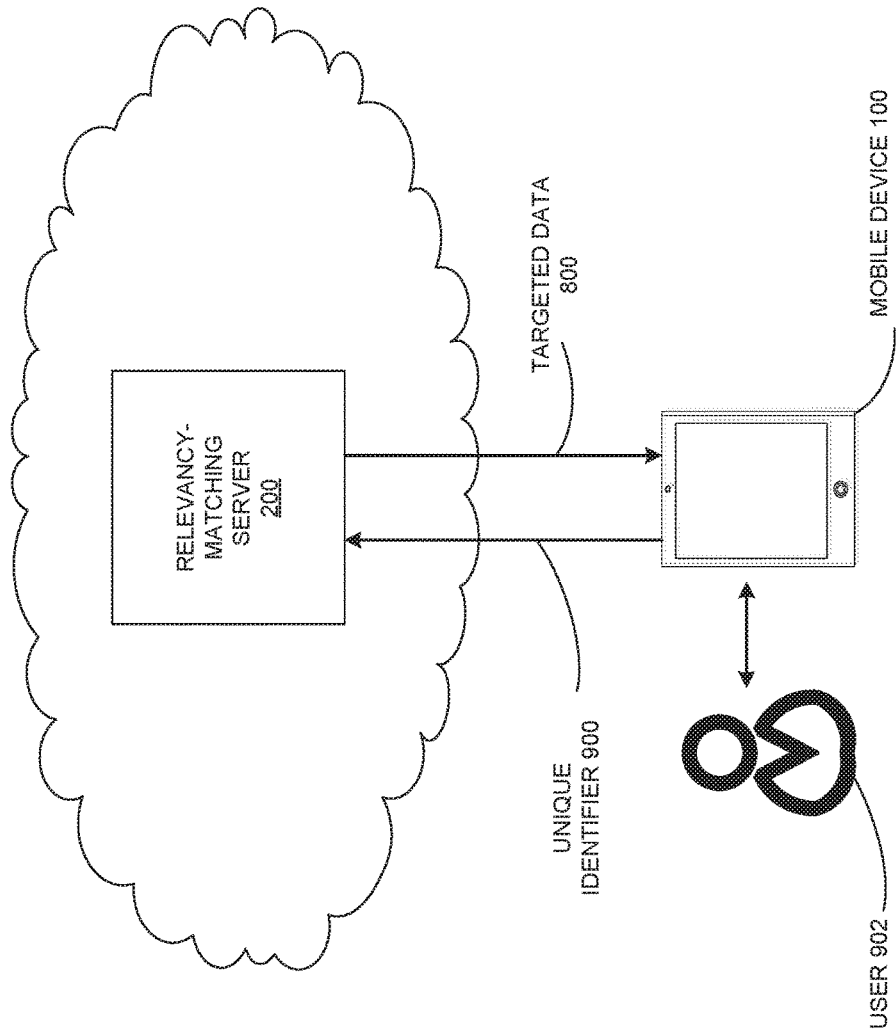
FIG. 9 is a block diagram depicting the relevancy-matching server 200 communicating the targeted data 800 to the client device 100 associated with a user 902, according to one embodiment.

FIG. 9 is a block diagram depicting the relevancy-matching server 200 communicating the targeted data 800 to the client device 100 associated with the user 902, according to one embodiment. FIG. 9 shows the client device 100, the relevancy-matching server 200, the targeted data 800, a unique identifier 900 of the client device 100, and the user 902.

The unique identifier 900 exists between the client device 100 and the relevancy-matching server 200 of FIG. 9. According to one embodiment, the unique identifier 900 may be a reference information of the client device 100. The unique identifier 900 of the client device 100 may be used as a pseudonym for the user 902.

The networked device 102 may have a better view of the network than the sandboxed application 112. The networked device 102 may see the unique identifier 900 of the client device 100 on a number of packets as the number of packets transit within the network. Thus, the networked device 102 may generate and/or communicate the unique identifier 900 to the sandboxed application 112.

The unique identifier 900 may also be used to generate a user profile. The targeted data 800 may be initialized by a number of triggers comprising a number of closed captions, a logo detection, a metadata, a face detection, a voice detection, and/or the monitored event 802. The targeted data 800 and/or the primary data 500 may be synchronized across a plurality of devices by creating the user profile in a user profile server. The user profile server may be the pairing server 300, the relevancy-matching server 200, and/or the intermediary server 700. The user profile server may create the user profile by aggregating a number of login information from a number of different services (e.g., a Facebook® service, a Google® service, a Myspace® service, a Windows Live® service, a Yahoo!® service, an OpenID® service). The user profile may also comprise a name, an email address, a gender, a birthday, a timezone, a website, a phone number, a profile picture, an address, a status, a number of interests, a music, a number of movies, a number of television shows, a number of books, a number of friends, a relationship status, and/or an employment information. The user profile may be associated with the client device 100 using the unique identifier 900 of the client device 100. The number of login information may be communicated to any of the plurality of devices.

The user 902 is associated with the client device 100 of FIG. 9. According to one embodiment, the user 902 may be a human who utilizes the client device 100. The client device 100 may communicate the unique identifier 900 to the relevancy-matching server 200. The client device 100 may be associated with the user 902 based on the unique identifier 900 that is unlikely to change. The relevancy-matching server 200 may identify the client device 100 using the unique identifier 900. The relevancy-matching server 200 may also communicate the targeted data 800 tailored for the user 902 to the client device 100 with the unique identifier 900 associated with the user 902.

Figure 10:
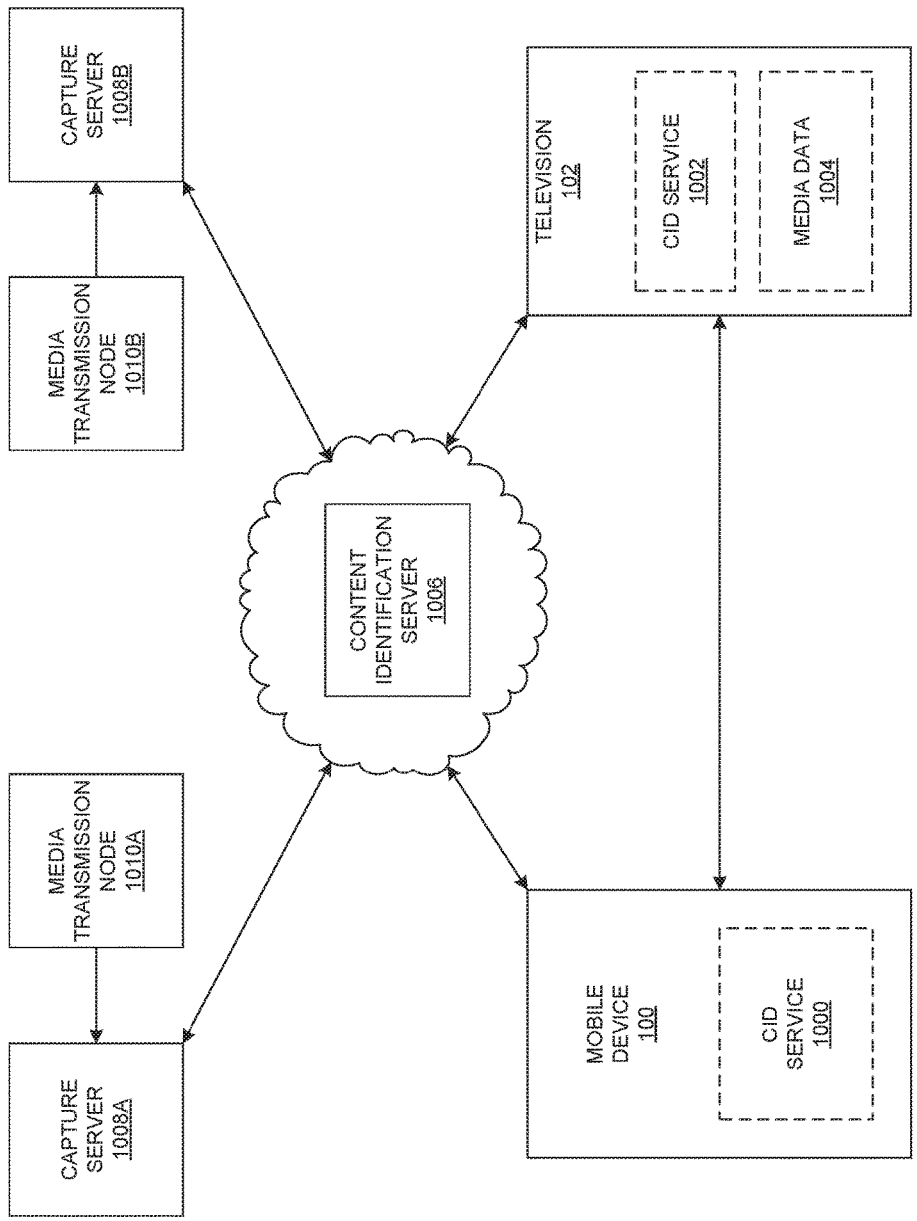
FIG. 10 is a block diagram of a system including a content identification server 1006 configured for automatic bidirectional communication with a number of capture servers 1008A, 1008B, the client device 100, and the networked device 102, according to one embodiment.

FIG. 10 is a block diagram of a system including the content identification server 1006 configured for automatic bidirectional communication with a number of capture servers 1008A, 1008B, the client device 100, and the networked device 102, according to one embodiment. FIG. 10 shows the client device 100, the networked device 102, the CID service 1000, 1002, the media data 1004, the content identification server 1006, a capture server 1008A, 1008B, and a media transmission node 1010A, 1010B.

The CID service 1000 exists in the client device 100, and the CID service 1002 exists in the networked device 102 of FIG. 10. The CID service 1000, 1002 of the networked device 102, the client device 100, and/or any of the number of devices that currently and/or previously shared the network with the networked device 102 (e.g., that have the access to the identification data 304) may communicate the preliminary data 702 to the content identification server 1006.

The CID service 1002 of the networked device 102 may exist at a chipset level of the networked device 102. The CID service 1002 of the networked device 102 may also be integrated into a chipset of the networked device 102. Further, the CID service 1002 of the networked device 102 may be integrated into a video pipeline and/or an audio pipeline. Still further, the CID service 1002 of the networked device 102 may access a buffer (e.g., a frame buffer, a video buffer, an audio buffer).

In one embodiment, the CID service 1000 of the client device 100 and/or the sandboxed application 112 may process and/or generate the CID data 1300 and/or the identification 1304 of the media data 1004 by accessing the CID service 1002 of the networked device 102 through the communication session 116. In another embodiment, the CID service 1000 of the client device 100 and/or the sandboxed application 112 may process and/or generate the CID data 1300 and/or the identification 1304 of the media data 1004 by using a sandbox-reachable service of an intermediary device to access a sandbox-unreachable CID service of the networked device 102. In yet another embodiment, the sandboxed application 112 may retrieve the identification 1304 of the media data 1004 from the sandbox-reachable service of the intermediary device. For example, an audio content identification library on the intermediary device may return the identification 1304 of the media data 1004 to the sandboxed application 112.

Alternatively, the CID service 1000 of the client device 100 may generate the CID data 1300 by capturing (e.g., processing and/or replicating at least a portion of) the media data 1004 rendered by the networked device 102 (e.g., using the extension 404 to allow the sandboxed application 112 to access the CID service 1000 and/or a capture device of the client device 100, using a loopback interface to allow the sandboxed application 112 to access the CID service 1000 and/or a capture device of the client device 100 by testing a number of ports). Thus, the CID service 1000 of the client device 100 may be subject to a greater amount of signal noise than the CID service 1002 of the networked device 102. Yet another alternative may entail the CID service 1000 generating the CID data 1300 by using the intermediary device to capture the media data 1004 (e.g., by establishing a communication session between the client device 100 and the intermediary device to access a sandbox-reachable CID service of the intermediary device and/or to access the capture device of the intermediary device).

For example, when the sandbox-reachable service 114 of the networked device 102 comprises the CID service 1002 of the networked device 102, the sandboxed application 112 of the client device 100 may process the CID data 1200 automatically generated by the CID service 1002 of the networked device 102 through the communication session 116. The communication session 116 may be established using the discovery service and/or the relay service of the pairing server 300, the extension 404, and/or the remote access token.

When the CID service 1002 of the networked device 102 comprises a sandbox-unreachable service, the sandboxed application 112 of the client device 100 may process the CID data 1200 through the sandbox-reachable service of the intermediary device. The sandbox-reachable service of the intermediary device may be configured to utilize a discovery protocol unavailable to the security sandbox 104 of the client device 100 and to process the CID data 1200 from the sandbox-unreachable CID service of the networked device 102. The client device 100 may establish the communication session between the sandboxed application 112 and the sandbox-reachable service of the intermediary device using the discovery service and/or the relay service of the pairing server 300, the extension 404, and/or the remote access token.

Alternatively, the sandboxed application 112 of the client device 100 may access the capture device (e.g., a camera, a microphone) to capture the media data 1004 rendered by the networked device 102. The networked device 102 may comprise the media device that is unconnected from the network of the client device 100. The sandboxed application 112 may use the extension 404 to add the capture device of the client device 100 and/or the CID service 1000 of the client device 100 to the security sandbox 104 of the client device 100. The CID service 1000 may also be made into the extension 404 so that a number of calls from JavaScript running in the sandboxed application 112 may query the CID service 1000 running on the same device as the sandboxed application 112. Further, the sandboxed application 112 of the client device 100 may access the sandbox-reachable CID service and/or the capture device of the intermediary device through the communication session 116 between the sandboxed application 112 and the intermediary device.

The sandboxed application 112 may also use the loopback interface (e.g., a loopback address, 127.0.0.1, a localhost) to access the CID service 1000 of the client device 100 and/or the capture device of the client device 100. The sandboxed application 112 may query a number of well-known ports for the CID service 1000 of the client device 100 and/or the capture device of the client device 100. Alternatively, the sandboxed application 112 may query the number of ports associated with a number of private IP addresses returned from the discovery service. The sandboxed application 112 may associate a port with the CID service 1000 of the client device 100 and/or the capture device of the client device 100 by looking for a valid service-specific handshake and/or an other valid service-specific query response. The sandboxed application 112 may then communicate with the CID service 1000 of the client device 100 and/or the capture device of the client device 100 through the port. An available service discovered using the loopback interface may also be added to a list of network services even if the available service was not otherwise announced.

The media data 1004 exists in the networked device 102 of FIG. 10. According to one embodiment, the media data 1004 and/or the other media data 1108, 1112, 1904 may be a published information rendered to the user 902. The media data 1004 may be rendered to the user 902 by the networked device 102. The other media data 1108, 1112 may be rendered by a number of other networked media devices 1106A, 1106B. The other media data 1904 may be captured by the capture server 1008A, 1008B.

The content identification server 1006 exists in the cloud 712 and is communicatively coupled to the client device 100, the networked device 102, and the number of capture servers 1008A, 1008B of FIG. 10. The content identification server 1006 may comprise a computer, a plurality of computers, and/or a peer-to-peer network of computers. The content identification server 1006 may also be the relevancy-matching server 200, the pairing server 300, and/or the intermediary server 700.

The content identification server 1006 may be configured to automatically determine the identification 1304 of the media data 1004 previously and/or presently being rendered by the networked device 102. The content identification server 1006 may be configured to process the preliminary data 702 (e.g., the CID data 1200, 1300, the timestamp, the device identifier) from the networked device 102, the client device 100, and/or any of the number of devices that currently and/or previously shared the network with the networked media device 102. The content identification server 1006 may also be configured to process an other CID data 1302, 1306, 1402, 1404 automatically generated by the other CID service 1104, 1110 based on the other media data 1108, 1112, 1904. Further, the content identification server 1006 may be configured to process an other timestamp of the other CID data 1302, 1306, 1402, 1404 and/or an other device identifier from the other CID service 1104, 1110. The other timestamp may exist within the content of the other media data 1108, 1112, 1904.

The capture server 1008A, 1008B exists between the content identification server 1006 and the media transmission node 1010A, 1010B of FIG. 10. According to one embodiment, the capture server 1008A, 1008B may comprise a computer hardware system dedicated to processing and/or replicating at least a portion of the other media data 1904 at the media transmission node 1010A, 1010B, detecting a characteristic 1502 (e.g., a closed captioning, a sound, a text, a voice, a face, a music, a logo, a location, a name, a scene, a word of interest, a product, and/or an other object that may potentially identify the other media data 1904) of the other media data 1904, and/or storing the other media data 1904 in a persistent storage (e.g., a disk). The other CID service 1104, 1110 may exist in the capture server 1008A, 1008B. The capture server 1008A, 1008B may comprise a computer, a plurality of computers, and/or a peer-to-peer network of computers. The capture server 1008A, 1008B may also be the relevancy-matching server 200, the pairing server 300, the intermediary server 700, and/or the content identification server 1006.

The media transmission node 1010A, 1010B is communicatively coupled to the capture server 1008A, 1008B of FIG. 10. According to one embodiment, the media transmission node 1010A, 1010B may comprise a television broadcasting station, a radio broadcasting station, a cable headend, a connection point in a home, and/or an other point in a media distribution network. The capture server 1008A, 1008B may be collocated with a number of servers at the media transmission node 1010A, 1010B. The capture server 1008A, 1008B may be configured to automatically generate the other CID data 1302, 1306 of the other media data 1904 captured at the media transmission node 1010A, 1010B and/or an other timestamp of the other CID data 1302, 1306 through the other CID service 1104, 1110 using a processor and a memory. The capture server 1008A, 1008B may also be configured to communicate the other CID data 1302, 1306, the other timestamp, and/or the other device identifier to the content identification server 1006.

Figure 11:
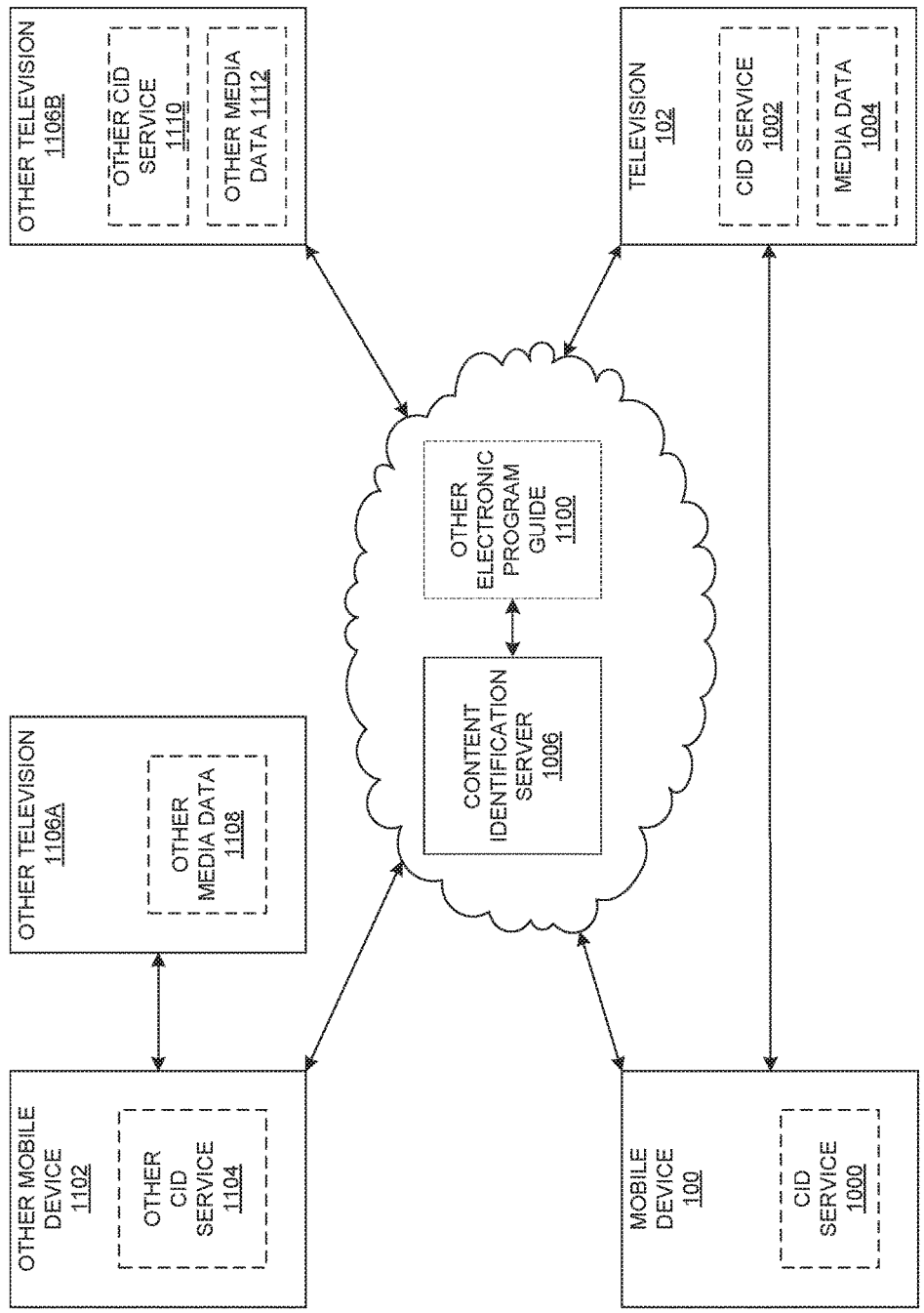
FIG. 11 is a block diagram of a system of automatic bidirectional communication between the client device 100 and the networked device 102 involving the content identification server 1006 and a plurality of other networked devices 1400A, 1400B, according to one embodiment.

FIG. 11 is a block diagram of a system of automatic bidirectional communication between the client device 100 and the networked device 102 involving the content identification server 1006 and a plurality of other networked devices 1400A, 1400B, according to one embodiment. FIG. 11 shows the client device 100, the networked device 102, the CID service 1000, 1002, the media data 1004, the content identification server 1006, an other client device 1102, an other CID service 1104, 1110, the other networked media device 1106A, 1106B, the other media data 1108, 1112, and an other electronic program guide 1100.

The other CID service 1104 exists within the other client device 1102, and the other CID service 1110 exists within the other networked media device 1106B of FIG. 11. The other CID service 1104, 1110 may exist in the plurality of other networked devices 1400A, 1400B (e.g., a number of other client devices 1102 and/or the number of other networked media devices 1106A, 1106B within a limited geographic proximity to the networked device 102). The plurality of other networked devices 1400A, 1400B may be configured to automatically generate the other CID data 1402, 1404 of the other media data 1108, 1112 and/or the other timestamp of the other CID data 1402, 1404 through the other CID service 1104, 1110 using a processor and a memory. The plurality of other networked devices 1400A, 1400B may also be configured to communicate the other CID data 1402, 1404, the other timestamp, and/or the other device identifier to the content identification server 1006.

The media data 1004 exists within the networked device 102, the other media data 1108 exists within the other networked media device 1106A, and the other media data 1112 exists within the other networked media device 1106B of FIG. 11. The other media data 1108 may be rendered by the other networked media device 1106A. The other media data 1112 may be rendered by the other networked media device 1106B.

The content identification server 1006 exists in the cloud 712 and is communicatively coupled to the client device 100, the networked device 102, the other client device 1102, and the other networked media device 1106B of FIG. 11. The content identification server 1006 may be configured to process a plurality of other CID data 1402, 1404 of the number of other media data 1108, 1112, a number of other timestamps of the plurality of other CID data 1402, 1404, and/or a number of other device identifiers from a plurality of other CID services 1104, 1110. Further, the content identification server 1006 may automatically determine the identification 1304 of the media data 1004 and/or the other media data 1108, 1112 through a crowdsourcing based on a consensus of a provisional identification 2400 of the media data 1004 and a number of other provisional identifications 2400 of the number of other media data 1108, 1112.

The other electronic program guide 1100 exists in the cloud 712 and is communicatively coupled to the content identification server 1006 of FIG. 11. According to one embodiment, an electronic program guide and/or the other electronic program guide 1100 may be a schedule of a number of programs, a number of channels 2100, and/or a number of times. The electronic program guide and/or the other electronic program guide 1100 may be available through a set-top box and/or the Internet.

Figure 12:
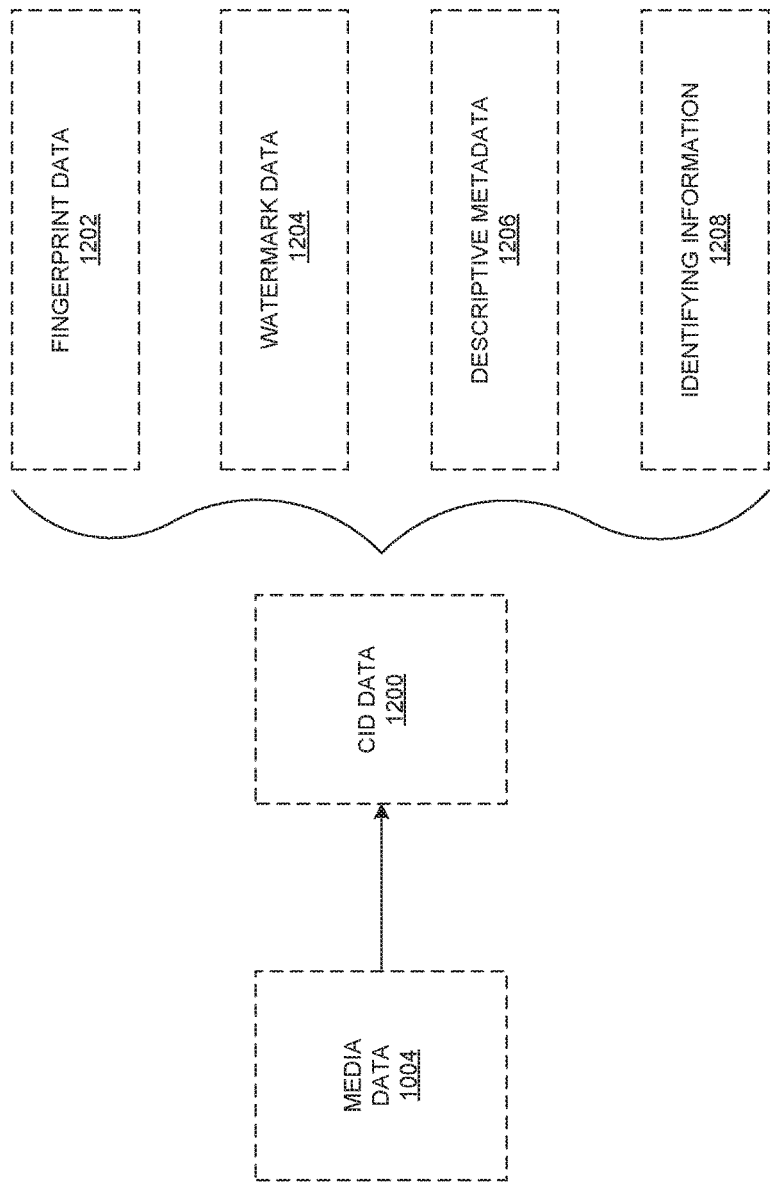
FIG. 12 is a block diagram of a content identification (CID) service 1002 generating a CID data 1200 based on a media data 1004, according to one embodiment.

FIG. 12 is a block diagram of the CID service 1002 generating the CID data 1200 based on the media data 1004, according to one embodiment. FIG. 12 shows the media data 1004, the CID data 1200, a fingerprint data 1202, the watermark data 1204, a descriptive metadata 1206, and an identifying information 1208.

The CID data 1200 exists at the end of an arrow depicting a process of generating the CID data 1200 from the media data 1004 of FIG. 12. The CID data 1200, 1300 and/or the other CID data 1302, 1306, 1402, 1404 may be a reference information derived from and/or associated with the media data 1004 and/or the other media data 1108, 1112, 1904. The CID service 1000, 1002 of the networked device 102, the client device 100, and/or any of the number of devices that currently and/or previously shared the network with the networked device 102 may automatically generate the CID data 1200, 1300. The other CID service 1104, 1110 of the capture server 1008A, 1008B and/or the plurality of other networked devices 1400A, 1400B may automatically generate the other CID data 1302, 1306, 1402, 1404. The CID data 1200, 1300 may comprise the fingerprint data 1202, the watermark data 1204, the descriptive metadata 1206, and/or the identifying information 1208. The other CID data 1302, 1306, 1402, 1404 may comprise an other fingerprint data 1906, 2302, 2306, 2602, an other watermark data 2200, 2304, an other descriptive metadata 2308, and/or an other identifying information 1800.

The fingerprint data 1202 exists adjacent to the CID data 1200 in an exploded view of the CID data 1200 of FIG. 12. According to one embodiment, the CID service 1000, 1002 and/or the other CID service 1104, 1110 may be configured to automatically generate the fingerprint data 1202 and/or the other fingerprint data 1906, 2302, 2306, 2602 in a manner such that the CID service 1000, 1002 and/or the other CID service 1104, 1110 is configured to detect, extract (e.g., replicate a portion of), quantize (e.g., round a value to a unit of precision), and/or hash (e.g., map a large data set to a small data set) a number of characteristic features and/or a number of other characteristic features of the media data 1004 and/or the other media data 1108, 1112, 1904. The fingerprint data 1202 may comprise a fingerprint data sequence 2000, and the other fingerprint data 1906, 2302, 2306, 2602 may comprise an other fingerprint data sequence. The CID service 1000, 1002 and/or the other CID service 1104, 1110 may also be configured to communicate the fingerprint data 1202 and/or the other fingerprint data 1906, 2302, 2306, 2602 to the content identification server 1006.

The watermark data 1204 also exists adjacent to the CID data 1200 in the exploded view of the CID data 1200 of FIG. 12. According to one embodiment, the CID service 1000, 1002 and/or the other CID service 1104, 1110 may be configured to automatically generate the watermark data 1204 and/or the other watermark data 2200, 2304 in a manner such that the CID service 1000, 1002 and/or the other CID service 1104, 1110 is configured to detect and to extract an embedded signal of the media data 1004 and/or the other media data 1108, 1112, 1904. The content identification server 1006 may be configured to process the watermark data 1204 and/or the other watermark data 2200, 2304 from the CID service 1000, 1002 and/or the other CID service 1104, 1110. The content identification server 1006 may also be configured to compare the watermark data 1204 and/or the other watermark data 2200, 2304 to a known watermark data in the watermark database 1700.

Further, the content identification server 1006 may be configured to associate the identification 1304 and/or the provisional identification 2400 (e.g., when the other CID data 1402, 1404 is processed from the plurality of other networked devices 1400A, 1400B) of the media data 1004 with the identification of the known watermark data when the watermark data 1204 is identical to the known watermark data. Similarly, the content identification server 1006 may be configured to associate the identification 1304 and/or an other provisional identification 2400 of the other media data 1108, 1112, 1904 with the identification of the known watermark data when the other watermark data 2200, 2304 is identical to the known watermark data.

The descriptive metadata 1206 exists adjacent to the CID data 1200 in the exploded view of the CID data 1200 of FIG. 12. According to one embodiment, the CID service 1000, 1002 and/or the other CID service 1104, 1110 may be configured to automatically generate the descriptive metadata 1206 and/or the other descriptive metadata 2308 in a manner such that the CID service 1000, 1002 and/or the other CID service 1104, 1110 may be configured to process a descriptive data (e.g., a channel number, a title, an episode number, a summary, a callsign) and/or an other descriptive data added to the media data 1004 and/or the other media data 1108, 1112, 1904. The CID service 1000, 1002 and/or the other CID service 1104, 1110 may also communicate the descriptive metadata 1206 and/or the other descriptive metadata 2308 to the content identification server 1006. However, if the descriptive metadata 1206 and/or the other descriptive metadata 2308 identifies the content of the media data 1004 and/or the other media data 1108, 1112, the CID service 1000, 1002 and/or the other CID service 1104, 1110 of the plurality of other networked devices 1400A, 1400B may not need to communicate the descriptive metadata 1206 and/or the other descriptive metadata 2308 to the content identification server 1006.

The content identification server 1006 may be configured to process the descriptive metadata 1206 and/or the other descriptive metadata 2308 from the client device 100, the networked device 102, the capture server 1008A, 1008B, and/or the plurality of other networked devices 1400A, 1400B. When the descriptive metadata 1206 identifies the content of the media data 1004, the content identification server 1006 may be further configured to associate the descriptive metadata 1206 with the identification 1304 and/or the provisional identification 2400 of the media data 1004. When the other descriptive metadata 2308 identifies the content of the other media data 1108, 1112, 1904, the content identification server 1006 may be further configured to associate the other descriptive metadata 2308 with the identification 1304 and/or the other provisional identification 2400 of the other media data 1108, 1112, 1904.

The identifying information 1208 exists adjacent to the CID data 1200 in the exploded view of the CID data 1200 of FIG. 12. According to one embodiment, the CID service 1000, 1002 and/or the other CID service 1104, 1110 may be configured to generate the identifying information 1208 and/or the other identifying information 1800 in a manner such that the CID service 1000, 1002 and/or the other CID service 1104, 1110 may be configured to retrieve the identifying information 1208 (e.g., a title, an episode number, a summary, a channel number, a callsign) and/or the other identifying information 1800 from a tuner 2300 (e.g., a television tuner, a radio tuner, a quadrature amplitude modulation tuner, an Advanced Television Systems Committee tuner, a stream decoder), an other tuner 1902, the electronic program guide, and/or the other electronic program guide 1100. The capture server 1008A, 1008B, the plurality of other networked devices 1400A, 1400B, and/or the content identification server 1006 may access the other tuner 1902 and/or the other electronic program guide 1100.

For example, the networked device 102 may identify the channel number based on the tuner 2300. The CID service 1002 may access the electronic program guide to retrieve the title of the media data 1004 currently scheduled for the channel number. The CID service 1000, 1002 and/or the other CID service 1104, 1110 may also communicate the identifying information 1208 and/or the other identifying information 1800 to the content identification server 1006. However, if the identifying information 1208 and/or the other identifying information 1800 identifies the media data 1004 and/or the other media data 1108, 1112, the CID service 1000, 1002 and/or the other CID service 1104, 1110 may not need to communicate the identifying information 1208 and/or the other identifying information 1800 to the content identification server 1006.

The content identification server 1006 may be configured to process the identifying information 1208 and/or the other identifying information 1800 from the client device 100, the networked device 102, the capture server 1008A, 1008B, and/or the plurality of other networked devices 1400A, 1400B. When the identifying information 1208 identifies the content of the media data 1004, the content identification server 1006 may be further configured to associate the identifying information 1208 with the identification 1304 and/or the provisional identification 2400 of the media data 1004. When the other identifying information 1800 identifies the content of the other media data 1108, 1112, 1904, the content identification server 1006 may be further configured to associate the other identifying information 1800 with the identification 1304 and/or the other provisional identification 2400 of the other media data 1108, 1112, 1904.

When the descriptive metadata 1206 identifies a channel 2100 of the networked device 102, the content identification server 1006 may be further configured to associate the media data 1004 with the other media data 1904 identified by the capture server 1008A, 1008B configured to monitor the channel 2100 identified by the descriptive metadata 1206. When the identifying information 1208 identifies the channel 2100 of the networked device 102, the content identification server 1006 may be further configured to associate the media data 1004 with the other media data 1904 identified by the capture server 1008A, 1008B configured to monitor the channel 2100 identified by the identifying information 1208.

When the descriptive metadata 1206 and/or the identifying information 1208 identifies the channel 2100 of the networked device 102, the content identification server 1006 may also be configured to retrieve a content identifying information (e.g., a title) associated with the channel 2100 from the other electronic program guide 1100 communicatively coupled with the content identification server 1006 and to associate the content identifying information with the provisional identification 2400 of the media data 1004. Additionally, when the other descriptive metadata 2308 and/or the other identifying information 1800 identifies the channel 2100 of the number of other networked media devices 1106A, 1106B, the content identification server 1006 may be configured to retrieve the content identifying information associated with the channel 2100 from the other electronic program guide 1100 communicatively coupled with the content identification server 1006 and to associate the content identifying information with the other provisional identification 2400 of the other media data 1108, 1112.

Figure 13:
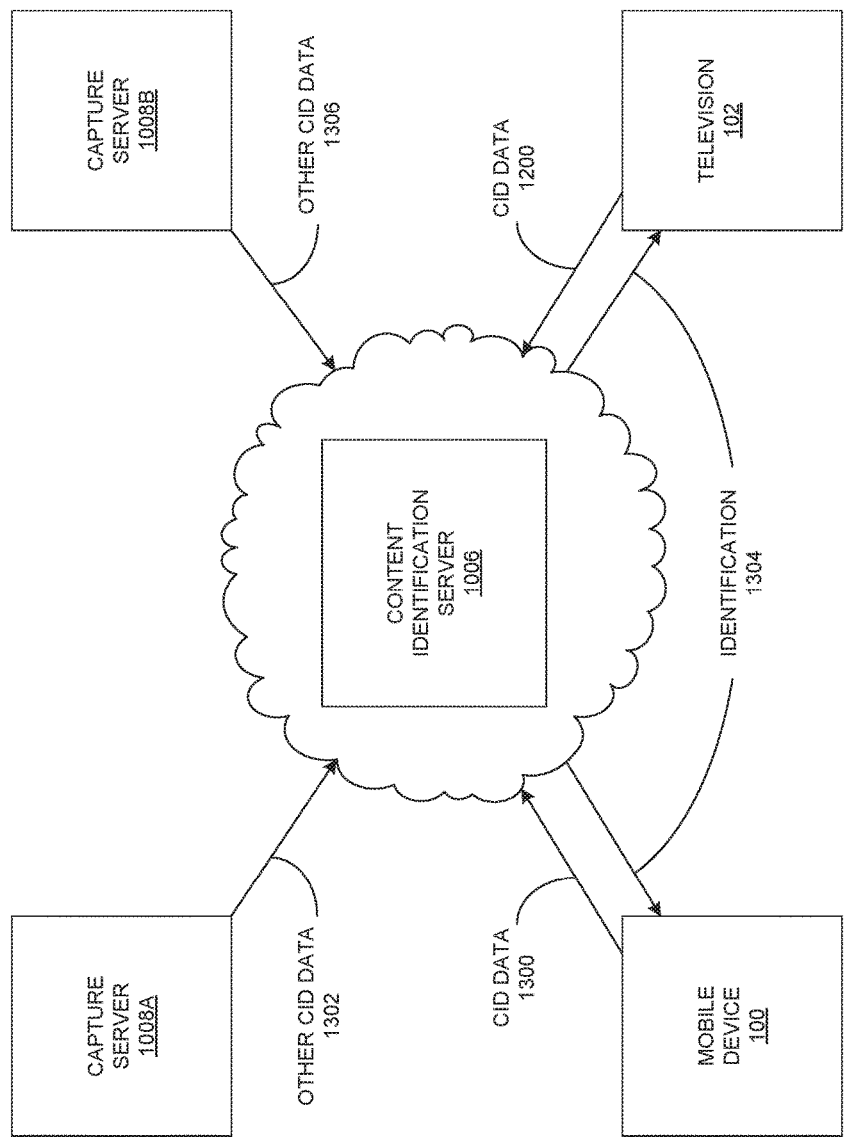
FIG. 13 is a block diagram of a system of determining an identification 1304 of the media data 1004 involving the content identification server 1006 communicatively coupled to the number of capture servers 1008A, 1008B, according to one embodiment.

FIG. 13 is a block diagram of a system of determining the identification 1304 of the media data 1004 involving the content identification server 1006 communicatively coupled to the number of capture servers 1008A, 1008B, according to one embodiment. FIG. 13 shows the client device 100, the networked device 102, the content identification server 1006, the number of capture servers 1008A, 1008B, the CID data 1200, 1300, the other CID data 1302, 1306, and the identification 1304.

The identification 1304 of the media data 1004 exists between the content identification server 1006 and the client device 100 as well as between the content identification server 1006 and the networked device 102 of FIG. 13. According to one embodiment, the identification 1304 of the media data 1004 and/or the other media data 1108, 1112, 1904 may comprise a title, an episode number, a channel number, a device identifier, and/or an other reference information associated with the media data 1004 and/or the other media data 1108, 1112, 1904.

The capture server 1008A, 1008B and/or the content identification server 1006 may access a greater amount of computational resources and a greater amount of memory resources with which to determine the identification 1304 of the media data 1004 and/or the other media data 1904. The greater amount of computational resources and the greater amount of memory resources of the capture server 1008A, 1008B and/or the content identification server 1006 may be conducive to limiting the CID service 1000, 1002 to identifying the channel 2100 of the networked device 102. Thus, the other CID service 1104, 1110 of the capture server 1008A, 1008B along with the content identification server 1006 may determine the identification 1304 of the media data 1004 at a faster rate. The greater amount of computational resources and the greater amount of memory resources of the capture server 1008A, 1008B and/or the content identification server 1006 may also be conducive to separately analyzing an audio portion of the media data 1004 and a video portion of the media data 1004. Thus, the other CID service 1104, 1110 of the capture server 1008A, 1008B along with the content identification server 1006 may always analyze the audio portion of the other media data 1904 corresponding to the media data 1004 in a manner such that the CID service 1000, 1002 may simply query the content identification server 1006 for the identification 1304 of the audio portion. The CID service 1000, 1002 may be limited to analyzing the video portion of the media data 1004 to the extent of identifying the channel 2100 of the networked device 102.

The content identification server 1006 and/or the capture server 1008A, 1008B may also be configured to communicate the identification 1304 of the media data 1004, the channel 2100, the descriptive metadata 1206, and/or the other descriptive metadata 2308 to the networked device 102, the client device 100, the metadata association server, a content recommendation server (e.g., a computer hardware system dedicated to suggesting a published information related to the media data 1004), and/or any of the number of devices with the access to the identification data 304 of the networked device 102 and/or the sandbox-reachable service 114 of the networked media device 102 (e.g., via the remote access token). Thus, the content identification server 1006 may act as a trusted intermediary to enforce a policy regarding which of the number of devices may access the identification 1304 of the media data 1004, the channel 2100, the descriptive metadata 1206, and/or the other descriptive metadata 2308.

The networked device 102, the client device 100, and/or the number of devices may perform any of a number of functions with the identification 1304 of the media data 1004. For example, the number of devices may render a number of recommendations and/or a related media data (e.g., the published information sharing a commonality with the media data 1004) to the user 902. The number of recommendations and/or the related media data may be initialized by a number of triggers comprising a number of closed captions, a logo detection, the descriptive metadata 1206, a detection of the characteristic 1502, and/or a manual event trigger.

For example, the relevancy-matching server 200 may comprise the content recommendation server configured to automatically associate, using a processor and a memory, the identification (e.g., a title, an episode number) of the related media data with the CID data 1200, 1300 of the media data 1004 presently being rendered by the networked device 102, the identification 1304 of the media data 1004, and/or the number of metadata associated with the identification 1304 of the media data 1004. The content recommendation server may comprise a computer, a plurality of computers, and/or a peer-to-peer network of computers. The content recommendation server may also be the content identification server 1006, the metadata association server, the intermediary server 700, and/or the pairing server 300.

The CID service 1000, 1002 may communicate the CID data 1200, 1300, the identification 1304 of the media data 1004, and/or the number of metadata associated with the identification 1304 of the media data 1004 to the content recommendation server. The content identification server 1006 may also communicate the identification 1304 of the media data 1004 to the content recommendation server. The metadata association server may also communicate the number of metadata associated with the identification 1304 of the media data 1004 to the content recommendation server. The content recommendation server may be configured to communicate the identification of the related media data to the networked device 102, the client device 100, the metadata association server, and/or any of the number of devices with the access to the identification data 304.

The relevancy-matching server may also comprise the metadata association server configured to automatically associate, using a processor and a memory, the CID data 1200, 1300 of the media data 1004 presently being rendered by the networked device 102, the identification of the related media data, and/or the identification 1304 of the media data 1004 with the number of metadata associated with the identification 1304 of the media data 1004 and/or the number of metadata associated with the identification of the related media data. The metadata association server may also comprise a computer, a plurality of computers, and/or a peer-to-peer network of computers. The metadata association server may be an optional intermediary server between the content identification server 1006 and the content recommendation server. The metadata association server may also be the content identification server 1006, the content recommendation server, the intermediary server 700, and/or the pairing server 300.

The CID service 1000, 1002 may communicate the CID data 1200, 1300 and/or the identification 1304 to the metadata association server. The content identification server 1006 may also communicate the identification 1304 to the metadata association server. The content recommendation server may communicate the identification of the related media data to the metadata association server. The metadata association server may generate the number of metadata associated with the identification 1304 of the media data 1004 and/or the number of metadata associated with the identification of the related media data by accessing Tribune®, Rovi®, IMDb®, and/or an other source for the number of metadata about the media data 1004 and/or the related media data. The metadata association server may be configured to communicate the number of metadata associated with the identification 1304 of the media data 1004 and/or the number of metadata associated with the identification of the related media data to the content recommendation server, the networked device 102, the client device 100, and/or any of the number of devices with the access to the identification data 304.

Further, the relevancy-matching server 200 may comprise a related media data provider (e.g., a computer hardware system dedicated to transmitting the related media data using a processor and a memory). The related media data provider may comprise a computer, a plurality of computers, and/or a peer-to-peer network of computers. The related media data provider may also be the content identification server 1006, the metadata association server, the content recommendation server, the intermediary server 700, the capture server 1008A, 1008B, and/or the pairing server 300.

When the related media data provider is the capture server 1008A, 1008B, a synchronized viewing may be enabled. The synchronized viewing may augment the media data 1004 with the related media data that is being broadcasted. The capture server 1008A, 1008B may capture an audio portion of the media data 1004 separately from a video portion of the media data 1004. The capture server 1008A, 1008B may then use a number of timestamps of the other CID data 1302, 1306 to correlate the audio portion of the media data 1004 and/or the related media data to the video portion of the media data 1004 and/or the related media data based on a choice of the user 902.

For example, the user 902 may view the video portion of the media data 1004 and switch between the audio portion of the media data 1004 and the audio portion of the related media data. Alternatively, the user may listen to the audio portion of the media data 1004 and switch between the video portion of the media data 1004 and the video portion of the related media data. The media data 1004 and the related media data may be the media data 1004 broadcasted on a number of different channels. Thus, the user 902 may select a superior audio portion and/or a superior video portion.

According to one embodiment, the client device 100 may be configured to render the related media data to the user 902 through the networked device 102 and/or the client device 100. The sandboxed application 112 may be configured to process the identification of the related media data from the content recommendation server. The sandboxed application 112 may also be configured to suggest the identification of the related media data to the user 902. Further, the sandboxed application 112 may be configured to process a request to render the related media data through the networked device 102 and/or the client device 100 based on a selection of the user 902. Still further, the sandboxed application 112 may be configured to communicate the request and/or the related media data to the networked device 102 when the selection comprises the request to render the related media data through the networked device 102. The networked device 102 and/or the client device 100 may be configured to retrieve the related media data from the related media data provider.

In another embodiment, the content identification server 1006, the metadata association server, and/or the content recommendation server may also be used to automatically update an initial user interface (UI) of the networked device 102 with the identification 1304 of the media data 1004, the identification of the related media data, the number of metadata associated with the identification 1304 of the media data 1004, and/or the number of metadata associated with the identification of the related media data. The initial UI may comprise a number of UI elements and/or a number of pages. The networked device 102 may be configured to automatically update and/or display the initial UI. The initial UI may be displayed prior to, after, and/or simultaneously with (e.g., overlaid upon, alongside) a rendering of an initial media data (e.g., the media data 1004 that is rendered immediately following a hardware startup sequence of the networked device 102).

A number of user interactions may trigger the networked device 102 to display the initial UI. For example, the initial UI may be displayed when the user 902 logs into and/or pairs with the networked device 102. The initial UI may also be displayed when the user 902 otherwise interacts with the networked device 102 from the client device 100 (e.g., when the client device 100 is used as a remote control and/or a companion application to the networked device 102).

Further, the initial UI may be displayed when the user 902 and/or an unrecognized user is detected. For example, the networked device 102 may access and/or be communicatively coupled to a camera that detects the user 902 and/or the unrecognized user. The camera may identify the user 902 using a facial recognition algorithm. The networked device 102 may also access and/or be communicatively coupled to a microphone that detects the user 902 and/or the unrecognized user. The microphone may identify the user 902 using a voice recognition algorithm. Thus, the initial UI that is customized (e.g., based on a prior usage, a number of policy settings, and/or a demographic profile) for the user 902 and/or the unrecognized user may be displayed when the user 902 and/or the unrecognized user is within a certain proximity of the networked device 102.

For example, a certain initial UI may be displayed when a male child is detected. A different initial UI may be displayed when an adult woman approaches the male child. If the unrecognized user is detected, the networked device 102 may create a user profile. The user profile may be based on a number of analytics comprising the prior usage, the number of policy settings, and/or the demographic profile. The initial UI may be customized based on the user profile.

The prior usage may comprise a number of identifications of a number of previously rendered media data (e.g., the primary data 500) in the client device 100, the networked device 102, and/or any of the number of devices that currently and/or previously shared the network with the networked device 102. The networked device 102, the client device 100, the content identification server 1006, the metadata association server, the content recommendation server, the intermediary server 700, the relevancy-matching server 200, and/or any of the number of devices that currently and/or previously shared the network with the networked device 102 may be configured to retrieve, aggregate, and/or store the number of identifications of the number of previously rendered media data.

The number of identifications of the number of previously rendered media data may be stored in an identification database. The identification database may be associated with the user profile, the network, the networked device 102, the client device 100, and/or any of the number of devices that currently and/or previously shared the network with the networked device 102. The identification database may reside in the networked device 102, the client device 100, the content identification server 1006, the metadata association server, the content recommendation server, the intermediary server 700, the relevancy-matching server 200, and/or any of the number of devices that currently and/or previously shared the network with the networked device 102.

The networked device 102, the client device 100, the content identification server 1006, the metadata association server, the content recommendation server, and/or any of the number of devices that currently and/or previously shared the network with the networked device 102 may be configured to compare the identification of the related media data to the identification database and to determine the identification of the related media data to be an unrendered related media data (e.g., a missed episode). The initial UI may not be updated with the identification of the related media data when the identification of the related media data comprises a previously rendered media data. The networked device 102, the client device 100, the content identification server 1006, the metadata association server, the content recommendation server, the intermediary server 700, the relevancy-matching server 200, and/or any of the number of devices that currently and/or previously shared the network with the networked device 102 may be configured to automatically update the initial UI.

Additionally, the initial UI may be configured to display a number of channels and/or the number of identifications of the number of previously rendered media data based on a number of occurrences of the number of channels and/or the number of identifications of the previously rendered media data in the identification database. For example, the initial UI may display a number of favorite channels and/or a number of favorite media data. Further, the networked device 102 may be configured to access the electronic program guide and to retrieve the occurrence of a presently renderable media data (e.g., a program that has already started, a program that is about to start) from the electronic program guide. The presently renderable media data may comprise the related media data. In addition, the initial UI may be configured to change the channel 2100 rendered by the networked device 102 based on a selection of the user 902 and/or an other user. For example, the initial UI may access a remote control interface (e.g., via an infrared blaster) of a set-top box to effect a channel change.

Thus, the initial UI may display the media data 1004, the related media data, the identification 1304 of the media data 1004, the identification of the related media data, the number of metadata associated with the media data 1004, the number of metadata associated with the related media data, the presently renderable media data, the identification of the presently renderable media data, and/or the number of identifications of the number of previously rendered media data. The initial UI may also display a history of the number of previously rendered media data (e.g., a list of the 10 most recently viewed shows). The initial UI may also comprise a link to the related media data provider. The related media data may be rendered to the user 902 and/or the other user based on an action comprising a click-through action, a subscription action, and/or a purchase action (e.g., a pay-per-view purchase).

Figure 14:
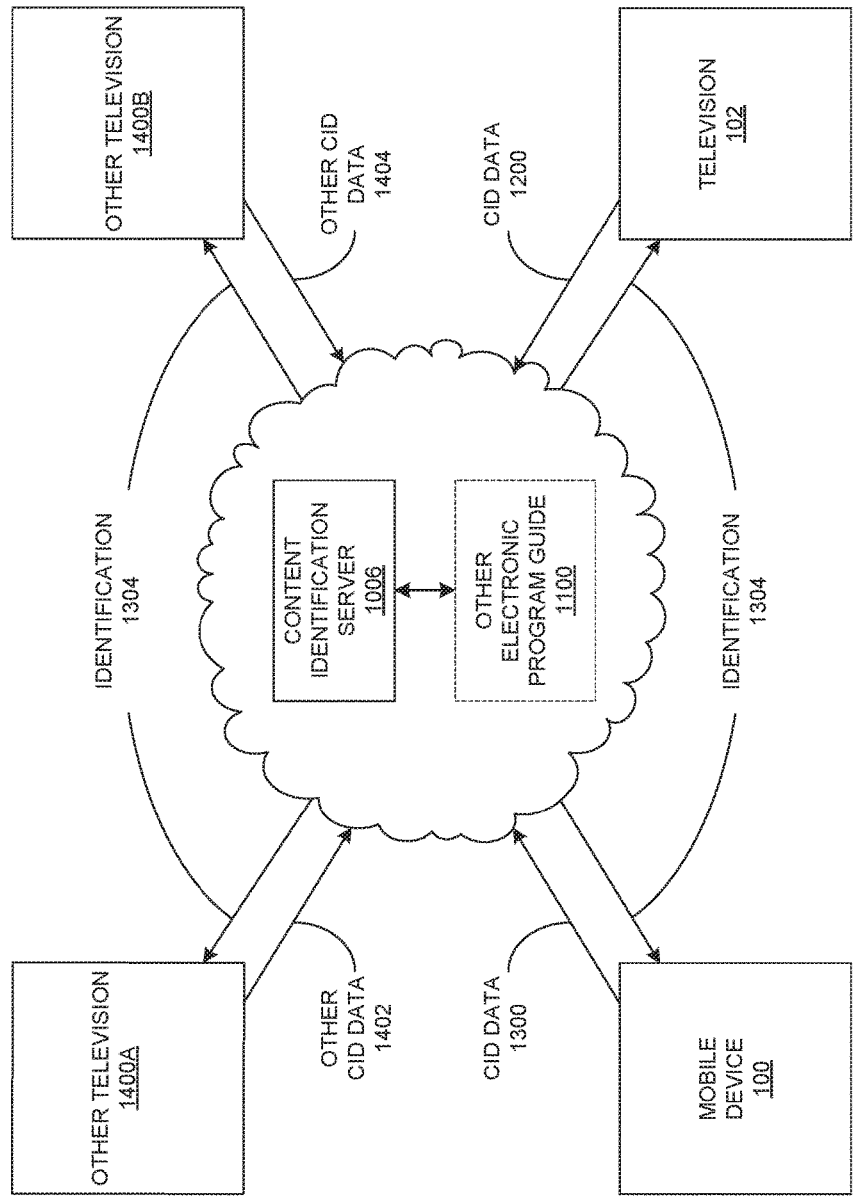
FIG. 14 is a block diagram of a system of determining the identification 1304 of the media data 1004 involving the content identification server 1006 and the plurality of other networked devices 1400A, 1400B, according to one embodiment.

FIG. 14 is a block diagram of a system of determining the identification 1304 of the media data 1004 involving the content identification server 1006 and the plurality of other networked devices 1400A, 1400B, according to one embodiment. FIG. 14 shows the client device 100, the networked device 102, the content identification server 1006, the other electronic program guide 1100, the CID data 1200, 1300, the other CID data 1402, 1404, the identification 1304, and the plurality of other networked devices 1400A, 1400B.

The content identification server 1006 may be configured to automatically determine the identification 1304 of the media data 1004 through the crowdsourcing. The crowdsourcing may be based on the consensus of the provisional identification 2400 and a plurality of other provisional identifications 2400. The content identification server 1006 may be configured to aggregate the provisional identification 2400 and the plurality of other provisional identifications 2400. The consensus may be algorithmically determined based on a number of criteria comprising a predetermined percentage of a predetermined number of samples, a reliability of the provisional identification 2400, and/or an other factor affecting a confidence score (e.g., measures an accuracy of the identification 1304 of the media data 1004) of the consensus.

The crowdsourcing may be used as an alternative or as a supplement to the capture server 1008A, 1008B. For example, the crowdsourcing may be used as the alternative to the capture server 1008A, 1008B in an area in which the capture server 1008A, 1008B has not been deployed. The crowdsourcing may be used as the supplement to the capture server 1008A, 1008B to detect a discrepancy between the identification 1304 of the media data 1004 determined using the capture server 1008A, 1008B and the identification 1304 of the media data 1004 using the crowdsourcing.

Figure 15:
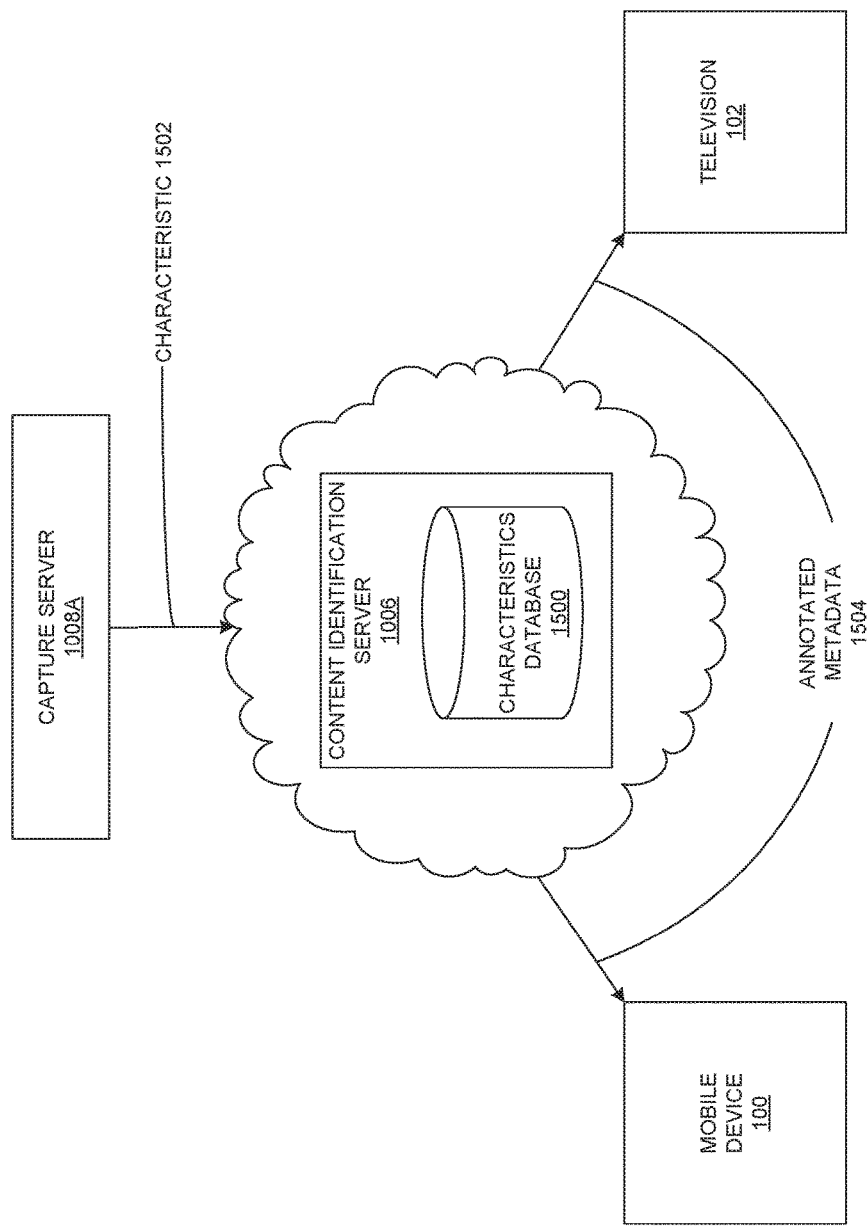
FIG. 15 is a block diagram depicting the content identification server 1006 configured to generate an annotated metadata 1504, according to one embodiment.

FIG. 15 is a block diagram depicting the content identification server 1006 configured to generate an annotated metadata 1504, according to one embodiment. FIG. 15 shows the client device 100, the networked device 102, the content identification server 1006, the capture server 1008A, a characteristics database 1500, the characteristic 1502, and the annotated metadata 1504.

The characteristics database 1500 exists within the content identification server 1006 of FIG. 15. According to one embodiment, the characteristics database 1500 may be a structured collection of information about a number of potentially identifying features of the other media data 1904.

The characteristic 1502 exists between the content identification server 1006 and the capture server 1008A of FIG. 15. The capture server 1008A, 1008B may be configured to store the other media data 1904 captured at the media transmission node 1010A, 1010B in a non-volatile memory (e.g., a disk). The other media data 1904 captured at the media transmission node 1010A, 1010B may be retrieved from a buffer of a predetermined length in the capture server 1008A, 1008B. The capture server 1008A, 1008B may be configured to detect the characteristic 1502 of the other media data 1904 captured at the media transmission node 1010A, 1010B. The capture server 1008A, 1008B may use a number of quadrature amplitude modulation (QAM) tuner cards and/or receive a video signal over IP using a number of Moving Pictures Expert Group (MPEG)-2 streams and/or MPEG4 including a number of data packets containing the closed captioning. The capture server 1008A, 1008B may also be configured to communicate the characteristic 1502 to the content identification server 1006.

The content identification server 1006 may be configured to process the characteristic 1502 from the capture server 1008A, 1008B. The content identification server 1006 may also be configured to identify the characteristic 1502 by comparing the characteristic 1502 to the characteristics database 1500.

The characteristics database 1500 may also exist in the capture server 1008A, 1008B. For example, when the characteristics database 1500 exists in the capture server 1008A, 1008B, the capture server 1008A, 1008B may be configured to identify the characteristic 1502 by comparing the characteristic 1502 to the characteristics database 1500.

In another embodiment, the capture server 1008A, 1008B may communicate the other media data 1904 to the content identification server 1006. Thus, the content identification server 1006 may be configured to detect the characteristic 1502 of the other media data 1904.

The annotated metadata 1504 exists between the content identification server 1006 and the client device 100 as well as between the content identification server 1006 and the networked device 102 of FIG. 15. According to one embodiment, the annotated metadata 1504 may comprise a machine-readable information describing the characteristic 1502. The content identification server 1006 and/or the capture server 1008A, 1008B may be configured to generate the annotated metadata 1504 associated with the other media data 1904 captured at the media transmission node 1010A, 1010B. The characteristic 1502 may be annotated in the annotated metadata 1504. The annotated metadata 1504 may comprise the descriptive metadata 1206 and/or the other descriptive metadata 2308.

The content identification server 1006 and/or the capture server 1008A, 1008B may communicate the annotated metadata 1504 to the networked device 102, the client device 100, and/or any of the number of devices with the access to the identification data 304 of the networked device 102 and/or the sandbox-reachable service 114 of the networked device 102. The networked device 102, the client device 100, and/or the number of devices may long poll and/or maintain a web socket open to the content identification server 1006 and/or the capture server 1008A, 1008B in a manner such that when the content identification server 1006 and/or the capture server 1008A, 1008B identifies the characteristic 1502, the content identification server 1006 and/or the capture server 1008A, 1008B may communicate the annotated metadata 1504 to the networked device 102, the client device 100, and/or the number of devices.

Figure 16:
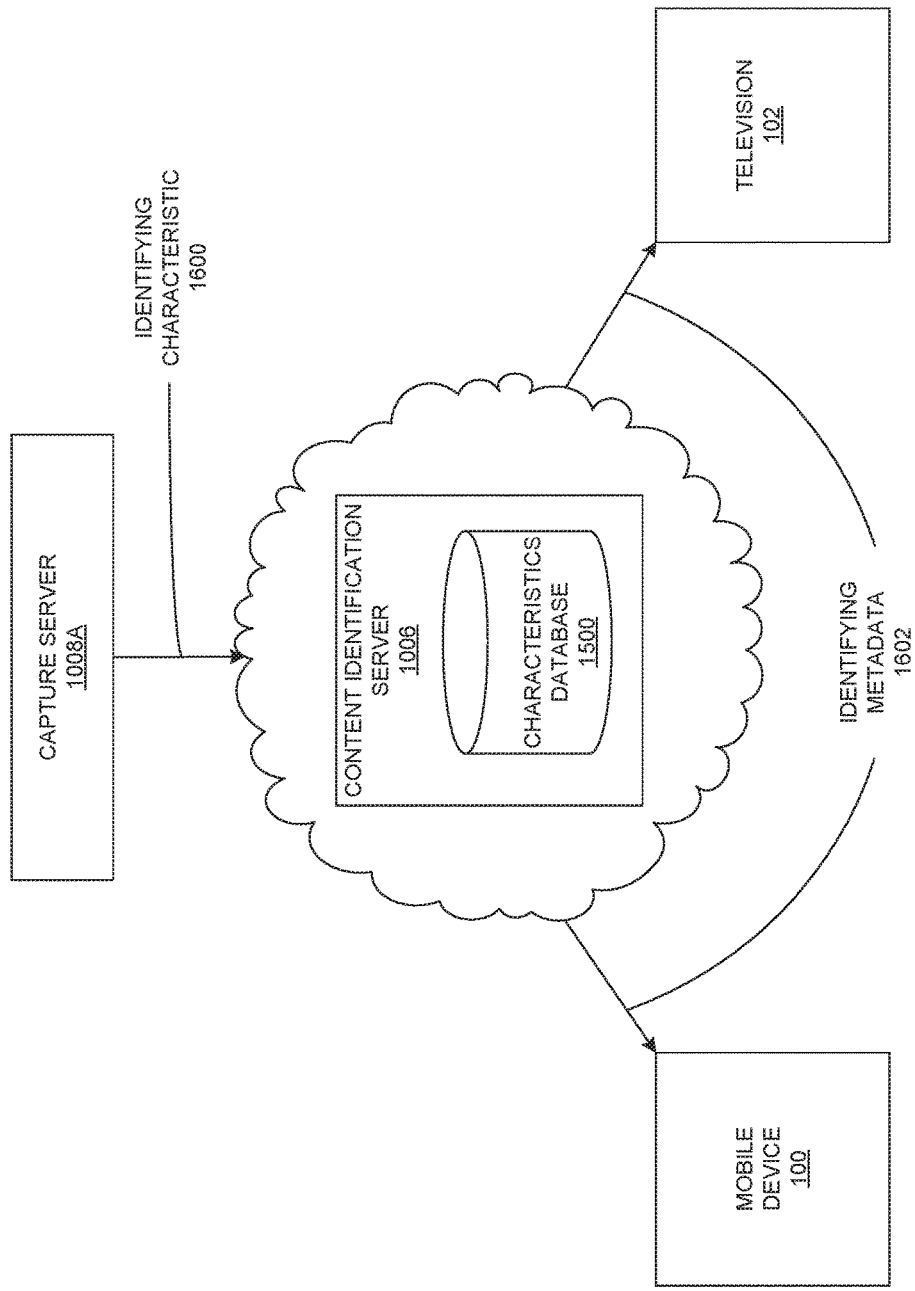
FIG. 16 is a block diagram depicting the content identification server 1006 configured to generate an identifying metadata 1602, according to one embodiment.

FIG. 16 is a block diagram depicting the content identification server 1006 configured to generate an identifying metadata 1602, according to one embodiment. FIG. 16 shows the client device 100, the networked device 102, the content identification server 1006, the capture server 1008A, the characteristics database 1500, an identifying characteristic 1600, and the identifying metadata 1602.

The identifying characteristic 1600 exists between the content identification server 1006 and the capture server 1008A of FIG. 16. According to one embodiment, the identifying characteristic 1600 may comprise the characteristic 1502 that may identify a recurring sequence 2102 (e.g., an advertisement). The capture server 1008A, 1008B may be configured to detect the identifying characteristic 1600 of the other media data 1904 associated with the recurring sequence 2102. The capture server 1008A, 1008B may also be configured to communicate the identifying characteristic 1600 to the content identification server 1006.

The content identification server 1006 may be configured to process the identifying characteristic 1600 from the capture server 1008A, 1008B. The content identification server 1006 may also be configured to identify the identifying characteristic 1600 by comparing the identifying characteristic 1600 to the characteristics database 1500. Alternatively, when the characteristics database 1500 exists in the capture server 1008A, 1008B, the capture server 1008A, 1008B may be configured to identify the identifying characteristic 1600 by comparing the identifying characteristic 1600 to the characteristics database 1500.

In another embodiment, the capture server 1008A, 1008B may communicate the other media data 1904 to the content identification server 1006. Thus, the content identification server 1006 may be configured to detect the identifying characteristic 1600 of the other media data 1904.

The identifying metadata 1602 exists between the content identification server 1006 and the client device 100 as well as between the content identification server 1006 and the networked device 102 of FIG. 16. According to one embodiment, the identifying metadata 1602 may comprise a machine-readable information describing the identifying characteristic 1600. The content identification server 1006 and/or the capture server 1008A, 1008B may be configured to generate the identifying metadata 1602 associated with the recurring sequence 2102. The identifying characteristic 1600 may be annotated in the identifying metadata 1602. The identifying metadata 1602 may comprise the descriptive metadata 1206 and/or the other descriptive metadata 2308.

The content identification server 1006 and/or the capture server 1008A, 1008B may communicate the identifying metadata 1602 to the networked device 102, the client device 100, and/or any of the number of devices with the access to the identification data 304 of the networked device 102 and/or the sandbox-reachable service 114 of the networked device 102. The networked device 102, the client device 100, and/or the number of devices may long poll and/or maintain the web socket open to the content identification server 1006 and/or the capture server 1008A, 1008B in a manner such that when the content identification server 1006 and/or the capture server 1008A, 1008B identifies the identifying characteristic 1600, the content identification server 1006 and/or the capture server 1008A, 1008B may communicate the identifying metadata 1602 to the networked device 102, the client device 100, and/or the number of devices.

A video sequence, an audio sequence, and/or a subset of frames of the other media data 1904 that is stored by the capture server 1008A, 1008B may also enable a curation of the video sequence, the audio sequence, and/or the subset of frames by the user 902 of the networked device 102 and/or the client device 100 without requiring the networked device 102 and/or the client device 100 to directly capture the video sequence, the audio sequence, and/or the subset of frames of the media data 1004. When the user 902 initiates a request for the video sequence, the audio sequence, and/or the subset of frames, the capture server 1008A, 1008B may go backwards in time from the request to retrieve the other media data 1904 from the buffer.

The user 902 of the networked device 102 may initiate the request using the remote control. The remote control may be the client device 100 acting as the remote control. The request may specify a particular video sequence, a particular audio sequence, and/or a particular subset of frames based on a number of actions of the user 902. When the identification 1304 of the media data 1004 has been determined, the capture server 1008A, 1008B may be queried for the video sequence, the audio sequence, and/or the subset of frames corresponding to the identification 1304 of the media data 1004 and the timestamp of the media data 1004. The capture server 1008A, 1008B and/or the content identification server 1006 may communicate a media data set to the networked device 102.

The media data set may comprise the video sequence and/or the audio sequence. The media data set may comprise the subset of frames and/or a number of images derived from the subset of frames (e.g., a thumbnail). The media data set may comprise a number of actual images and/or a number of URLs referring to the number of images. The media data set may comprise a set of clips associated with a number of points in the media data 1004 that have been provided by a content provider. The media data set may comprise the particular video sequence, the particular audio sequence, and/or the particular subset of frames specified by the user 902. The media data set may be communicated to a predetermined location (e.g., an email address, a POST to a URL) by the capture server 1008A, 1008B and/or the content identification server 1006.

The user 902 of the client device 100 may initiate the request using the sandboxed application 112 and/or an other application of the client device 100. The sandboxed application 112 and/or the other application may be paired with the networked device 102 (e.g., using the pairing server 300, using the extension 404 to the security sandbox 104, using a hidden signal of the networked device 102, using a bar code and/or a matrix code of the networked device 102). The client device 100 may obtain the identification 1304 of the media data 1004 and the timestamp of the media data 1004 from the networked device 102. The capture server 1008A, 1008B may be queried for the video sequence, the audio sequence, and/or the subset of frames corresponding to the identification 1304 of the media data 1004 and the timestamp of the media data 1004. The capture server 1008A, 1008B and/or the content identification server 1006 may communicate the media data set to the client device 100 and/or to the predetermined location.

The networked device 102 and/or the client device 100 may implement any of a number of applications for handling the media data set. The networked device 102 and/or the client device 100 may display the media data set in a tile list, as a slide show, and/or in an other format for navigating the media data set. The user 902 may select a subset of the media data set in the networked device 102 and/or the client device 100. The networked device 102 and/or the client device 100 may communicate the subset of the media data set to a media data storage server that stores a number of pinned media data. The media data storage server may be separate from the capture server 1008A, 1008B, the content identification server 1006, the relevancy-matching server 200, the intermediary server 700, and/or the pairing server 300.

The user 902 may communicate the subset of the media data set to the media data storage server by posting (e.g., using a HTTP POST) the subset of the media data set, posting a list of the number of URLs of the subset of the media data set, using a plurality of HTTP POSTs of a number of individual URLs to the subset of the media data set, etc. The user 902 may post the number of individual URLs by encoding a number of media data URLs as a number of values in a number of query string key-value pairs in the number of individual URLs HTTP POSTed or passed via an HTTP GET. The user 902 may recall the subset of the media data set in the media data storage server by visiting a web site, running a desktop application that communicates with the media data storage server, etc.

The client device 100 may be automatically configured to act as the remote control. When the client device 100 and the networked device 102 reside behind a same public IP address, the client device 100 may discover the networked device 102 using the discovery service. The discovery service may communicate the model identifier and/or a remote control configuration identifier of the networked device 102 to the client device 100. When the client device 100 and the networked device 102 are paired using the hidden signal of the networked device 102, the client device 100 and the networked device 102 may not be required to reside on a same network. The hidden signal may be a covert channel embedded in an audio output, an image output, and/or a video output of the networked device 102. For example, the covert channel may be a video watermark identifier. The hidden signal may communicate the model identifier and/or the remote control configuration identifier to the client device 100. The model identifier and/or the remote control configuration identifier may be used to lookup a configuration information for an infrared component, a Bluetooth component, and/or an other remote control component. If the client device 100 maintains a local database of a number of remote control configurations (e.g., an IrDA profile), the client device 100 may not need to access the Internet.

The covert channel may be a low-bitrate communication in one-direction. The covert channel may use a relatively small amount of power. The covert channel may enable the communication session 116 between the sandboxed application 112 and the sandbox-reachable service 114 without opening the networked device 102 to a security risk. The covert channel may enable the client device 100 on the cellular network 710 to communicate with the networked device 102 over the Internet. The networked device 102 may be aware of (e.g., via an initial configuration, via a HDMI-CEC) the number of devices to which the networked device 102 is communicatively coupled. The covert channel and/or a serving device described by the covert channel may announce the number of devices to which the networked device 102 is communicatively coupled.

The covert channel may continuously announce the device identifier of the networked device 102 and/or the identification data 304. The sandboxed application 112 of the client device 100 and/or the other application of the client device 100 may process the audio output, the image output, and/or the video output, extract the covert channel, and use the device identifier and/or the identification data 304 to pair with the networked device 102 and/or a service of the networked device 102. The networked device 102 and the client device 100 may not reside on the same network. For example, the client device 100 may use a data service (e.g., a 3G service, a 4G service) and/or a text message service (e.g., a SMS service) while the networked device 102 may use a wired connection and/or a wireless connection (e.g., a WiFi connection) to the Internet. The sandboxed application 112 and/or the other application of the client device 100 may use a relay service (e.g., via the pairing server 300, via the extension 404) to communicate with the networked device 102. To determine the number of devices announcing via the covert channel, the sandboxed application 112 may use the loopback interface to contact a service agent running on a well-known port on the client device 100 that is outside the security sandbox 104.

To increase a level of security, the networked device 102 may not use the covert channel to announce the GUID 704. The networked device 102 may generate an ephemeral (e.g., time varying) GUID to announce via the covert channel. The networked device 102 may communicate the ephemeral GUID and the GUID 704 to the relay service via an IP pathway. Alternatively, the relay service and the networked device 102 may establish a shared secret. The networked device 102 may generate the ephemeral GUID from the shared secret and the GUID 704. The relay service may then reconstruct the GUID 704.

The covert channel may be masked by the audio output, the image output, and/or the video output of the networked device 102. For example, if the networked device 102 has a microphone, the networked device 102 may mask the covert channel using an environmental noise. If the networked device 102 does not have a microphone, the networked device 102 may mask the covert channel using a broad spectrum of the audio output, the image output, and/or the video output to appear as a white noise. Thus, the networked device 102 that is otherwise powered off and the networked device 102 that does not naturally generate the audio output, the image output, and/or the video output may mask the covert channel.

When the client device 100 receives a broadcast identifier (e.g., the device identifier, the GUID 704, the ephemeral GUID), the client device 100 may contact the discovery service passing the broadcast identifier. The discovery service may be reachable by the client device 100. The client device 100 may not reside on the same network as the networked device 102 and/or the serving device. The client device 100 may not have a security access to the network of the serving device and/or the networked device 102. Thus, the discovery service may not reside on the same network as the serving device and/or the networked device 102.

The discovery service may be a distributed service running on a peer-to-peer substrate (e.g., a Distributed Hash Table) and/or a centralized discovery service for the Internet (e.g., via the pairing server 300). The discovery service may be used for a security overlay. The discovery service may be used to lookup a number of services made available by a discovered device (e.g., discovered by the covert channel). Thus, a very low bitrate may be used for the covert channel while a higher bitrate channel may be used for communicating a number of service details. However, the number of service details may also be communicated through the covert channel in a form of the model identifier, a description, etc. Communicating the number of service details in the covert channel may require a greater amount of resources from the low bitrate channel. Thus, the broadcast identifier may be communicated less frequently and/or the higher bitrate channel may become more intrusive and/or less covert.

The relay service may be used by the client device 100 to communicate with the number of services. The client device 100 may not have a network connectivity usually associated with the Internet. The client device 100 may use the text message service to send a number of messages to a 1-800 phone number and/or an equivalent number acting as a gateway to relay a number of calls to the number of services.

For example, a company may have a slideshow projector dedicated to running a slideshow application. The company may not wish to grant a network access to a mobile phone of a visitor, but the company may wish to allow the visitor to use the slideshow projector. The slideshow projector may use an audio covert channel to announce the broadcast identifier of the slideshow projector. The visitor may run the slideshow application on the mobile phone which detects the slideshow projector by listening on the microphone of the mobile phone. The mobile phone may not have a direct access to an IP network. The mobile phone may have the SMS service, the 3G service, the 4G service, an other packet service, and/or an other message service. The slideshow application of the mobile phone may send a command to run the slideshow application at a specified URL to the 1-800 phone number of the centralized discovery service. The centralized discovery service may forward the command over the Internet to the slideshow projector. The slideshow projector may download the slideshow from the specified URL. The slideshow application of the mobile phone may send a number of subsequent commands via the gateway to move to an other slide and/or otherwise control the slideshow. Thus, the slideshow may be displayed on a secure network of the company through a limited externally facing API. The slideshow application may be used as a trusted intermediary between the secure network and the mobile phone.

In another embodiment, the device identifier may be embedded in the bar code, the matrix code (e.g., a 2D bar code, an Aztec code, a QR code), and/or a similar pattern that is attached to the networked device 102 (e.g., as a sticker) and/or displayed through the networked device 102 (e.g., displayed on a television screen by going to a preferences channel). The client device 100 may take a picture of the bar code, the matrix code, and/or the similar pattern using a camera. The client device 100 may process the picture to extract the bar code, the matrix code, and/or the similar pattern. The device identifier obtained from extract the bar code, the matrix code, and/or the similar pattern may be used in a similar manner as the device identifier obtained from the covert channel. For example, the device identifier may enable the client device 100 to communicate with the networked device 102 via the SMS service, the 3G service, the 4G service, a WiFi service, etc. The bar code may comprise a Universal Product Code (UPC). The UPC may provide the model identifier with which to select a remote control profile.

For example, the slideshow projector may bear a sticker with the bar code. Alternatively, the slideshow projector may project the bar code onto a surface (e.g., a screen, a wall). The mobile phone may take the picture of the bar code using the camera of the mobile phone. The device identifier of the slideshow projector may be used to automatically configure the mobile phone to act as the remote control for the slideshow projector.

A time estimation algorithm may also estimate a playback time within the content of the media data 1004 and/or the other media data 1108, 1112, 1904. When the audio output, the image output, and/or the video output of the networked device 102 may not be accessed, the covert channel may not be used to embed the broadcast identifier. However, the identification 1304 of the media data 1004 along with an estimated playback time within the content of the media data 1004 may be used to disambiguate between the number of devices and/or the number of services known to the sandboxed application 112 and/or the other application of the client device 100. The number of devices and/or the number of services may be known via the discovery service by an account binding, a number of short codes, and/or an other binding mechanism that pairs and/or binds the sandboxed application 112 and/or the other application of the client device 100 to the number of devices and/or the number of services. The number of devices may have been previously paired (e.g., when the client device 100 of the user 902 was in a different network). The sandboxed application 112 and/or the other application of the client device 100 may access an audio input (e.g., a microphone), an image input, and/or a video input (e.g., a camera) to identify the content of the media data 1004.

If a known device is playing an identified content, a credibility may be added to a hypothesis that the identified content was generated by the known device. If the playback time for the content played by the known device playing the identified content also happens near the estimated time, the credibility of the hypothesis may be increased. If the known device also happens to be in the same network as the sandboxed application 112 and/or the other application of the client device 100, the credibility of the hypothesis may be further increased. A plurality of criteria (e.g., a nearness in a number of estimated playback times; a recency in time since the known device was last discovered; a nearness in a number of GPS coordinates and/or a number of Geo-IP coordinates of the known device, the sandboxed application 112, and/or the other application; a sharing of the same network as determined by a shared public IP; the sharing of the same network via an other discovery service) may be combined to increase the credibility of the hypothesis.

When the known device has been determined to be near the client device 100 with a sufficiently high confidence, the sandboxed application 112 and/or the other application may perform a bidirectional communication with the known device and/or a service of the known device. For example, the client device 100 may query the known device for the identification 1304 of the media data 1004 recently rendered by the known device.

Figure 17:
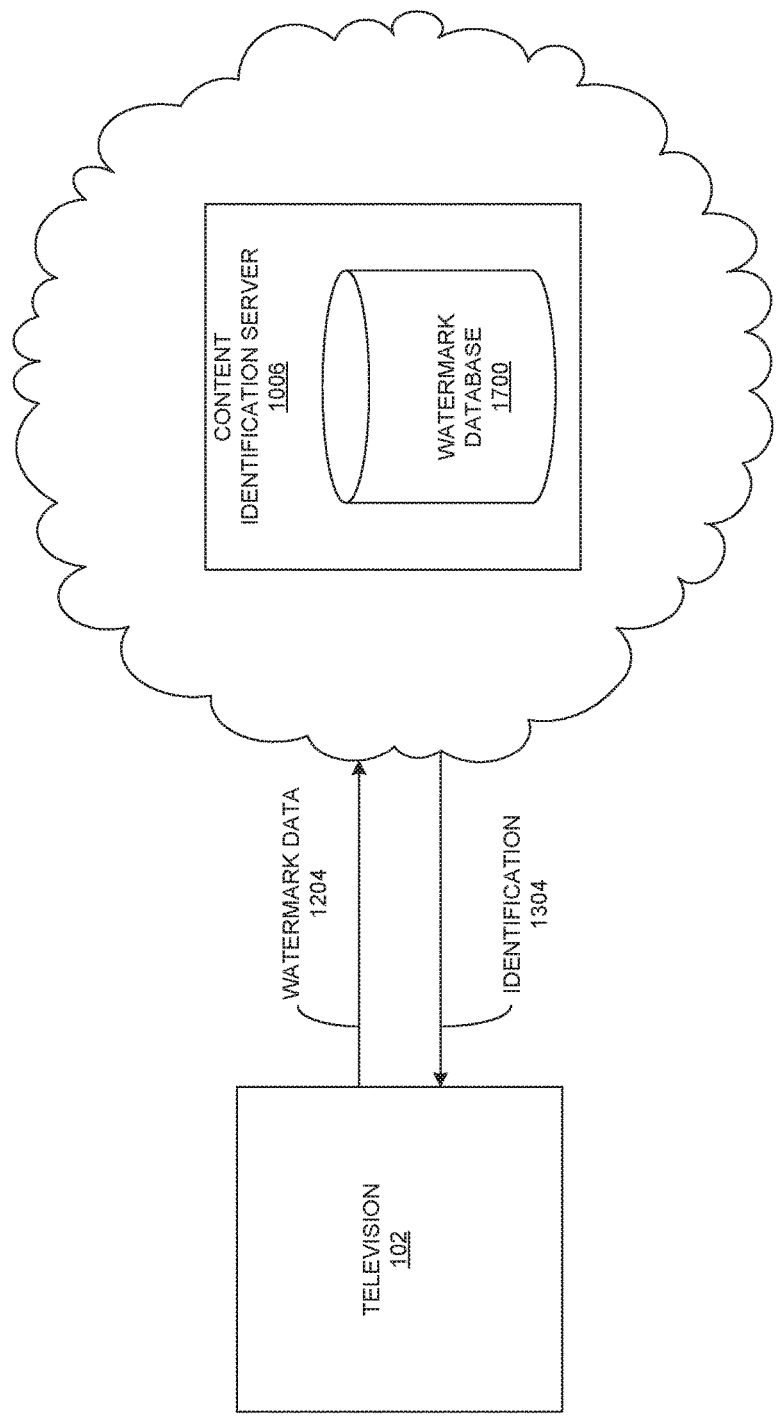
FIG. 17 is a block diagram of a system of determining the identification 1304 of the media data 1004 involving a watermark data 1204, according to one embodiment.

FIG. 17 is a block diagram of a system of determining the identification 1304 of the media data 1004 involving the watermark data 1204, according to one embodiment. FIG. 17 shows the networked device 102, the content identification server 1006, the watermark data 1204, the identification 1304, and the watermark database 1700.

The watermark database 1700 exists within the content identification server 1006 of FIG. 17. According to one embodiment, the watermark database 1700 may be a structured collection of information comprising the known watermark data and the identification of the known watermark data.

For example, FIG. 17 illustrates the networked media device 102 communicating the watermark data 1204 of the media data 1004 to the content identification server 1006. The content identification server 1006 then compares the watermark data 1204 to the known watermark data in the watermark database 1700 and communicates the identification of the known watermark data when the watermark data 1204 is identical to the known watermark data.

Figure 18:
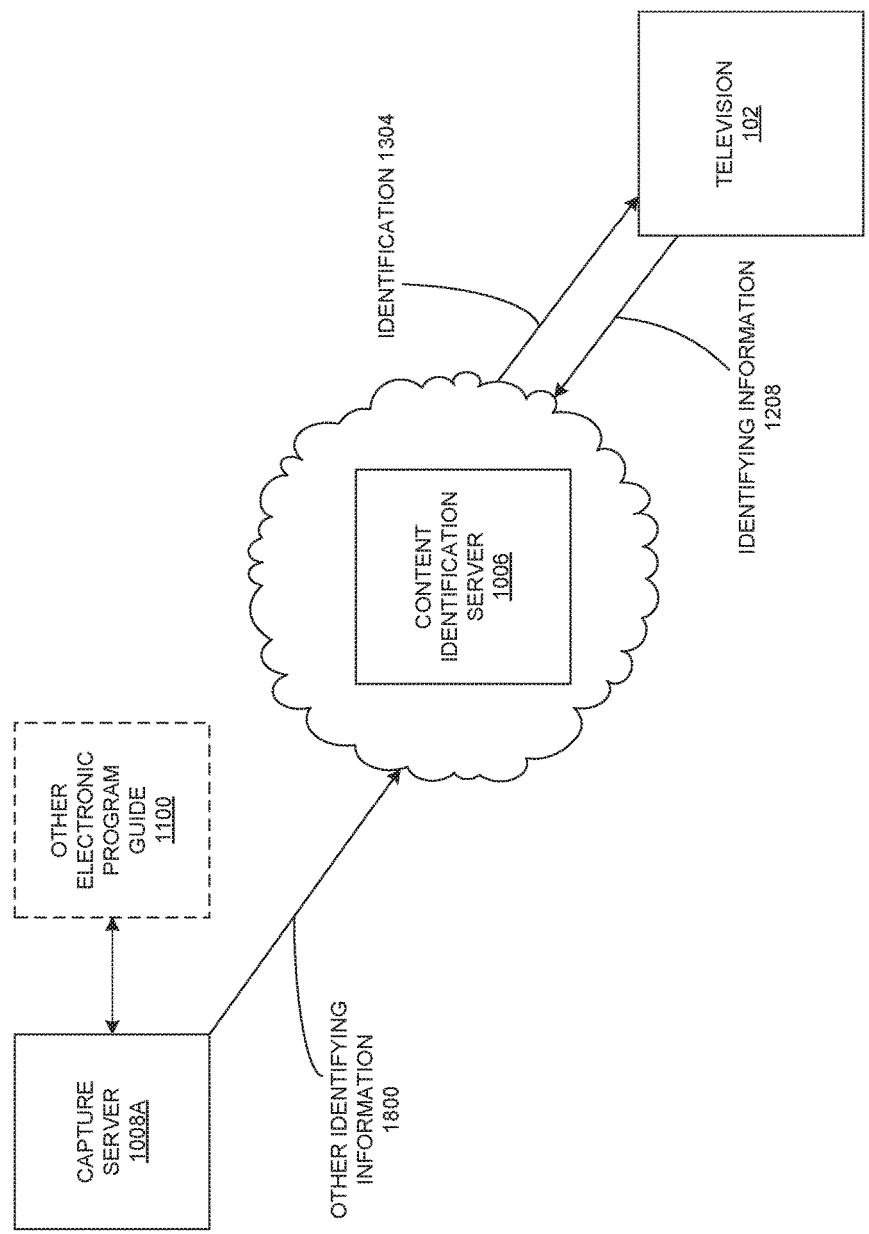
FIG. 18 is a block diagram of a system of determining the identification 1304 of the media data 1004 involving an identifying information 1208, according to one embodiment.

FIG. 18 is a block diagram of a system of determining the identification 1304 of the media data 1004 involving the identifying information 1208, according to one embodiment. FIG. 18 shows the networked device 102, the content identification server 1006, the capture server 1008A, the identifying information 1208, the identification 1304, the other electronic program guide 1100, and the other identifying information 1800.

For example, FIG. 18 illustrates the networked device 102 communicating the identifying information 1208 that identifies the channel 2100 of the networked device 102 to the content identification server 1006. The capture server 1008A monitoring the channel 2100 accesses the other electronic program guide 1100 and determines the identification 1304 of the other media data 1904 scheduled for the channel 2100. The capture server 1008A then communicates the other identifying information 1800 that identifies the content of the other media data 1904 to the content identification server 1006. The content identification server 1006 processes the other identifying information 1800 and associates the other identifying information 1800 with the identification 1304 of the other media data 1904. The content identification server 1006 then associates the identification 1304 with the media data 1004 and communicates the identification 1304 to the networked device 102.

Figure 19:
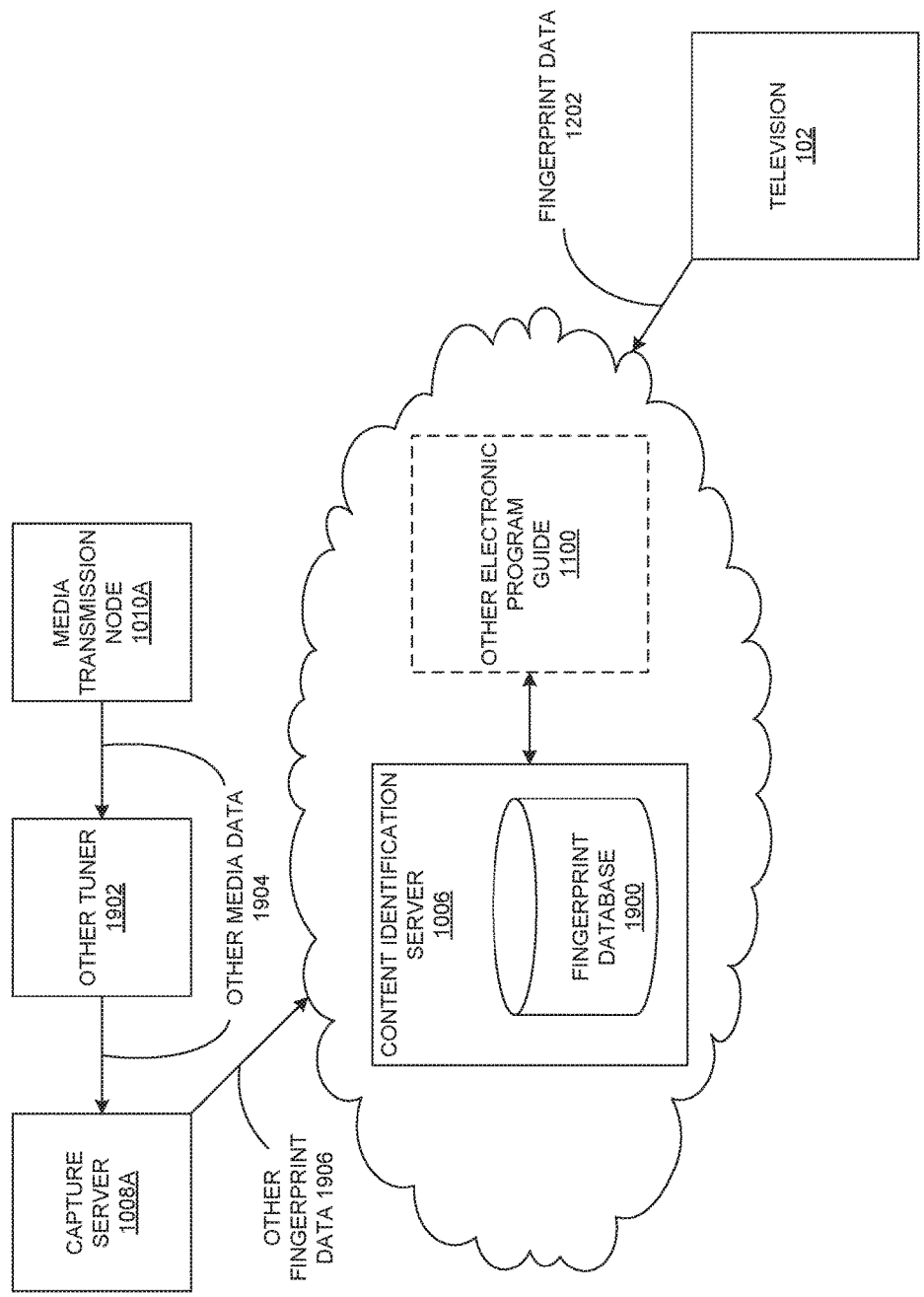
FIG. 19 is a block diagram of a system of determining the identification 1304 of the media data 1004 involving a fingerprint data 1202 and an other fingerprint data 1906, according to one embodiment.

FIG. 19 is a block diagram of a system of determining the identification 1304 of the media data 1004 involving the fingerprint data 1202 and the other fingerprint data 1906, according to one embodiment. FIG. 19 shows the networked device 102, the capture server 1008A, the media transmission node 1010A, the content identification server 1006, the fingerprint data 1202, the fingerprint database 1900, the other tuner 1902, the other media data 1904, the other fingerprint data 1906, and the other electronic program guide 1100.

The other tuner 1902 exists between the capture server 1008A and the media transmission node 1010A of FIG. 19. According to one embodiment, the other tuner 1902 and/or the tuner 2300 may be a television tuner, a radio tuner, and/or an other means of selecting a media channel.

For example, FIG. 19 illustrates an embodiment in which the networked device 102 communicates the fingerprint data 1202 to the content identification server 1006, and the capture server 1008A communicates the other fingerprint data 1906 to the content identification server 1006. The capture server 1008A monitors the other media data 1904 of the channel 2100 through the other tuner 1902 at the media transmission node 1010A. Thus, the capture server 1008A also communicates the channel 2100 to the content identification server 1006. The content identification server 1006 processes the channel 2100 from the capture server 1008A and accesses the other electronic program guide 1100 to obtain the identification 1304 of the other media data 1904. The content identification server 1006 then associates the identification 1304 of the other media data 1904 with the other fingerprint data 1906. If the fingerprint data 1202 matches the other fingerprint data 1906, the content identification server 1006 also associates the identification 1304 of the other media data 1904 with the fingerprint data 1202 and communicates the identification 1304 to the networked device 102.

The fingerprint database 1900 exists within the content identification server 1006 of FIG. 19. According to one embodiment, the fingerprint database 1900 may be a structured collection of information comprising the fingerprint data 1202, the other fingerprint data 1906, 2302, 2306, 2602, the timestamp, the other timestamp, the device identifier, the other device identifier, the identification 1304 of the media data 1004, the identification 1304 of the other media data 1108, 1112, 1904, the provisional identification 2400, and/or the other provisional identification 2400.

The content identification server 1006 may store the fingerprint data 1202 and/or the other fingerprint data 1906, 2302, 2306, 2602 in the fingerprint database 1900. The fingerprint database 1900 may be updated at any time with the fingerprint data 1202, the other fingerprint data 1906, 2302, 2306, 2602, the timestamp, the other timestamp, the device identifier, the other device identifier, the identification 1304 of the media data 1004, the identification 1304 of the other media data 1108, 1112, 1904, the provisional identification 2400, and/or the other provisional identification 2400. The fingerprint database 1900 may be updated in a manner such that, in the future, the content identification server 1006 may process the fingerprint data 1202 and check the fingerprint database 1900 for a match 2002 prior to processing the other fingerprint data 1906, 2302, 2306, 2602.

The content identification server 1006 may be configured to process the other fingerprint data 1906, 2302, 2306, 2602 of the other media data 1108, 1112, 1904 from the capture server 1008A, 1008B and/or the plurality of other networked devices 1400A, 1400B. The content identification server 1006 may also be configured to store the other fingerprint data 1906, 2302, 2306, 2602 in the fingerprint database 1900. Further, the content identification server 1006 may be configured to process the fingerprint data 1202 of the media data 1004 from the networked device 102, the client device 100, and/or any of the number of devices that previously and/or currently shared the network with the networked device 102.

The content identification server 1006 may compare the fingerprint data 1202 to the other fingerprint data 1906, 2302, 2306, 2602. The other fingerprint data 1906, 2302, 2306, 2602 may exist in the fingerprint database 1900. Further, the content identification server 1006 may automatically determine the identification 1304 of the media data 1004 by associating the fingerprint data 1202 with the identification 1304 and/or the provisional identification 2400 of the other media data 1108, 1112, 1904 associated with the other fingerprint data 1906, 2302, 2306, 2602 that matches the fingerprint data 1202.

FIG. 20 is a table 2050 depicting a determination of the identification 1304 of the media data 1004 by comparing the fingerprint data sequence 2000 to the fingerprint database 1900, according to one embodiment. FIG. 20 shows the fingerprint data sequence 2000, the fingerprint database 1900, the match 2002, and the table 2050.

The fingerprint data sequence 2000 exists as a column of the table 2050 of FIG. 20. According to one embodiment, the fingerprint data sequence 2000 and/or the other fingerprint data sequence may be a series of consecutive fingerprint data. A probability of a false positive (e.g., when the fingerprint data 1202 and the other fingerprint data 1906, 2302, 2306, 2602 match while the media data 1004 and the other media data 1108, 1112, 1904 do not match) using a single fingerprint data may be (1−p[correct match]). However, the probability of the false positive using the fingerprint data sequence 2000 may be $(1-p[\text{correct match}])^r$ where r=a length of the fingerprint data sequence 2000. Thus, the confidence score of the match 2002 may be based on the length of a matching fingerprint data sequence.

Thus, the probability of the false positive may be reduced to a negligible level by comparing the fingerprint data sequence 2000 of the media data 1004 to the other fingerprint data sequence. The content identification server 1006 may be configured to compare the fingerprint data sequence 2000 of the media data 1004 to the other fingerprint data sequence. The content identification server 1006 may also be configured to associate the fingerprint data sequence 2000 with the identification 1304 and/or the provisional identification 2400 of the other media data 1108, 1112, 1904 associated with the other fingerprint data sequence when a predetermined number of sequential fingerprint data of the fingerprint data sequence 2000 matches the predetermined number of sequential fingerprint data of the other fingerprint data sequence.

To account for a number of missing fingerprint data in the fingerprint data sequence 2000 and/or the other fingerprint data sequence, the content identification server 1006 may be configured to apply an algorithm comprising a sliding window algorithm. For example, the fingerprint database 1900 may store the other fingerprint data sequence 2000 "A-B-C-D." The content identification server 1006 may compare the other fingerprint data sequence to the fingerprint data sequence 2000 "A-B-_-D" where "_" denotes a missing fingerprint data (e.g., the fingerprint data 1202 at a time between the timestamp for the fingerprint data 1202 "B" and the timestamp for the fingerprint data 1202 "D"). The sliding window algorithm may require two matching fingerprint data before a particular fingerprint data and one matching fingerprint data after the particular fingerprint data in order to include the fingerprint data 1202 in the fingerprint data sequence 2000. Thus, the sliding window algorithm may compare the fingerprint data sequence 2000 "A-B-_-D" to the other fingerprint data sequence "A-B-C-D" and include "C" in the fingerprint data sequence 2000 "A-B-_-D." As a result of the sliding window algorithm, there may be four matching sequential fingerprint data.

The match 2002 exists in a column of table 2050 of FIG. 20. According to one embodiment, the match 2002 may be a condition in which the fingerprint data sequence 2000 sufficiently corresponds to the other fingerprint data sequence. For example, the match 2002 in FIG. 20 may be declared when three sequential fingerprint data match.

The content identification server 1006 may be configured to automatically determine the identification 1304 of the media data 1004 in a manner such that the content identification server 1006 is configured to initiate a number of comparisons between the fingerprint data 1202 and the other fingerprint data 1906, 2302, 2306, 2602. The number of comparisons may be separated by a predetermined time interval. The content identification server 1006 may process the fingerprint data 1202 prior to processing the other fingerprint data 1906, 2302, 2306, 2602. Alternatively, the content identification server 1006 may process the other fingerprint data 1906, 2302, 2306, 2602 prior to processing the fingerprint data 1202. Yet another alternative may entail the content identification server 1006 processing the fingerprint data 1202 and the other fingerprint data 1906, 2302, 2306, 2602 simultaneously. Thus, the number of comparisons may be initiated until a matching fingerprint data sequence is found.

For example, in FIG. 20, the other fingerprint data sequence "751-242-369-520-818" already exists in the fingerprint database 1900 when the content identification server 1006 processes the fingerprint data sequence 2000 "751-242-369-520-818." Thus, the content identification server 1006 immediately compares the fingerprint data sequence 2000 "751-242-369-520-818" to the other fingerprint data sequence "751-242-369-520-818." However, the content identification server 1006 processes the fingerprint data sequence 2000 "314-275-860-926-437" prior to the processing of the matching fingerprint data sequence. Thus, the content identification server 1006 initiates four comparisons until the match 2002 is declared when the predetermined number of three sequential fingerprint data of "314-275-860" is found.

FIG. 21 is a table 2150 depicting a determination of the recurring sequence 2102, according to one embodiment. FIG. 21 shows the channel 2100, the fingerprint data sequence 2000, the recurring sequence 2102, the table 2150, and the fingerprint database 1900.

The channel 2100 exists in a column of the table 2150 of FIG. 21. According to one embodiment, the channel 2100 may be an information communication pathway. For example, the channel 2100 may correspond to a radio broadcasting frequency, a television broadcasting frequency, and/or an Internet media channel.

The recurring sequence 2102 exists in a column of the table 2150 of FIG. 21. The content identification server 1006 may be configured to determine that a portion of the fingerprint data sequence 2000 and/or of the other fingerprint data sequence is a recurring sequence 2102 when the portion is detected a predetermined number of times across a plurality of channels 2100 and/or at a plurality of different times. Additionally, the content identification server 1006 may be configured to update the fingerprint database 1900 with the recurring sequence 2102. The content identification server 1006 may also be configured to apply the algorithm comprising the sliding window algorithm to account for the number of missing fingerprint data in the recurring sequence 2102.

Further, the content identification server 1006 and/or the capture server 1008A, 1008B may be configured to assign a unique identifier to the recurring sequence 2102. Still further, the content identification server 1006 and/or the capture server 1008A, 1008B may be configured to add the unique identifier of the recurring sequence 2102 to a recurring sequence metadata database along with a recurring sequence metadata. The content identification server 1006 and/or the capture server 1008A, 1008B may be configured to generate the recurring sequence metadata. The recurring sequence metadata may be a machine-readable information describing the recurring sequence 2102. The recurring sequence metadata may comprise the identifying metadata 1602, the descriptive metadata 1206, and/or the other descriptive metadata 2308.

Figure 22:
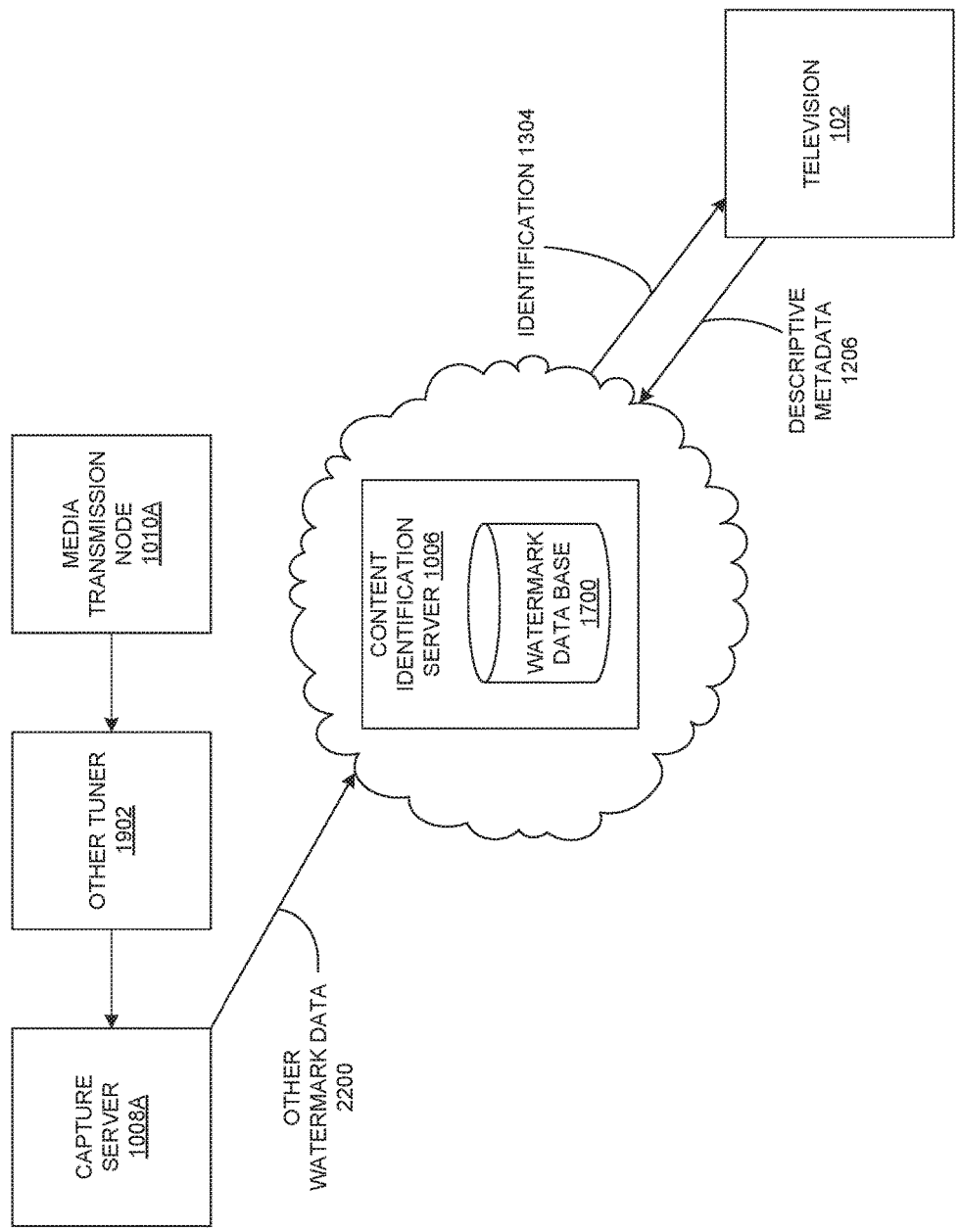
FIG. 22 is a block diagram of a system of determining the identification 1304 of the media data 1004 involving a descriptive metadata 1206 and an other watermark data 2200, according to one embodiment.

FIG. 22 is a block diagram of a system of determining the identification 1304 of the media data 1004 involving the descriptive metadata 1206 and the other watermark data 2200, according to one embodiment. FIG. 22 shows the networked device 102, the content identification server 1006, the capture server 1008A, the media transmission node 1010A, the descriptive metadata 1206, the identification 1304, the other tuner 1902, the watermark database 1700, and the other watermark data 2200.

FIG. 22 illustrates the networked device 102 communicating the descriptive metadata 1206 identifying the channel 2100 of the networked device 102 to the content identification server 1006. The capture server 1008A at the media transmission node 1010A monitors the channel 2100 through the other tuner 1902 and communicates the other watermark data 2200 to the content identification server 1006. The content identification server 1006 then compares the other watermark data 2200 to the known watermark data in the watermark database 1700 and communicates the identification of the known watermark data to the networked device 102.

However, the CID data 1200, 1300 and/or the other CID data 1302, 1306, 1402, 1404 may be subject to a number of systematic error sources. For example, the fingerprint data 1202 may not sufficiently correspond to the other fingerprint data 1906, 2302, 2306, 2602 to declare the match 2002 due to the number of systematic error sources. The number of systematic error sources may comprise a pseudostatic error and/or a random error. The pseudostatic error may be a number of changes applied to the media data 1004 in a media data pipeline (e.g., an audio pipeline, a video pipeline) and/or arriving to the media data pipeline that is unlikely to change unless the user changes a number of settings and/or a number of media data sources (e.g., an audio source, a video source). The random error may be a random transmission noise (e.g., a compression noise, a blocking artifact, a corrupted frame). The random error may be addressed by a robust mechanism for computing the CID data 1200, 1300 and/or the other CID data 1302, 1306, 1402, 1404 (e.g., the sliding window algorithm, an adaptive sampling algorithm).

The pseudostatic error may comprise a user setting (e.g., a brightness modification, a contrast modification, a hue modification, an other color space modification, a display scaling modification, and/or an aspect ratio modification). The user setting may be addressed by capturing the media data 1004 prior to an application of the user setting (e.g., at the frame buffer). However, capturing the media data 1004 prior to the application of the user setting may not be possible when the user setting is applied before the media data 1004 reaches the CID service 1000, 1002. For example, the display scaling modification may be applied in a set-top box prior to a transmission of the media data 1004 to the CID service 1002 of the networked device 102.

The pseudostatic error may also comprise an aspect ratio transformation (e.g., a black bar, a display stretching, a display scaling, and/or a display cropping). For example, the aspect ratio transformation may result in the fingerprint data 1202 of the networked device 102 that insufficiently corresponds to the other fingerprint data 1906 of the capture server 1008A, 1008B. The aspect ratio transformation may be addressed by a reverse transformation (e.g., an adjustment to the media data 1004 that conforms the media data 1004 to the other media data 1904) in the networked device 102 and/or the client device 100 that restores the media data 1004 to a state in which the media data 1004 existed prior to the aspect ratio transformation. The display cropping may also be addressed by the adaptive sampling algorithm that focuses on a dynamic region of pixel change. Thus, the adaptive sampling algorithm may ignore an edge region of a display.

The adaptive sampling algorithm may sample a number of different regions of the display to increase a probability of selecting a region with a high temporal activity. A number of regions of interest may be sampled in a single frame buffer to increase a generation rate of a unique fingerprint data as compared to the generation rate when a single region is sampled in the single frame buffer. To ensure that the fingerprint data 1202 matches the other fingerprint data 1906, the adaptive sampling algorithm may be synchronized between the capture server 1008A, 1008B and the networked device 102 and/or the client device 100.

The display scaling may also be addressed by sampling at a variable rate across a number of frame data in a number of different resolutions. For example, the fingerprint data 1202 generated by sampling every third pixel in a 300×300 resolution may match the fingerprint data 1202 generated by sampling every second pixel in a 200×200 resolution.

The display scaling may be performed by an external device (e.g., a set-top box, a game console) to a display device (e.g., a television) in which the CID service exists. Thus, the CID service 1000, 1002 may be unaware of the display scaling. The reverse transformation may be algorithmically applied to calibrate the fingerprint data 1202 with the other fingerprint data 1906.

The reverse transformation may comprise a slow perturbation to a subset (e.g., one, some, and/or all) of the number of regions of interest after the identification 1304 is determined. The display scaling may affect a central region of the display less than the edge region of the display. Thus, the fingerprint data 1202 of the central region may match the other fingerprint data 1906, and the identification 1304 of the media data 1004 may be determined. A percentage of display scaling correction may then be applied to the subset of the number of regions of interest. A match rate may be determined by measuring a percentage of the fingerprint data 1202 that matches the other fingerprint data 1906 associated with the identification 1304 of the media data 1004. The display scaling correction may then be adjusted in a manner such that the match rate is maximized. To ensure a sufficient number of samples to adequately measure the match rate, a sufficient number of fingerprint data may be gathered such that a change in the confidence score is less than an estimated change in the match rate. Thus, a large change in the estimated change may require a smaller number of samples to determine whether the display scaling correction maximizes the match rate. The slow perturbation may constantly seek to maximize the match rate.

If the match rate is sufficiently greater than zero before the identification 1304 is determined, the slow perturbation may still be applied. However, if the match rate is zero and/or nearly zero before the identification 1304 is determined, the display scaling correction may be slowly oscillated across a range for a subset of the number of regions of interest until a number of matches 2002 occur. Then, the slow perturbation may be applied.

Further, the display scaling may be addressed by a forward transformation (e.g., an adjustment to the other media data 1904 that conforms the other media data 1904 to the media data 1004) that calibrates the other fingerprint data 1906 with the fingerprint data 1202. The forward transformation may be applied to a subset of a number of regions captured by the capture server 1008A, 1008B. A forward transformed fingerprint data may be added to the fingerprint database 1900 and marked according to an amount of the display scaling correction applied. The forward transformation may be applied in a manner such that a total number of fingerprints in the fingerprint database 1900 is not appreciably increased. The capture server 1008A, 1008B may periodically (e.g., at a time interval that is significantly larger than a sampling time interval for generating a number of individual fingerprint data) generate a number of additional fingerprints for the subset of the number of regions subjected to a number of amounts of the display scaling correction. If the display scaling correction is insufficient to change a particular fingerprint from an uncorrected value, then the particular fingerprint may not be added to the fingerprint database 1900.

When the fingerprint data 1202 matches the forward transformed fingerprint data, the slow perturbation may be used by the CID service 1002 to refine the display scaling correction. If a plurality of the fingerprint data 1202 match a plurality of the forward transformed fingerprint data, the CID service 1002 may employ the slow perturbation based on an average of the number of amounts of the display scaling correction.

Further, the pseudostatic error may comprise a color space change and/or a pixel format change. The CID service 1002 may normalize a video portion of the media data 1004 to a single color space and/or a single pixel format. The color space change and the pixel format change may be addressed by using a hybrid transformation (e.g., a combination of a number of forward transformations and a number of reverse transformations).

The hybrid transformation may be used to address the pseudostatic error. The hybrid transformation may employ the reverse transformation to normalize the number of regions of the media data 1004 captured from the frame buffer to conform with the other media data 1904. The hybrid transformation may employ the forward transformation to reproduce a normalization error. The normalization error may be a loss of a portion of the media data 1004 as a result of the reverse transformation. The hybrid transformation may minimize a number of problems introduced by using the forward transformation and/or the reverse transformation. For example, the forward transformation may require a cooperative device manufacturer and/or a combinatoric explosion in the number of fingerprints to store. The reverse transformation may be lossy, may increase a processor utilization, may decrease the match rate, may result in a slower identification time, etc.

An input source (e.g., a DVD player, a game console, a cable set-top box, a satellite set-top box) may exhibit a number of different types of the pseudostatic error and/or a number of varying degrees of the pseudostatic error. Thus, the networked device 102 and/or the capture server 1008A, 1008B may generate and/or maintain a profile of the pseudostatic error associated with the input source. The profile may be associated with a particular input (e.g., HDMI 1) used by the input source. The networked device 102 and/or the capture server 1008A, 1008B may notify the CID service 1002 and/or the other CID service 1104, 1110 of the particular input being used. The CID service 1002 and/or the other CID service 1104, 1110 may then reference the profile and adjust accordingly.

Figure 23:
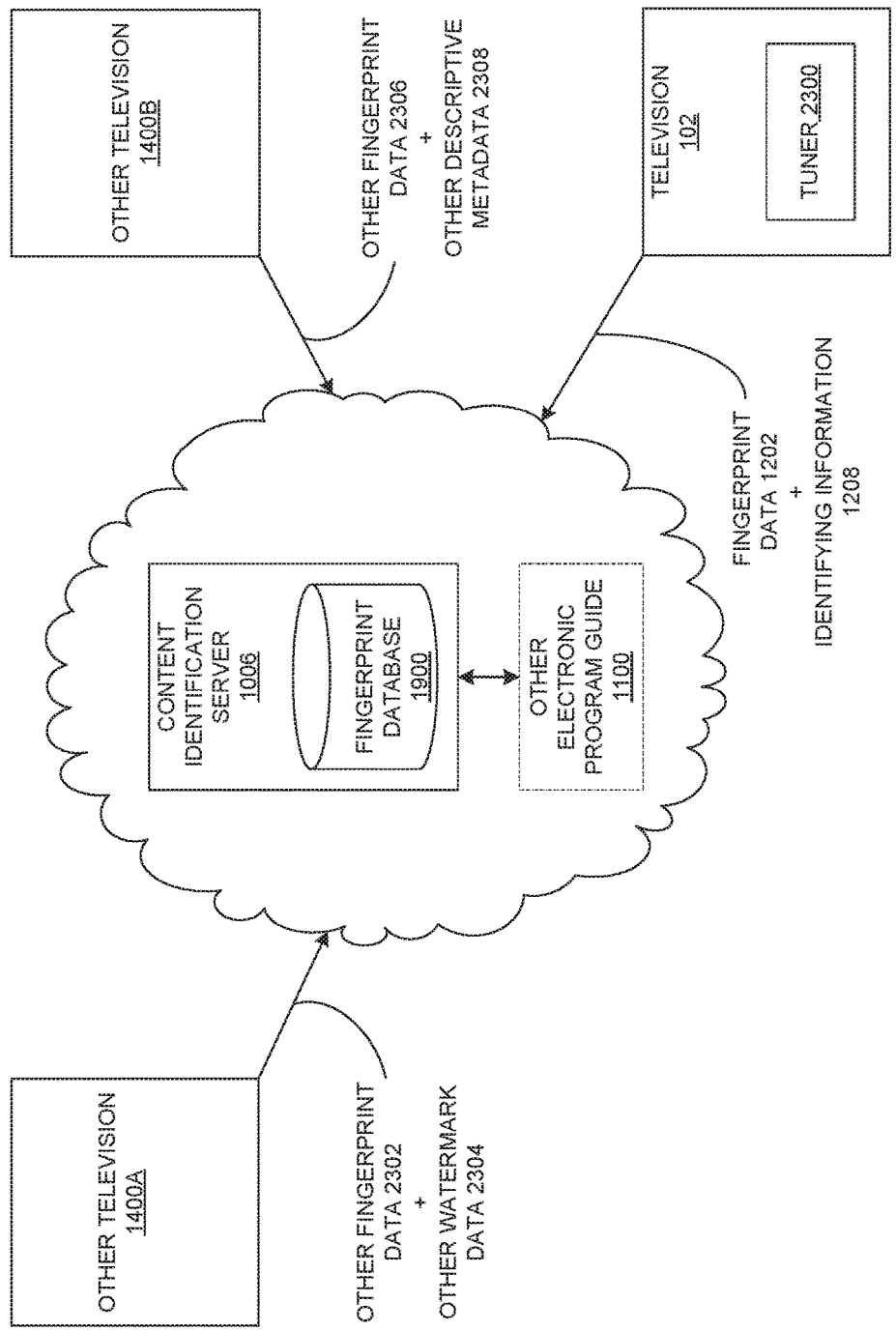
FIG. 23 is a block diagram of the content identification server 1006 gathering the CID data 1200 and a plurality of other CID data 1402, 1404, according to one embodiment.

FIG. 23 is a block diagram of the content identification server 1006 gathering the CID data 1200 and a plurality of other CID data 1402, 1404, according to one embodiment. FIG. 23 shows the networked device 102, the content identification server 1006, the other electronic program guide 1100, the fingerprint data 1202, the identifying information 1208, the plurality of other networked devices 1400A, 1400B, the fingerprint database 1900, the tuner 2300, a plurality of other fingerprint data 2302, 2306, the other watermark data 2304, and an other descriptive metadata 2308.

FIG. 23 illustrates the CID service 1002 of the networked device 102 retrieving the channel number of the networked device 102 from the tuner 2300 to generate the identifying information 1208. The networked device 102 may communicate the CID data 1200 comprising the fingerprint data 1202 of the media data 1004 along with the identifying information 1208 of the media data 1004 to the content identification server 1006. The content identification server 1006 may then process the CID data 1200 and access the other electronic program guide 1100 to retrieve the content identifying information associated with the channel number. The content identification server 1006 may also associate the content identifying information with the provisional identification 2400 of the media data 1004.

The other networked device 1400A may comprise the number of other client devices 1102. The other CID service 1104 may communicate the other CID data 1402 comprising the other fingerprint data 2302 of the number of other media data 1108 along with the number of other watermark data 2304 of the number of other media data 1108 to the content identification server 1006. The content identification server 1006 may process the other CID data 1402 and compare the other watermark data 2304 to the known watermark data in the watermark database 1700. If the other watermark data 2304 is identical to the known watermark data, the content identification server 1006 may associate the identification of the known watermark data with the number of other provisional identifications 2400 of the other media data 1108.

The other networked device 1400B may comprise the number of other networked media devices 1106B. The other CID service 1110 may communicate the other CID data 1404 comprising the other fingerprint data 2306 of the number of other media data 1112 along with the number of other descriptive metadata 2308 of the number of other media data 1112 to the content identification server 1006. The number of other descriptive metadata 2308 may comprise the callsign of the channel number of the networked device. The content identification server 1006 may process the other CID data 1404 and access the other electronic program guide 1100 to retrieve a number of content identifying information associated with the callsign. The content identification server 1006 may also associate the number of content identifying information with the number of other provisional identifications 2400 of the number of other media data 1112.

The content identification server 1006 may process the CID data 1200 and the plurality of other CID data 1402, 1404. The content identification server 1006 may store the fingerprint data 1202 and/or the plurality of other fingerprint data 2302, 2306 in the fingerprint database 1900. The content identification server 1006 may compare the fingerprint data 1202 and/or the plurality of other fingerprint data 2302, 2306 to the fingerprint database 1900. The content identification server 1006 may compare the fingerprint data 1202 to the plurality of other fingerprint data 2302, 2306. If the match 2002 exists among the fingerprint data 1202 and the plurality of other fingerprint data 2302, 2306, the content identification server 1006 may aggregate the provisional identification 2400 and the number of other provisional identifications 2400.

The content identification server 1006 may also be configured to determine the identification 1304 of the media data 1004 through the crowdsourcing. The crowdsourcing may be based on the consensus of the provisional identification 2400 and the number of other provisional identifications 2400. The consensus may be algorithmically determined based on the number of criteria comprising the predetermined percentage of the predetermined number of samples, the reliability of the provisional identification 2400, and/or the other factor affecting the confidence score of the consensus. For example, the number of other watermark data 2200, 2304 may be given more weight than the identifying information 1208 retrieved from the other electronic program guide 1100.

The content identification server 1006 may be configured to update the fingerprint database 1900 with the identification 1304 of the media data 1004 determined using the crowdsourcing. For example, the fingerprint database 1900 may be updated with the identification 1304 of the media data 1004 determined using the crowdsourcing when the crowdsourcing is used as the alternative to the capture server 1008A, 1008B or when the consensus has a higher confidence score than the identification 1304 of the media data 1004 determined using the capture server 1008A, 1008B. The content identification server 1006 may then use the identification 1304 of the media data 1004 determined using the crowdsourcing to automatically determine the identification 1304 of the fingerprint data 1202 and/or the other fingerprint data 1906, 2302, 2306, 2602 that is unaccompanied by the provisional identification 2400 and/or the other provisional identification 2400.

FIG. 24 is a table view of the content identification server 1006 gathering the provisional identification 2400 of the media data 1004 and the number of other provisional identifications 2400 of the number of other media data 1108, 1112, according to one embodiment. FIG. 24 shows the fingerprint data sequence 2000, the fingerprint database 1900, the provisional identification 2400, and the table 2450.

The provisional identification 2400 exists as a column of the table 2450 of FIG. 24. According to one embodiment, the provisional identification 2400 and/or the number of other provisional identifications 2400 may comprise the watermark data 1204, the number of other watermark data 2200, 2304, the descriptive metadata 1206, the number of other descriptive metadata 2308, the identifying information 1208, and/or the number of other identifying information 1800. The provisional identification 2400 may identify the content of the media data 1004 and/or the number of other media data 1108, 1112 in a manner such that the provisional identification 2400 is less authoritative than the identification 1304 of the media data 1004 and/or of the number of other media data 1108, 1112, 1904. The provisional identification 2400 may also identify the channel 2100 of the networked device 102 and/or the number of other networked media devices 1106A, 1106B.

FIG. 25 is a table view of the content identification server 1006 determining the identification 1304 of the media data 1004 based on the consensus, according to one embodiment. FIG. 25 shows the identification 1304, the fingerprint data sequence 2000, the fingerprint database 1900, the provisional identification 2400, and the table 2550.

The content identification server 1006 may aggregate the provisional identification 2400 of the fingerprint data 1202 with the number of other provisional identifications 2400 associated with the plurality of other fingerprint data 1906, 2302, 2306, 2602 that match the fingerprint data 1202. The content identification server 1006 may also be configured to determine the identification 1304 based on a majority of the provisional identification 2400 and/or the number of other provisional identifications 2400. The content identification server 1006 may require at least two other provisional identifications 2400 in addition to the provisional identification 2400 in order to form the consensus. The identification 1304 may be determined in a manner such that the provisional identification 2400 and/or the number of other provisional identifications 2400 are overridden by the consensus.

Figure 26:
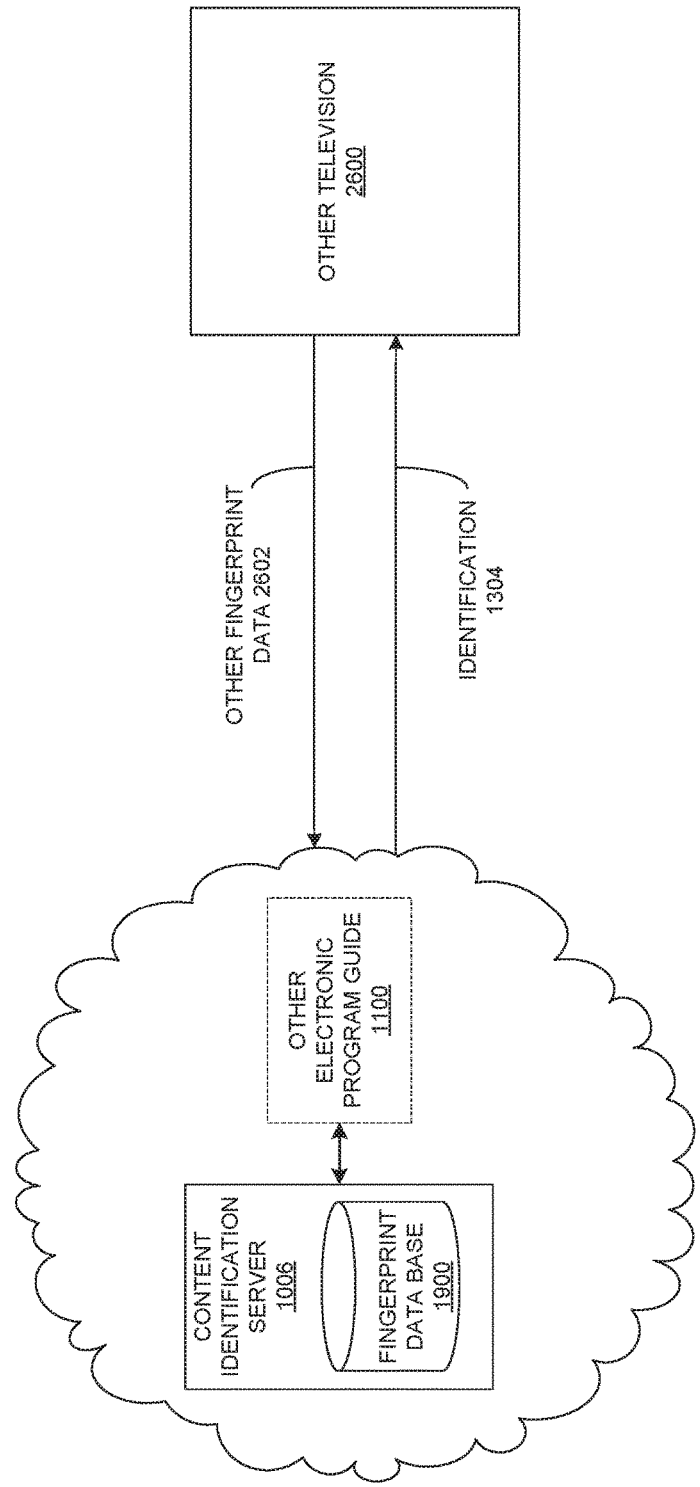
FIG. 26 is a block diagram of the content identification server 1006 using the identification 1304 of the media data 1004 to identify the other fingerprint data 2602, according to one embodiment.

FIG. 26 is a block diagram of the content identification server 1006 using the identification 1304 of the media data 1004 to identify the other fingerprint data 2602, according to one embodiment. FIG. 26 shows the content identification server 1006, the other electronic program guide 1100, the identification 1304, the other networked device 2600, the fingerprint database 1900, and the other fingerprint data 2602.

The content identification server 1006 may be configured to update the fingerprint database 1900 with the identification 1304 formulated by the consensus. Subsequently, the identification 1304 may be used to identify the other fingerprint data 2602 unaccompanied by the provisional identification 2400 and/or the number of other provisional identifications 2400.

For example, Jane may visit an auction website on her smartphone while she watches her television. When an advertisement airs on the television, the auction website displays matching items that are being auctioned. No installation, configuration, login, and/or user registration was required.

Although the present embodiments have been described with reference to a specific example embodiment, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer device). Accordingly, the specification and drawings are to be regarded in an illustrative in rather than a restrictive sense.

What is claimed is:

1. A method comprising:
constraining an executable environment in a security sandbox of a mobile device;
executing a sandboxed application in the executable environment of the mobile device capable of bypassing at least one access control of the security sandbox;
associating the mobile device with a television based on:
executing a sandbox-reachable service on the television;
automatically announcing, through the television, the sandbox-reachable service to a discovery module executing at least one of: on a pairing server external to the mobile device and as part of an extension of the security sandbox executing on the mobile device;
identifying the sandbox-reachable service offered through the television based on receiving, through the discovery module, the automatic announcement to enable the sandboxed application of the mobile device reach the sandbox-reachable service by communicating an identification data of the television via the sandbox-reachable service when a shared computer network is determined to be commonly associated with the mobile device and the television; and
establishing bidirectional communication between the mobile device and the television based on the sandboxed application reaching the sandbox-reachable service;
generating, through at least one of: the television and the mobile device, fingerprint data from characteristic features of media data on the television;
matching primary data generated from the fingerprint data with targeted data using a relevancy-matching server based on a relevancy factor, the matching comprising locating in a storage at least one of a matching item and a related item based on the relevancy factor;
locating in the storage at least one of the targeted data, a reference to the targeted data and a metadata of the targeted data using the relevancy-matching server; and
processing in the sandboxed application an embedded object from the relevancy-matching server;
rendering the primary data available across the sandbox-reachable service and the sandboxed application based on the bidirectional communication between the mobile device and the television; and
executing the embedded object through the sandboxed application to cause rendering of the targeted data therethrough in accordance with the availability of the primary data across the sandbox-reachable service and the sandboxed application, and the matching thereof using the relevancy matching server.

2. The method of claim 1:
wherein the relevancy factor comprises at least one of a category of the primary data, a behavioral history of a user, a category of the sandboxed application, and other information associated with the user.

3. The method of claim 1:
wherein the identification data of the television comprises at least one of a global unique identifier (GUID), an alphanumeric name, a hardware address associated with the television, a public address associated with an automatic content identification service of the television, and a private address associated with the automatic content identification service of the television when the shared computer network is determined to be commonly associated with the mobile device and the television.

4. The method of claim 1:
wherein the embedded object comprises at least one of a script, an image, a player, an iframe, and other external media included in the sandboxed application.

5. The method of claim 3, further comprising:
processing the fingerprint data from the at least one of: the television and the mobile device; and
communicating the primary data from the fingerprint data to any of a number of devices with access to at least one of: the identification data of the television and an identification data of the automatic content identification service of the television.

6. The method of claim 1, comprising:
generating the targeted data through the relevancy-matching server.

7. The method of claim 1, comprising:
associating the mobile device with the user based on a unique identifier.

8. The method of claim 1:
wherein the primary data further comprises at least one of descriptive metadata associated with a content identification data, a monitored event, a geolocation, a weather information, a private Internet Protocol (IP) address, and other data stored in at least one of a volatile memory and a non-volatile memory.

9. The method of claim 3, comprising:
the television automatically announcing the automatic content identification service of the television to the pairing server.

10. A system comprising:
a television to generate a fingerprint data from characteristic features of media data thereon;
a relevancy-matching server to:
match primary data generated from the fingerprint data with targeted data based on a relevancy factor, and
search a storage for at least one of the targeted data, a reference to the targeted data and a metadata of the targeted data,
wherein the primary data is any one of a content identification data and a content identification history; and
a mobile device capable of being associated with the television to:
process an embedded object within a sandboxed application,
constrain an executable environment in a security sandbox, and
execute the embedded object through the sandboxed application in the executable environment, the execution of the embedded object causing rendering of the targeted data therethrough, and the relevancy-matching server causing the rendering of the targeted data to a user through the sandboxed application,
wherein the television executes a sandbox-reachable service thereon, and is configured to automatically announce the sandbox-reachable service to a discovery module executing at least one of: on a pairing server external to the mobile device and as part of an extension of the security sandbox executing on the mobile device,
wherein the discovery module identifies the sandbox-reachable service offered through the television based on receiving the automatic announcement to enable the sandboxed application of the mobile device reach the sandbox-reachable service by communicating an identification data of the television via the sandbox-reachable service when a shared computer network is determined to be commonly associated with the mobile device and the television,
wherein the sandboxed application reaching the sandbox-reachable service establishes bidirectional communication between the mobile device and the television, and, thereby, association between the mobile device and the television, and
wherein the primary data is available across the sandbox-reachable service and the sandboxed application based on the established bidirectional communication between the mobile device and the television.

11. The system of claim 10:
wherein the relevancy-matching server matches the targeted data with the primary data based on searching the storage for at least one of a matching item and a related item based on the relevancy factor comprising at least one of a category of the primary data, a behavioral history of the user, a category of the sandboxed application, and other information associated with the user.

12. The system of claim 10, wherein:
the identification data of the television comprises at least one of a GUID, an alphanumeric name, a hardware address associated with the television, a public address associated with an automatic content identification service of the television, and a private address associated with the automatic content identification service of the television when the shared computer network is determined to be commonly associated with the mobile device and the television.

13. The system of claim 10:
wherein the embedded object comprises at least one of a script, an image, a player, an iframe, and other external media included in the sandboxed application.

14. The system of claim 10:
wherein the mobile device is determined to be associated with the user based on a unique identifier that is unlikely to change.

15. The system of claim 10:
wherein the primary data comprises at least one of a number of descriptive metadata associated with the content identification data, a monitored event, a geolocation, a weather information, a private IP address, and other data stored in at least one of a volatile memory and a non-volatile memory.

16. The system of claim 10:
wherein the television automatically announces an automatic content identification service thereof to the pairing server.

17. A method comprising:
matching primary data generated from fingerprint data from at least one of a television and a mobile device with targeted data based on a relevancy factor using a relevancy-matching server in accordance with searching a storage for at least one of a matching item and a related item, the relevancy factor comprising at least one of a category of the primary data, a behavioral history of a user, a category of a sandboxed application of the mobile device, and other information associated with the user;
searching the storage for at least one of the targeted data, a reference to the targeted data and a metadata of the targeted data the relevancy-matching server communicatively coupled with a memory of the relevancy matching server;
generating the fingerprint data from characteristic features of media data on the television;
wherein the primary data is any one of a content identification data and a content identification history; and
utilizing a pairing server external to the mobile device to:
associate the television with the mobile device based on:
executing a sandbox-reachable service on the television,
automatically announcing, through the television, the sandbox-reachable service to a discovery module executing on the pairing server,
identifying the sandbox-reachable service offered through the television based on receiving, through the discovery module, the automatic announcement to enable the sandboxed application of the mobile device reach the sandbox-reachable service by communicating an identification data of the television via the sandbox-reachable service when a shared computer network is determined to be commonly associated with the mobile device and the television, and establishing bidirectional communication between the mobile device and the television based on the sandboxed application reaching the sandbox-reachable service to render the primary data available across the sandbox-reachable service and the sandboxed application, and process identification data of the television comprising at least one of a GUID, an alphanumeric name, a hardware address associated with the television, a public address associated with an automatic content identification service of the television, and a private address associated with the automatic content identification service of the television when the shared computer network is determined to be commonly associated with the mobile device and the television.

18. The method of claim 17, further comprising:
processing, through the mobile device, an embedded object comprising at least one of a script, an image, a player, an iframe, and other external media included in the sandboxed application.

19. The method of claim 17, wherein, in accordance with the association between the mobile device and the television, the method further comprises:
processing, through the mobile device, an embedded object within the sandboxed application;
constraining an executable environment in a security sandbox of the mobile device; and
executing the embedded object through the sandboxed application in the executable environment of the mobile device to cause rendering of the targeted data therethrough,
wherein at least one of the embedded object and the sandboxed application is capable of bypassing at least one access control of the security sandbox through any one of the sandboxed application and the embedded object.

20. The method of claim 17, further comprising:
processing the fingerprint data from the at least one of the television and the mobile device through a content identification server; and
communicating the primary data from the fingerprint data to any of a number of devices with an access to at least one of: the identification data of the television and an identification data of the automatic content identification service of the television through the content identification server.

21. The method of claim 17, comprising:
the relevancy-matching server causing rendering of the targeted data to the user through the sandboxed application of the mobile device.

22. The method of claim 17, comprising:
determining the mobile device to be associated with the user based on a unique identifier that is unlikely to change.

23. The method of claim 17:
wherein the primary data comprises at least one of a number of descriptive metadata associated with the content identification data, a monitored event, a geolocation, a weather information, a private IP address, and other data stored in at least one of a volatile memory and a non-volatile memory.

24. The method of claim 17, comprising:
generating, through the relevancy-matching server, the targeted data.

25. A method comprising:
matching primary data generated from fingerprint data from at least one of a television and a mobile device with targeted data based on a relevancy factor using a relevancy-matching server in accordance with looking in a data repository for at least one of a matching item and a related item, the relevancy factor comprising at least one of a category of the primary data, a behavioral history of a user, a category of a sandboxed application of the mobile device, and other information associated with the user;
looking in the data repository for at least one of the targeted data, a reference to the targeted data and a metadata of the targeted data using the relevancy-matching server;
generating the fingerprint data from characteristic features of media data on the television,
wherein the primary data is any one of a content identification data and a content identification history;
associating the mobile device with the television based on:
executing a sandbox-reachable service on the television;
automatically announcing, through the television, the sandbox-reachable service to a discovery module executing at least one of: on a pairing server external to the mobile device and as part of an extension of a security sandbox executing on the mobile device, the security sandbox constraining an executable environment for the sandboxed application therein;
identifying the sandbox-reachable service offered through the television based on receiving, through the discovery module, the automatic announcement to enable the sandboxed application of the mobile device reach the sandbox-reachable service by communicating an identification data of the television via the sandbox-reachable service when a shared computer network is determined to be commonly associated with the mobile device and the television; and
establishing bidirectional communication between the mobile device and the television based on the sandboxed application reaching the sandbox-reachable service to render the primary data available across the sandbox-reachable service and the sandboxed application;
processing the fingerprint data through a content identification server; and
communicating the primary data from the fingerprint data to any of a number of devices with an access to at least one of: the identification data of the television and an identification data of an automatic content identification service of the television through the content identification server.

26. The method of claim 25, further comprising:
processing, through the sandboxed application of the mobile device an embedded object comprising at least one of a script, an image, a player, an iframe, and other external media included in the sandboxed application.

27. The method of claim 25, further comprising:
causing, through the relevancy-matching server, rendering of the targeted data to the user through the sandboxed application of the mobile device.

28. The method of claim 25, comprising:
determining the mobile device to be associated with the user based on a unique identifier that is unlikely to change.

29. The method of claim 25:
wherein the primary data comprises at least one of a number of descriptive metadata associated with the content identification data, a monitored event, a geo-location, a weather information, a private IP address, and other data stored in at least one of a volatile memory and a non-volatile memory.

30. The method of claim 25, comprising:
the television automatically announcing the automatic content identification service thereof to the pairing server.

* * * * *